US010834482B2

(12) United States Patent
Speicher et al.

(10) Patent No.: US 10,834,482 B2
(45) Date of Patent: Nov. 10, 2020

(54) SYSTEMS AND METHODS FOR INTEGRATING FIRST RESPONDER TECHNOLOGIES

(71) Applicant: The Government of the United States of America, as represented by the Secretary of Homeland Security, Washington, DC (US)

(72) Inventors: Norman Speicher, Washington, DC (US); Donald McGarry, Reston, VA (US); Brian Wilkins, Reston, VA (US)

(73) Assignee: The Government of the United States of America, as represented by the Secretary of Homeland Security, Washington, DC (US)

(*) Notice: Subject to any disclaimer, the term of this patent is extended or adjusted under 35 U.S.C. 154(b) by 0 days.

(21) Appl. No.: 16/209,636

(22) Filed: Dec. 4, 2018

(65) Prior Publication Data

US 2019/0174208 A1    Jun. 6, 2019

Related U.S. Application Data

(60) Provisional application No. 62/594,853, filed on Dec. 5, 2017.

(51) Int. Cl.
*H04Q 9/00* (2006.01)
*G06F 13/20* (2006.01)
(Continued)

(52) U.S. Cl.
CPC ............. *H04Q 9/00* (2013.01); *G06F 1/163* (2013.01); *G06F 1/26* (2013.01); *G06F 13/20* (2013.01);
(Continued)

(58) Field of Classification Search
CPC .. H04Q 9/00; H04Q 2209/00; H04Q 2209/20; H04Q 2209/40; H04Q 2209/43;
(Continued)

(56) References Cited

U.S. PATENT DOCUMENTS 7,342,502 B2 * 3/2008 Harkins .................... A42B 3/30
                                                                  340/573.1
7,880,607 B2 * 2/2011 Olson ................ G08B 21/0453
                                                                  340/521

(Continued)

*Primary Examiner* — Franklin D Balseca
(74) *Attorney, Agent, or Firm* — Lavanya Ratnam; Kelly G. Hyndman

(57) ABSTRACT

Various embodiments of the present invention are directed towards a system and method relating to Next Generation First Responder (NGFR) modular and scalable systems capable of easily integrating various components via open standards and interfaces. For example, a wearable on-body first responder system includes at least one sensor configured to identify sensor information, a controller configured to provide a first responder mobile support architecture and that is configured to interface with the at least one sensor. The controller is configured to collect and distribute the sensor information, and an input/output (I/O) device is configured to interface with the controller and present the sensor information to a user of the on-body first responder system.

25 Claims, 12 Drawing Sheets

(51) Int. Cl.
*G06F 1/16* (2006.01)
*H04B 1/3827* (2015.01)
*G06F 1/26* (2006.01)
*H04W 84/18* (2009.01)

(52) U.S. Cl.
CPC ............ *H04B 1/385* (2013.01); *H04W 84/18* (2013.01); *H04Q 2209/00* (2013.01); *H04Q 2209/20* (2013.01); *H04Q 2209/40* (2013.01); *H04Q 2209/43* (2013.01); *H04Q 2209/80* (2013.01); *H04Q 2209/88* (2013.01)

(58) Field of Classification Search
CPC ............ H04Q 2209/80; H04Q 2209/88; G06F 1/163; G06F 1/26; G06F 13/20; H04B 1/385; H04W 84/18; H04W 4/90; G08B 21/02; G08B 21/0453; G08B 27/001
See application file for complete search history.

(56) References Cited

U.S. PATENT DOCUMENTS

| | | | | |
|---|---|---|---|---|
| 8,907,782 | B2 * | 12/2014 | Baker ................... | H04W 4/029 |
| | | | | 340/539.12 |
| 9,468,835 | B2 * | 10/2016 | Martikka ................ | A63B 71/06 |
| 9,899,879 | B2 * | 2/2018 | Faraone ................. | H02J 50/90 |
| 2006/0176169 | A1 * | 8/2006 | Doolin .................. | G08B 17/00 |
| | | | | 340/521 |
| 2010/0081411 | A1 * | 4/2010 | Montenero ........ | G08B 21/0233 |
| | | | | 455/404.2 |
| 2018/0059714 | A1 * | 3/2018 | Martin .................. | A61B 5/015 |

\* cited by examiner

SYSTEMS AND METHODS FOR INTEGRATING FIRST RESPONDER TECHNOLOGIES

CROSS-REFERENCE TO RELATED APPLICATIONS

This application claims the benefit of U.S. Provisional Application No. 62/594,853 entitled "Systems and Methods for Integrating First Responder Technologies," filed on Dec. 5, 2017, incorporated herein by reference in its entirety.

STATEMENT OF GOVERNMENT INTEREST

The present invention was made by one or more employees of the United States Department of Homeland Security in the performance of official duties, and, thus the claimed invention may be manufactured, used, licensed by or for the United States without the payment of any royalties thereon.

FIELD OF THE INVENTION

The present invention relates generally to the field of emergency services equipment, and more specifically to the field of Next Generation First Responder (NGFR) equipment.

BACKGROUND OF THE INVENTION

Today's first responders save lives every day, using yesterday's technology. Threats evolve rapidly, and first responders are up against increasingly dangerous conditions when they answer the call to keep our citizens safe. Responders and the communities they serve deserve public safety services enabled with all the capabilities technology makes possible. Responders are overburdened with data and devices, so throwing more technologies at the problem can do more harm than good. Instead, responders need smarter, seamless technologies that increase their ability to focus on the mission, rather than distract from it, enabling responders to better secure our communities, while ensuring that the responders make it home safely.

SUMMARY OF THE INVENTION

Example embodiments of NGFR integration models include modular aspects, so that the first responder has the ability to select different components that will easily integrate via open standards and interfaces. Embodiments are scalable, so that the first responder has the ability to build, e.g., large and complex systems or small and streamlined systems, depending on mission needs and budget.

In an example embodiment, a wearable on-body first responder system includes at least one sensor configured to identify sensor information, a controller configured to provide a first responder mobile support architecture and that is configured to interface with the at least one sensor, wherein the controller is configured to collect and distribute the sensor information, and an input/output (I/O) device is configured to interface with the controller and present the sensor information to a user of the on-body first responder system.

In another example embodiment, a method for receiving situational awareness data includes reading, by a controller of a wearable on-body first responder system, sensor data from sensors within sensor range of the controller, transmitting the sensor data to a remote system, and receiving situational awareness data from the remote system, wherein the situational awareness data is based on the read sensor data and environmental data.

In yet another example embodiment, a method for generating a local notification includes: reading, by a first controller associated with a first user, sensor data from sensors within sensor range of the first controller, wherein the sensors within sensor range include local sensors worn by the first user, and external sensors not worn by the first user; receiving, from at least one of i) a remote system central command and ii) a second controller associated with a second user, at least one of i) out of range sensor data, ii) remote situational awareness data, and iii) a remote notification, wherein the remote situational awareness data and the remote notification are associated with the out of range sensor data; and generating, by the first controller, a local notification for the first user to react to an environmental situation based on information received from at least one of i) the remote system central command, ii) the second controller, and iii) a remote sensor, independent of whether the environmental situation is sensed locally by the first user.

Other features and aspects of the invention will become apparent from the following detailed description, which taken in conjunction with the accompanying drawings illustrate, by way of example, the features in accordance with embodiments of the invention. This summary is not intended to identify key or essential features of the claimed subject matter, nor is it intended to limit the scope of the invention, which is defined solely by the claims attached hereto.

BRIEF DESCRIPTION OF THE DRAWINGS

One or more example embodiments of the present invention are described in detail with reference to the following drawings. These drawings are provided to facilitate understanding of the present invention and should not be read as limiting the breadth, scope, or applicability thereof. For purposes of clarity and ease of illustration, these drawings are not necessarily made to scale.

Figure 1:
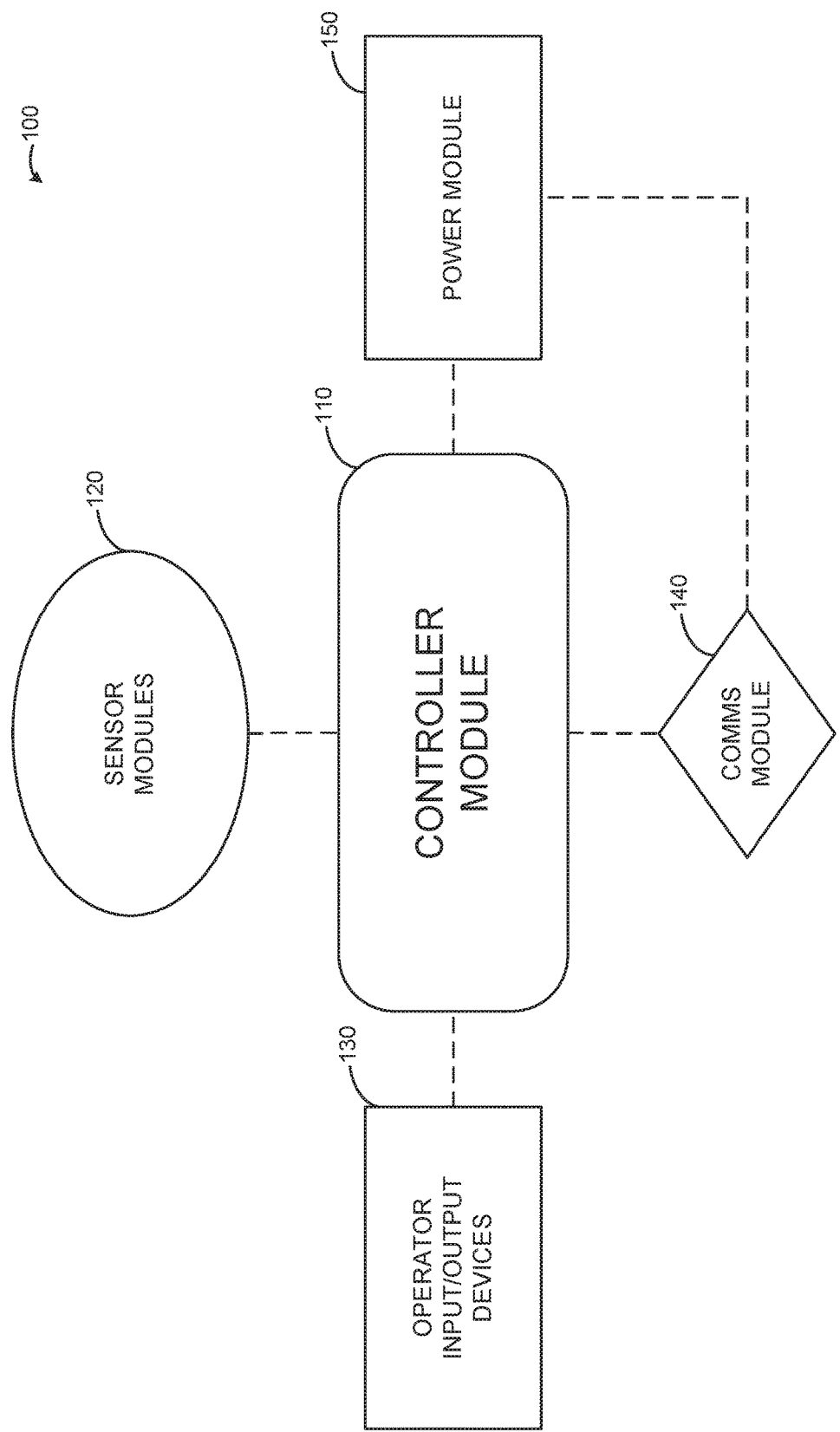
FIG. 1 illustrates a wearable on-body first responder system according to an example embodiment.

These drawings are not intended to be exhaustive or to limit the invention to the precise form(s) disclosed. It should be understood that the present invention can be practiced with modification and alteration, and that the invention is limited only by the claims and the equivalents thereof.

DETAILED DESCRIPTION OF THE INVENTION

The Department of Homeland Security (DHS) Science and Technology Directorate (S&T) initiated the Next Generation First Responder (NGFR) Apex program to develop and integrate next-generation technologies to expand first responder mission effectiveness and safety. The NGFR Apex program works with first responders across the country to ensure they are protected, connected and fully aware, regardless of the hazards they face. The program is developing and integrating technologies that are modular (have the ability to integrate via open standards and interfaces) and scalable (have the ability to build a large and complex system or a small and streamlined system). Beyond developing individual technologies that can integrate, the goal of the NGFR Apex program is to define the open-source standards that enable commercially developed technologies to integrate together and into existing first responder technologies.

Table 1 below lists various abbreviations that may be used throughout this document:

TABLE 1

| | |
|---|---|
| 3G | Third Generation |
| 6LoWPAN | IPv6 over Low power Wireless Personal Area Networks |
| AES | Advanced Encryption Standard |
| AMBER | America's Missing: Broadcast Emergency Response |
| API | Application Programming Interface |
| BLE | Bluetooth Low Energy |
| BPM | Beats Per Minute |
| BREDR | Bluetooth Basic Rate/Enhanced Data Rate |
| BTLE | Bluetooth Low Energy |
| BYOD | Bring Your Own Device |
| CAD | Computer Aided Dispatch |
| CAP | Common Alerting Protocol |
| CBRNE | Chemical, Biological, Radiological, Nuclear, and Explosive |
| CC | Command Center |
| CD | Controlled Device model |
| CM | Controller Module |
| CM | Communications Module (Comms Hub) |
| CoAP | Constrained Application Protocol |
| COMSEC | Communication Security |
| CSW | Catalog Service for the Web |
| CT | Controller Module |
| DAR | Data At Rest |
| DDS | Data Distributive Service |
| DE | Distribution Element |
| DHS | Department of Homeland Security |
| DIT | Data In Transit |
| DLP | Data Loss Prevention |
| EAP | Extensible Authentication Protocol |
| EDXL | Emergency Data Exchange Language |
| EM | Emergency Management |
| EMD | Emergency Management Domain |
| EMLC | Emergency Management Loose Coupler |
| EOC | Emergency Operations Center |
| ESN | Electronic Serial Number |
| EXDL | Emergency Data Exchange Language |
| FDE | Full Disk Encryption |
| FIPS | Federal Information Processing Standard |

TABLE 1-continued

| | |
|---|---|
| FOTA | Firmware over-the-Air |
| FPS | Frames Per Second |
| FQDN | Fully Qualified Domain Name |
| GAID | Google Advertising ID |
| GeoJSON | Geographic JavaScript Object Notation |
| GIS | Geospatial Information System |
| GML | Geographical Markup Language |
| GNSS | Global Navigation Satellite System |
| GPS | Global Positioning System |
| GSF | Google Services Framework |
| GSM | Global System for Mobile Communication |
| HAZMAT | Hazardous Material |
| HCI | Human-Computer Interface |
| HDMI | High Definition Multimedia Interface |
| HM | Hybrid Module |
| HSI | Human Systems Interface |
| HTTP | Hypertext Transfer Protocol |
| HTTPS | Hypertext Transfer Protocol Secure |
| HUD | Heads Up Display |
| I/O | Input/Output |
| IAN | Incident Area Network |
| IC | Incident Commander |
| ICP | Incident Command Post |
| ID | Identification |
| IEP | Information Exchange Package |
| IETF | Internet Engineering Task Force |
| ILS | Integrated Logistics Support |
| IMEI | International Mobile Equipment Identifier |
| IMU | Inertial Measurement Unit |
| INFOSEC | Information Security |
| iOS | iPhone Operating System |
| IoT | Internet of Things |
| IP | Internet Protocol |
| IPsec | Internet Protocol Security |
| IR | Infra-red |
| ISR | Intelligence, Surveillance, Reconnaissance |
| JSON | Java Script Object Notation |
| KM | Kilometer |
| LM | Location Module |
| LMR | Land Mobile Radio |
| LTE | Long-Term Evolution |
| M | Meter |
| M2M | Machine to Machine |
| MAC | Media Access Control |
| MAM | Mobile Application Management |
| MCM | Mobile Content Management |
| MDM | Mobile Device Manager |
| MEID | Mobile Equipment Identifier |
| MGRS | Military Grid Reference System |
| MQTT | Message Queuing Telemetry Transport |
| NFC | Near Field Communication |
| NFPA | National Fire Protection Association |
| NGFR | Next Generation First Responder |
| NIEM | National Information Exchange Model |
| NIST | National Institute of Standards and Technology |
| NMEA | National Marine Electronics Association |
| OASIS | Organization for the Advancement of Structured Information Standards |
| ODE | On-Device Encryption |
| OGC | Open Geospatial Consortium |
| OOT | Out of Tolerance |
| OS | Operating System |
| OWS | Open Geospatial Consortium Web Service |
| P25 | Project 25 |
| PAN | Personal Area Network |
| PDF | Portable Document Format |
| PHS&T | Packaging, Handling, Shipping and Transport |
| PII | Personally Identifiable Information |
| PM | Power Module |
| PPE | Personal Protective Equipment |
| PSAP | Public Safety Answering Point |
| PSK | Pre-Shared Key |
| PTT | Push To Talk |
| PTZ | Pan-Tilt-Zoom |
| RFC | Request for Comment |
| RM | Resource Messaging |
| ROM | Read Only Memory |
| S&T | Science and Technology Directorate |

TABLE 1-continued

| | |
|---|---|
| SA | Situational Awareness |
| SATCOM | Satellite Communications |
| SensorML | Sensor Markup Language |
| SHA | Cryptographic Hash Algorithm |
| SIM | Subscriber Identification Module |
| SLTT | State, Local, Tribal and Territorial |
| SM | Sensor Module |
| SMBus | System Management Bus |
| SMS | Short Message Service |
| SNRA | Sensor Network Reference Architecture |
| SNS | Sensor Notification Service |
| SOS | Sensor Observation Service |
| SSAID | Settings.Secure#ANDROID_ID |
| STA | Sensor Things API |
| STAPI | Sensor Things Application Program Interface |
| TBD | To Be Developed |
| TCP | Transmission Control Protocol |
| TEP | Tracking of Emergency Patients |
| TLS | Transport Layer Security |
| TRRS | Tip-Ring-Ring-Sleeve |
| TRS | Tip-Ring-Sleeve |
| UDP | User Datagram Protocol |
| UI | User Interface |
| UID | User Identification, Unique Identifiers |
| UML | Universal Markup Language |
| UMTS | Universal Mobile Telecommunications System |
| URL | Uniform Resource Locator |
| USB | Universal Serial Bus |
| US-CERT | U.S. Government Computer Emergency Readiness Team |
| USNG | U.S. National Grid |
| UTM | Universal Transverse Mercator |
| UUID | Universally Unique Identifier |
| VAC | Volts Alternating Current |
| VDC | Volts Direct Current |
| VOIP | Voice Over Internet Protocol |
| VPN | Virtual Private Network |
| VSP | Virtual Serial Port |
| WAN | Wide Area Network |
| WEP | Wired Equivalent Privacy |
| WFS | Web Feature Service |
| WGS84 | World Geodetic System 84 |
| Wi-Fi | Wireless Fidelity |
| WMS | Web Map Service |
| WPA2 | Wi-Fi Protected Access II |
| WPS | Web Processing Service |
| XML | Extensible Markup Language |
| XMPP | Extensible Messaging and Presence Protocol |

To help tomorrow's first responder be better protected, connected and fully aware, firefighters, law enforcement officers and emergency medical services can use examples of embodiments described herein regarding enhanced protection, resilient communications and advanced situational awareness. Example embodiments can integrate cutting-edge first responder technologies and giving responders more options to build the systems they need for their mission and budget.

Example embodiments enable first responders to be protected, connected, and fully aware. Regarding being protected, responders must be protected against the multiple hazards they encounter in their duties, including protection against projectiles, sharp objects, fire, pathogens, hazardous chemicals, explosions, and physical attack. Enhanced duty uniforms and personal protective equipment keep responders safe, no matter the emergency. Fire, tear, splash, and biohazard resistant fabrics protect responders from frequent hazards. Physiological monitoring identifies when responders are in distress. Internet of Things (IoT) sensors detect environmental threats such as chemicals or biohazards, and advanced protective materials and equipment physically shields first responders against such hazards.

Regarding being connected, responders are connected with other responders, with incident commanders, and with local, regional, state and federal command centers in order to provide and/or receive information from those various entities. Fully interoperable communications equipment reliably exchanges messages. Deployable networks give connectivity anywhere, anytime, in any conditions. Universal data standards make information sharing easy and secure. Interoperable communications systems reliably exchange messages even in signal-denied environments. Deployable networks give responders connectivity anywhere, anytime and in any condition. Ability to use universal data and interface standards for public safety make information sharing easy and secure.

Regarding being fully aware, responders and central command need to be fully aware of the threats, activities, the environment in which they are operating, and the location of all resources, including both personnel and units. Integrated wearables, sensors, and remote monitoring convey the right information at the right time. Situational awareness tools provide critical context even before responders arrive on scene, saving vital time. Example embodiments described herein can help convey the right information at the right time through situational awareness platforms, location-based services, data analytics and smart alerting, and interoperable apps for real-time incident information sharing.

Example embodiments are modular, meaning that responders can select different components that will easily integrate via open standards and interfaces, and scalable, meaning that responders can build a large and complex system or a small and streamlined system, depending on their mission needs and budget. Architectural models and defined integration standards are described below to illustrate how components/equipment of the overall system are "swappable."

Examples use standards, interfaces and data flows of public safety technologies to integrate hardware, software and data to enhance responder efficiency and safety. Intelligent communications interoperability, indoor location and artificial general intelligence are used for data analytics. Interoperability lowers barriers to integration and entry into the first responder marketplace. A high-level architecture and interface standards may be used to integrate a wide variety of public safety technologies. In addition, example embodiments establish and define architectures for how on-body responder technologies can integrate into a single system, e.g., the Responder SmartHub/controller.

FIG. 1 illustrates a wearable on-body first responder system 100 according to an example embodiment. The system 100 includes various components. Although additional components are contemplated, the example system 100 for simplicity includes five components: a controller module 110 to serve as a controller for the system, a comms module 140 to serve as communications for the system, sensor modules 120 to serve as sensors/inputs, operator input/output devices 130 to serve as system user input/output, and a power module 150 to serve as system power. The example set of modules can provide a Responder SmartHub architecture. Multiple modules can exist in a single device, or can exist as separate devices. The Responder SmartHub architecture consists of individual devices or "modules" that interact with each other to provide those responders with the capabilities they need to execute their operations. These exemplary illustrated modules, issued to the responders, create and interact via a "Personal Area Network" (PAN) for each responder. The entire on-body system further communicates over an Incident Area Network (IAN) or Wide Area Network (WAN) to the rest of the agency's communications and information systems.

The separate Responder SmartHub modules provided to the responder are expected to primarily be body-worn to allow the responder's hands to be free to perform required activities. As a result, the size, weight, form factor and durability of the modules does not overwhelm the physical capabilities and movements of the responders while performing their operations. Information that can be collected at the scene and/or obtained elsewhere and provided to the responder and their leadership for analysis and action, and can be passed between responders.

The high-level Responder SmartHub architecture 100 shown in FIG. 1 enables each of the modules to communicate with the other modules via wired (e.g., Universal Serial Bus (USB)) or wireless (e.g., Wi-Fi, Bluetooth, or ZigBee) communications. The power module 150 can use inductive and/or hard-wired connections to provide power to the other modules. The user input/output (I/O) devices can be peripherals that connect to the controller other modules.

The controller module 110 can be self-contained, by including one or more of the following components: power source, display, manual input (keyboard/touchscreen), personal-area network (PAN) communications, wide-area network (WAN) communications, built-in speaker/microphone, audio/video recording, geolocation, sensor connections, and/or basic application. The communications (Comms) module 140 can include one or more of the following components: internal short-term power source, connection to power module, and connections to Comms systems/devices such as Bluetooth, Wi-Fi, LTE, LMR, SATCOM, FirstNet LTE, Datacasting, and/or Ethernet; the Comms module can also include management systems to manage the Comms bandwidth/priority. The sensor modules 120 can include internal short-term power sources, and can communicate with the controller. The power module 150 can include capabilities to provide long-term power to wired devices, and is configured to be rechargeable/field-exchangeable. The operator input/output devices 130 can include external cameras, headset/microphone, and external display/touchscreen. Modules can additionally include wearable interfaces, cameras, microphones, location sensors, biosensors, equipment sensors/monitors/controls, environment sensors. Communications can include satellite comms, LTE broadband, FirstNet, multiband radio, or single band radio.

The modules provide certain capabilities, and all of them working together support the Responder. The module are interchangeable, with similar modules made by different vendors able to replace each other due to the common programming and protocols used by the architecture. Modules can be removed and replaced by field users without requiring reprogramming (and can accept the entering of appropriate user/unit identification and possibly loading an application). Modules can have their own power sources to provide up to 30 minutes of operation when not connected to/powered by a Power Module. The four primary modules are further described below.

The Controller Module 110 can be self-contained (e.g., a module can be self-contained by including its own power supply, which can power that module independent of a separate power module 150) and to have the following internal capabilities: Power source (e.g., to supply sufficient power to last a 12-hour shift), PAN communications (e.g., Bluetooth, Wi-Fi, USB), IAN communications [e.g., Wi-Fi, Long Term Evolution (LTE)], Audio/video recording, Data storage. The Controller Module 110 also can have the following capabilities built in, or they could be provided as external modules/devices: Display, Manual input (keyboard/touchscreen), Built-in speaker/microphone, Camera, Geolocation sensor [Global Positioning System (GPS)], Haptic displays/sensors, Kinesthetic displays/sensors, Vestibular data collection capability, and WAN communications (e.g., LTE).

The basic applications expected to be included on the Controller Module 110 would be the following (not an exhaustive list): Messaging [short message service (SMS), e-mail], Computer Aided Dispatch (CAD) interface to receive dispatch information and send status updates/additional information to Public Safety Access Point systems, Camera/voice recording and display/playback, Voice to text for messaging and application commands, Map display, including layer filtering/selection and own position display, Communications system management/configuration/status/display/operation, Off-body sensor system management/configuration/status/data display, Responder physiological sensor system management/configuration/status/data display, Alerting system management/configuration/display, Web browser for access to enterprise network and Internet, Responder logon/identification/credentialing, A situational application that would combine the various data displays indicated above into one app.

A commercially-available smartphone (Windows phone, Android or Apple iPhone), with the appropriate applications installed, can provide functionality needed for serving as a Responder SmartHub Controller Module. A minimal Controller Module 110, based upon a single-board computer (e.g., Raspberry Pi, Arduino, etc.), also can be constructed to provide the minimum capabilities or, with add-ons, all the necessary controller capabilities.

The Communications Module 140 provides an interface between the Controller Module 110 and external communications devices, including Agency Land Mobile Radios (LMRs), satellite communications devices (SATCOM), and government-managed broadband devices (e.g., Band 14 LTE). The Communications Module would manage the data and voice exchanges between the various external communications devices and the Controller Module, much like a router manages data flows among/across various networks.

The Communications Module 140 can be self-contained and have the following minimal internal capabilities: Detection of connected systems, including frequency/band capabilities and available bandwidth, Power supply to provide power for up to 30 minutes, Physical connections for the various devices (e.g., LMR, LTE, SATCOM, etc.), Power connections to draw power from the Power Module, Interface connection to the Controller.

The basic applications that can be included on the Communications Module 140 would be the following (not an exhaustive list): Business rules for routing data and voice (based upon: Priority of the data, Bandwidth required by the data, Bandwidth available, Types of communication systems connected to the module, System selected by user, System receiving communications), Status and channel/frequency control for each connected communications device, Power status for both internal and external power sources. The Communications Module 140 can share/shift some of its computational requirements (e.g., business rules) to the controller and have the Communications Module perform just the switching functions.

The Power Module 150 can provide long-term, exchangeable and rechargeable battery power to the responder's various modules. The Power Module 150 can provide power for all the modules for extended operations (e.g., wildfires, search and rescue, hostage standoffs, etc.). The Power Module 150 will have the capability to be recharged from 110 volts (from a wall socket or AC generator), or 12 volts (from a vehicle), and will be hot-swappable. The Power Module 150 will provide battery status data (e.g., run time remaining, charge status, modules connected) to the responder.

The Power Module 150 is expected to be self-contained and to have the following minimal internal capabilities: Monitor power status and report run-time remaining, Detect and report modules connected to the Power Module, Recharge internal batteries quickly without overheating/overcharging, Provide power to attached modules, Be able to recharge unattached (i.e., wireless) modules, Provide power for all attached modules for a 12-hour shift, Alert operator when power capacity falls below preset level, Use a standard battery or batteries.

The basic applications expected to be included on the Power Module 150 would be the following (not an exhaustive list): Power status application with low-power alert function, Module connectivity status application, Smart recharge/battery maintenance application. These applications could be hosted on the controller instead of the power module if the appropriate sensor and communications were established between the power module and the controller.

The Sensor modules 120 can take the form of physiological sensors, cameras, Chemical, Biological Radiological Nuclear or Explosive (CBRNE) sensors, thermal sensors, physical sensors—kinesthetic, vestibular and haptic; etc. These sensor modules 120 communicate with the Controller Module via wired or wireless means. Each sensor would have a certain "intelligence" built in so that it had the capability to communicate sensor identification and sensor data to the Controller Module, and would have its own short-term power source. Sensors could be body-worn (e.g., body cameras, radiation sensors, physiological sensors, etc.) or hand-carried (e.g., CBRNE sensors, rangefinders, etc.).

The Sensor Modules 120 are expected to be self-contained and to have the following minimal internal capabilities: Provide identification and characteristics to a Sensor Management Application (e.g., "SensorHub"), possibly located on the Controller Module; Send alerts to the SensorHub if out-of-tolerance (OOT) conditions are detected (e.g., sensor failure or sensor measurements exceeding set limits (either high or low)); Battery with enough capacity to power the sensor during swap-out of the Power Module (maximum of 30 minutes) and wireless sensors for a 12-hour shift.

The basic applications expected to be included on the Sensor Modules 120 would be the following (not an exhaustive list): Self-identification and registration app, Configuration app to set alert (OOT) parameters, Battery with enough capacity to power wired devices during swap-out of the Power Module (maximum of 30 minutes) and wireless devices for a 12-hour shift; and Self-monitoring app to determine status and provide an alert if the sensor fails.

The Input & Output (I/O) devices 130 can take the form of Heads up Displays, wrist-worn displays, microphone/earphone headsets, handheld touchscreen displays, voice-activated commands, etc. These would connect with the Controller via wired or wireless means. The I/O devices 130 are expected to be self-contained and to have the following minimal internal capabilities: Necessary user controls (e.g., volume, brightness, contrast, sensitivity, etc.), Ability to accept responder input in the form of touch, voice, movement/gesture, etc. and translate the input into data and/or system commands, Ability to output audio, video, and haptic (touch) information for use by the responder. The basic applications expected to be included on the I/O devices 130 would be the following (not an exhaustive list): Status monitoring software to detect device health and status, Battery charge/status monitor for internal battery.

The Responder SmartHub modules would be carried by the responders, and would have to be robust enough to function in the extreme environments, critical safety and hazardous situations that responders experience.

Responder SmartHub enables Integration with Agency Systems. The Responder SmartHub architecture enables technologies issued to responders and the multiple command centers, such as Computer-Aided Dispatch (CAD), Geographical Information System, Records Management System (RMS), etc., to be fully integrated to allow the flow of information and data between responders and other responders, agencies or databases.

Figure 2:
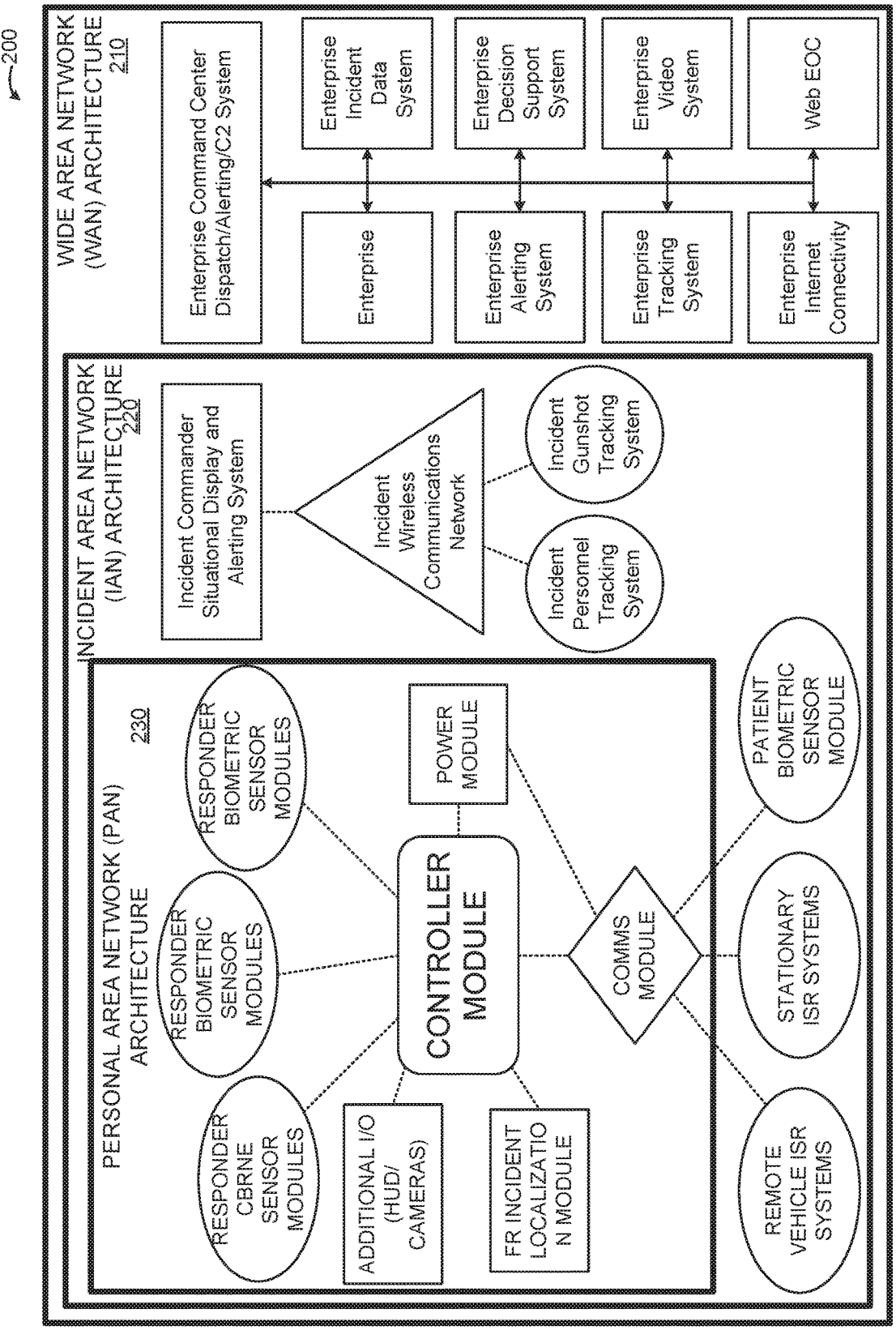
FIG. 2 illustrates a first responder system according to an example embodiment.

FIG. 2 illustrates an example embodiment 200 showing the Responder SmartHub architecture at the agency level, to include the IC's IAN 220 and the agency's WAN 210. There are multiple sensors connected to the Controller Module via the PAN 230, along with a separate Location module. The Location Module could be either an external GPS module or a non-GPS module (for in-building operations) providing responder location data.

There are three different primary producers/consumers of the information that flows to/from the responder. These three producers/consumers are: Responder, Incident Commander, and Local, Regional, State, Federal Command Center.

Responder—The responder collects and provides information to other responders, to the IC and to the CC. The responder also receives information and task direction from both the IC and CCs, and would receive information from other responders, most often those within his/her IAN.

Incident Commander—The IC receives information from both the responders and the CC, provides direction to the responders, and provides information regarding the incident to the CC.

Local, Regional, State, Federal Command Center—The CCs receive information from the IC (and in some cases directly from the responders) and provide direction and information to the IC (and in some cases directly to the responders).

The architecture, communications and standards "above" the level of the responder have to allow the various situational awareness, dispatch, command and control, and data systems to be able to receive, process, display and act upon the information provided by Responder SmartHub.

This system is tended to be worn and integrated into a responder's equipment/uniform. The purpose of the system is to support the NGFR tagline of "Protected, Connected, and Fully Aware", which is achieved by improving situational awareness (SA) for both the user (i.e. first responder) and their incident command for a given incident. SA is intended to be improved by using a variety of sensors (physiological, environmental, CBRNE, etc.) improved communications, and improved geolocation.

These systems can incorporate future functionality without having to redesign the systems. Systems can incorporate a wide variety of COTS and GOTS best of breed capabilities. Systems can be adaptable to responder needs and missions, to support the entire spectrum of agencies in the first responder enterprise, from minimally funded, volunteer agencies to full time, well-funded agencies. System architectures allow for a wide variety of implementations, based on a modular, loosely coupled approach to the system architecture, where system functionality was separated into individual modules: power, I/O, comms, sensor, location, and a controller, which communicate through module specific interfaces.

The controller is the foundation of the system, where all of the central processing, data aggregation, and data storage occurs. The other modules are designed to communicate to the controller through a pair of generic interfaces: a control interface and an update interface. The control interface allows the controller to send commands to a module, whereas the update interface allows the module to send information to the controller. This allows communication to occur both synchronously and asynchronously between the controller and another module. This also allows hardware/implementation details to be encapsulated within a given module. In theory, this would allow for new hardware capabilities to be swapped in and out of the system as long as the module encapsulating those capabilities used the generic interface to communicate to the controller. In this manner, new capabilities could be added to the system will minimal impact to the other modules of the system. For example, a new sensor could be added to the system by either updating the sensor module or connecting a new sensor module to the controller. The intelligence for communicating with and interpreting the new sensor would be encoded in the sensor module, whereas the data storage, data aggregation, and processing of the new sensor information would be in the controller. The controller may need a software update to understand and process the new sensor data, but the interface between the sensor module and controller would not have to change.

The example system approaches can provide a base set/core set of capabilities that would be useful to volunteer agencies as well as full time agencies. A minimal set of key capabilities would support a lower cost of entry to using the new system, while still allowing those users gain improved SA and communicate in the new NGFR manner. They would be able to exchange basic information with other first responders, from better funded agencies, whose systems may be more robust and capable. A volunteer agency may only have basic GPS location, while a better funded jurisdiction, such as LA City, may have indoor location, GPS location, and cell tower location capabilities. However, responders from both agencies could exchange information with each other and incident command because they were using the new NGFR system.

Robust, capable, diverse and instantaneous communications pathways handle the volume and criticality of the information being passed among responders and other personnel. Various subsystems interface with each other to transfer this information. The Responder SmartHub receives information from the responder and other components, processes it locally and sends the processed information to the appropriate destination(s) as defined by responder, agency or incident command business rules.

Responders can initiate and receive voice and data communications from others, using modules and associated input/output (I/O) devices as necessary. Communications can bridge both voice and data communication across disparate pathways (e.g., voice over Land Mobile Radio (LMR) to cellular). This provides more options for responders to be able to communicate with other personnel. In addition to integrating with LMR, a responder or agency can be able to prioritize different types of information being exchanged to ensure high-priority communications take precedence over routine communications. The best communications pathway for the data being transmitted can be identified and selected based upon intelligence and associated business rules. Emergency communications from the responder can be transmitted using the fastest and most reliable pathway(s)—lower priority data can go alternate pathways that may use a store-and-forward process to transmit the information.

In the event of a loss of connectivity, information can be cached locally until the required network is available again. As part of the communications prioritization and caching capabilities, the Responder SmartHub can automatically re-connect to a network or networks when available and control the transmission of cached information. The Responder SmartHub can encrypt all data communications. The Responder SmartHub will allow a responder or agency to configure the various network settings to allow the responder to connect to different/multiple networks, and configure how those connections are managed by the Responder SmartHub system. This enables agencies to set the business rules for how information is routed to/from their various communication systems.

The Responder SmartHub can secure all communications between the initiating responder, IC and other responders. The Responder SmartHub can safeguard the information as appropriate to the classification of information. Communication within the system components can be secured in accordance with the documents classification.

The Responder SmartHub is capable of integrating with on-body (wearable) and off-body sensors. Such sensors may include physiological sensors that measure heart rate, respiration and activity, as well as environmental sensors measuring conditions such as temperature, humidity and air quality, and geolocation sensors. On-body sensors include Global Navigation Satellite System (GNSS) receivers and/or other geolocation sensor technology to track latitude, longitude and altitude coordinates. The Responder SmartHub can be capable of connecting to both wired and wireless sensors. The Responder SmartHub can include a video sensor (camera), which may be worn or handheld (or both, with optional infrared sensitivity) and that can capture imagery geo-references.

The Responder SmartHub on-body ensemble can include a Global Positioning System (GPS) receiver and/or other geolocation sensor technology to track location as latitude, longitude and altitude coordinates. Each off-body module may also include the ability to determine geolocation. This location information will be published by each location-enabled module as part of its data stream. Video sensors can include imagery geo-referencing capability, as well.

The Responder SmartHub module can provide a smart input/output interface, such as touchscreen or voice command, to facilitate input of data, visual output of information, control of applications, and manipulation of data and images. This interface could include speech recognition via headset/microphone, a forearm display/touchscreen or a hand gesture interpretation glove. Output devices include a smartphone touchscreen display, a forearm display or a heads-up-display. This hands-free interface provides the responders with the ability to use their hands in their mission to rescue victims.

A Responder SmartHub module can provide a user interface, such as a touchscreen or voice command, to provide a smart input/output interface to facilitate input of data, visual output of information, control of applications, and manipulation of data and images. The most basic example of a user I/O interface is a smartphone. The interface provides both visual input and allows for operator entry of information and application control via touchscreen. It also allows for basic manipulation of data and images. More elaborate input could be using speech recognition via headset/microphone, a forearm display/touch screen or a hand gesture interpretation glove. Output devices could include the smartphone display, a forearm display or a heads-up-display. Coupling a heads-up display with a headset/microphone and speech recognition software would provide the responder with a completely hands-free interface. Input devices can be paired with display devices (e.g., touchscreens) or can be separate (e.g., voice commands, motion detection/gesture gloves).

Each Responder SmartHub module can include a separate power source. Individual modules can have internal power sources for short-term operation and be able to recharge from an external high-capacity power source (e.g., the system power module) for long-term operations. Module configuration parameters can be retained during power cycles. Responder SmartHub modules can be able to interface to an external high-capacity power source (a power module (PM)) to provide power to all modules for long-term operations. The PM can have rechargeable/replaceable batteries and be capable of providing power to all connected Responder SmartHub modules.

The Responder SmartHub can receive and disseminate multiple types of information exchanges from responders, public safety agencies and command centers, for a variety of information types. The SmartHub's Emergency Situation Tasking Information relates to its capability to receive detailed and complete messages from radio calls, computer aided dispatch (CAD) and other information from public safety access points (PSAP) or IC containing the location, data, descriptions and other information regarding the emergency situation. The responder receives radio calls, computer aided dispatch (CAD) and other event information from the public safety access point (PSAP) or IC. For most responders, this will come in the form of a dispatch message with event location, event data, descriptions and other text messaging information.

The SmartHub's Audio/Video Information relates to its capability to receive emergency alerts via video/audio files containing the 9-1-1 call and/or other information. It also has the capability to download video files stored on a server for viewing on a mobile device. In addition to the dispatch information, the responder may receive (if the agency is so equipped) video/audio files containing the 9-1-1 call, video of the event or suspects, etc.

The SmartHub's Location/Geospatial Information relates to its capability to receive dispatch information containing the incident location in text form, which is information for the responder's geospatial information system (GIS) that places the location of the event on the responder's GIS display. Other geo-located data transmitted to the Responder SmartHub or stored locally will include other responders, fire hydrants, hazards, alarms, etc. The dispatch from the PSAP or IC will contain the location of the event in text form, but the agency CAD system should also provide information for the responder's geospatial information system (GIS) that places the location of the event on the responder's GIS display. The GIS would also be able to display (at the appropriate location) any other geo-located data that was transmitted to Responder SmartHub or stored locally, including other responders, fire hydrants, hazards, alarms, etc.

The SmartHub's Sensor Observation Information relates to its capability to accept any sensor device and any sensor data consistent with the standards described herein. The Responder SmartHub can accept any sensor and any sensor data that adheres to the standards and interfaces identified in this document.

The SmartHub's Alert Information capability can generate and receive alert information that meet the criteria and/or business rules for initiation of an alert. This alert information can be presented to the user visually, aurally and/or haptically. The Responder SmartHub can support local and remote detection of significant information events, as well as configurable methods of alert delivery (e.g., visual, auditory, haptic). The Responder SmartHub can generate and receive alert information triggered by the numerous events that meet the criteria and/or business rules for initiation of an alert. This alert information can be displayed to the user. The Responder SmartHub can support local and remote detection of significant information events, as well as configurable methods of alert delivery (e.g., visual, auditory, haptic).

The SmartHub's Multi-Level Information Prioritization and Persistence capability is to manage and prioritize information to and from the responder at all levels: within the Responder SmartHub, IC and agency level. All information to and from the responders can be logged and recorded for analysis and review. Information that flows to and from the responder can be managed and prioritized at each level—within the Responder SmartHub, at the IC and agency levels. High-priority information that needs to be communicated takes precedence over lower-priority information and should be delivered as soon as technically possible to the responder, or transmitted from the responder to other responders and/or to agency leadership. All information flows to/from the responders can be logged and the information recorded for later analysis and review.

The SmartHub's Event Computation and Communication enables the Responder SmartHub to alert the responder to hazardous conditions that might affect the responder. These include hazardous conditions as detected by sensors (e.g., abnormal heartbeat), from the command officials (e.g., criminal threat), or other responders across a peer-to-peer or wide area network (e.g., locally identified suspicious package). The Responder SmartHub can alert the responder to incoming priority information (e.g., an America's Missing: Broadcast Emergency Response (AMBER) alert, responder down, etc.). The Responder SmartHub can display this information to provide the Responder with context to their surroundings, well-being and system status. The Responder SmartHub can allow a responder to enter new information or commands to the system. Since many responders need to wear gloves during their mission, Responder SmartHub can support hands free-operation for the responder as an alternative to a touchscreen/keyboard interface. In support of hands-free operation, acceptance of information and commands via speech recognition should be integrated into the hands-free device.

The SmartHub's Vertical and Horizontal Modularity enables Responder SmartHub modules to support standard hardware and software interfaces for two types of modularity to maximize flexibility and extensibility: Vertical decomposition into modules providing power, connectivity, computation and user interaction that support all NGFR capabilities; and Horizontal extensibility for capabilities, such as additional sensors, that share Responder SmartHub vertical modules, such as power, to whatever extent is practical.

The SmartHub can use standardized module hardware connectors. The standard hardware connectivity among modules can use connectors currently in use by consumer electronics, including the Universal Serial Bus (USB), USB-C, mini-USB, High Definition Multimedia Interface (HDMI), mini-HDMI and mini-phone connectors. In addition, manufacturer-specific connectors (e.g., Apple iPhone 6 "Lightning" connector) may be used to provide connectivity for specific devices.

The SmartHub can support Personal Profiles, which can be persistent. Responder SmartHub enables users and/or system administrators to create (e.g., based upon roles and permissions) personal settings and preferences (e.g., an individual user profile), the ability to create specific role-based permissions, and the ability to transfer these persistent profiles from one Responder SmartHub controller to another. User profiles can be centrally managed by the public safety agency. Roles are expected to be unit, agency and jurisdiction-specific, and user profiles for responders will align with the role or roles to which they can be assigned.

Regarding form factors, the responder SmartHub modules can conform to a number of standard physical form factors (e.g., NFPA has specific guidance on physical devices for Responders) to enhance interoperability with responder clothing, equipment and interchangeability between products. Size, weight, power and form factor constraints will be dependent on responder equipment requirements and usability studies. The final solution format is the responsibility of the solution providers. Responder SmartHub modules can conform to a small number of standard physical form factors to enhance interoperability with responder clothing, equipment and interchangeability between products.

It is understood that different agencies will have different levels of cybersecurity implemented in their agency networks. The SmartHub can be adapted to accommodate the varying cybersecurity requirements as needed in different applications.

Mobile identity user management is also supported, and involves defining and managing roles and access privileges of individual users of devices and networked systems, and the circumstances in which users are granted (or denied) those base privileges and escalated permissions. The primary objective of identity management is to verify and enforce one identity per individual. Once that digital identity has been established, it must be maintained, modified and monitored throughout each user's access session. Identity management grants contextual access to the right device and system resources to properly authenticated users. Any system's user identity management system must be able to define users and their identification attributes, and to securely store or share this data to other system components when necessary.

A challenge for some agencies is the use of shared devices, where a device is not attached to an individual but is shared among several individuals. Any User Identity Management solution will have to account for establishing user identity for shared devices.

Device identity management is supported, and involves assigning Unique Identifiers (UID) with associated metadata to sensors, devices and objects, enabling them to connect and communicate with assurance to other system entities over the network. In conjunction with user identity management, these items are a requirement to manage connections between users, devices and other system components. Mobile device registration, or enrollment, is the first phase of system management. The system can enable secure communications with the Mobile Device Management (MDM) server using specific information for the user and his/her device that is established prior to the enrollment process. The enrollment service can verify that only authenticated users and their assigned devices can access and be managed by the system.

The enrollment process can include the following steps: Discovery of the enrollment endpoint: This step provides the enrollment endpoint configuration settings; Certificate installation: This step handles user authentication, certificate generation and certificate installation. The installed certificates will be used in the future to manage client/server mutual authentication and secure communications; and Device provisioning of approved apps.

Data and Communication Security is supported. Information security (INFOSEC) and communication security (COMSEC) govern how data and communications containing valuable information should be stored, transmitted and used. These security functions are designed to mitigate the risk of disclosure of sensitive data on a device and in the system, and to mitigate the risk of unauthorized access, whether through interception or compromise, to plain text or encrypted communication payloads.

SmartHub data can be encrypted to the (AES) 256 level when stored on-body and when sent off-body. Encryption of data ensures data read by unauthorized users retains a level of security by obfuscating the data. It helps ensure the integrity of data—the assurance that the data has not been changed or tampered with.

Physical Security is also supported. Physical security for mobile devices consists of analyses and recommendations to reduce and/or mitigate risks due to physical break-ins, loss of a device or theft of a device, and to plan for the consequences of loss or theft. It is the responsibility of the authorized users of the devices to secure and protect the devices and authorization factors for the devices while they are officially in their possession (i.e., assigned to them).

Equipment providers and agencies can ensure physical security through use of one or more of the following: tamper prevention, keeping devices up-to-date and in operational condition, securely wiping data, closing and removing access to debugging capabilities (e.g., USB or serial debugging ports) once placed in operational capacity, continual monitoring and policing of access to wireless networks, and developing procedures to report suspicious activity if a device is lost or stolen.

Encoding, Interfaces and Protocols address various protocols and formats. Data Encoding is supported. Information encodings define the content of messages by which system components exchange information. Embodiments can use various types of semantics and syntax of information and information processing. It defines conceptual schemas for geospatial information and methods for defining application schemas. The conceptual, or base, schemas are formal descriptions of the model of any information. Application schemas are information models for a specific information community, built from the conceptual schemas. Information encodings then define the content of messages by which system components exchange information. This encoding may include: Geographic Markup Languages (GML); Observations and Measurements (Open Geospatial Consortium (OGC) Observations and Measurements); Sensor Markup Language (SensorML); Extensible Markup Language (XML); Open Geospatial Consortium Web Service (OWS) Context; Catalog Service for the Web (CSW) Catalog Record; JavaScript Object Notation (JSON); Geographic JavaScript Object Notation (GeoJSON); Sensor Networks: Sensor Network Reference Architecture (SNRA); International Organization for Standardization (ISO) 8601; Emergency Data Exchange Language (EDXL) standards; and National Information Exchange Model (NIEM).

For an example SmartHub, the recommended data encoding for sensor data is JSON. For enterprise system-to-system encoding of data, the recommended data encoding is EDXL Distribution Element (DE). For alerting, the recommended encoding is to use EDXL Common Alerting Protocol (CAP).

Regarding Machine to Machine Interfaces, the Responder SmartHub can communicate via the following machine to machine (M2M) interfaces: Agency computer aided design (CAD)/situational awareness (SA)/GIS systems; Agency communications systems; Agency data systems; Agency audio/video systems; Sensors; and Public safety cloud (if available).

Regarding Human-Computer Interfaces, the Responder SmartHub vendors are expected to provide user interfaces that employ evolving technology (e.g., heads up display (HUD), capacitive touch, voice recognition) and meet human systems interface (HSI) best practices. Detailed descriptions of the interfaces are provided later in this document.

Regarding Web Services and open Geospatial Consortium, the Open Geospatial Consortium (OGC) Web service standards can be used to handle data types, standards and other geospatial information sources. These standards represent services and protocols that may be applicable in operational contexts, which use or process information described in the Information—Models and Encodings Section. As Web services, these standards typically rely in turn on fundamental web standards such as Hypertext Transfer Protocol (HTTP). Below is a representative list of standards; however, additional standards may be identified as necessary to realize a given functional capability: OpenGIS® Web Map Service (WMS); OpenGIS® Web Feature Service (WFS); Catalog Service for the Web (CSW); Web Processing Service (WPS); Sensor Observation Service (SOS); Sensor Things Application Program Interface (STAPI); and Sensor Notification Service (SNS).

Regarding communication protocols, example communications layer protocols can provide message handling, queuing, mesh networking, device discovery and other capabilities, particularly in support of the local networks involving inexpensive, low-power sensors. Protocols are typically defined and implemented in layers, so that choice of protocol in one layer (e.g., Bluetooth low energy (BLE) versus Long Term Evolution (LTE)) does not constrain choices in other layers (e.g., HTTP versus message queuing telemetry transport (MQTT)). A critical vertical interface occurs between protocols that support Internet Protocol (IP) packet transmission with transmission control protocol (TCP) or user datagram protocol (UDP) signaling, and protocols that operate on top of the IP protocol such as HTTP. A critical horizontal interface occurs between local Internet of Things (IoT) protocols that do not support IP packets (e.g., Constrained Application Protocol (CoAP), Data Distribution Services (DDS), +/-BLE) and those that do. A representative selection of protocol standards is listed below, but additional standards may be identified as necessary to realize required functionality: HTTP; TCP/IP; IPv6 over Low Power Wireless Personal Area Networks (6LoWPAN); BLE; ZigBee; Extensible Messaging and Presence Protocol (XMPP); MQTT; CoAP; and DDS.

Figure 3:
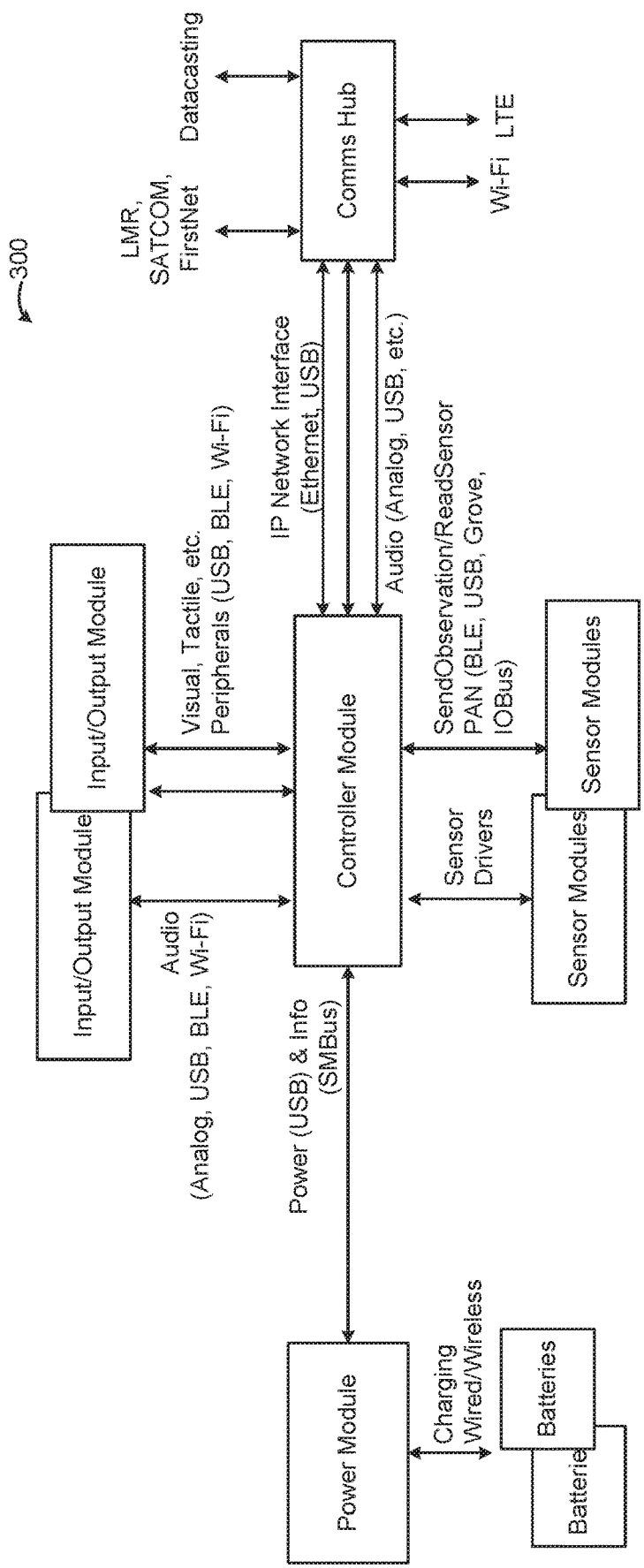
FIG. 3 illustrates a wearable on-body first responder system according to an example embodiment.

FIG. 3 illustrates a wearable on-body first responder system 300 according to an example embodiment. An example responder SmartHub Wiring Diagram Engineering Design is illustrated. Example technologies, practices and solutions provide the functionality of each module, interactions among them, and interactions between each module and system and subsystem at the IC, PSAP and agency level. Components and interfaces form the building blocks of the system without necessarily constraining the technology platforms, overall system organization or physical distribution of an implementation. The high-level component architecture for Responder SmartHub is shown in FIG. 3.

There are five basic elements of the example architecture embodiment shown in FIG. 3. The Controller Module is the central component of Responder SmartHub and supports routing, persisting and processing data, as well as interacting with the other core Responder SmartHub modules and mediating their power requirements. The Controller Module supports standard data services and applications, as well as manages the federation and synchronization of data with other personal, field and cloud sensor hubs involved in an incident response. To perform these functions as a wearable device, the Controller Module also maintains and uses the wearer's personal profile information to customize the Responder SmartHub experience and identify the source or subject of sensor information being transmitted to others. The controller is expected to provide location information for the responder and to provide that location information to other responders. The controller may be equipped with limited communications capabilities (e.g., Wi-Fi, LMR, Bluetooth, Long Term Evolution (LTE), etc.), or those may be all contained within the communications hub.

The Communications Hub Module (Comms Hub) can handle various communications. Because communications between the initiating responder, other responders, the IC and the agency's PSAP are essential for responders to perform their required duties, another primary Responder SmartHub module is the communications hub module or Comms Hub. The Comms Hub is expected to handle connectivity, voice communications as an information type, and data through the IP packet level for the responder using LMR and other local or wide area communications networks. The Comms Hub should also provide routing of communications between the responder and the attached communications systems based upon business rules determined by the agency, available bandwidth, urgency of communications, communication systems connected, etc.

Regarding Voice Communications Provisions, the Comms Hub supports the connection of available voice communications pathways such as LMR, cellular and Voice Over Internet Protocol (VOIP) to a single voice I/O device such as a headset with microphone. Voice-to-text and text-to-voice conversion may occur either in the Comms Hub or the Controller Module.

Regarding Data Communications Provisions, the Comms Hub will provide seamless Internet Protocol (IP)-level connectivity and prioritized packet transmission/reception across wireless data networks available to the responder.

Regarding sensors, there are numerous services for sensors to provide. Base modules can include sensors for physiology, environment and imagery. Sensors will use a variety of protocols and wired/wireless local connections to deliver sensor data to the Controller Module. Physiology Sensors can provide accurate readings of one or more responder health and fitness indicators such as temperature, pulse, respiration, glucose, blood pressure and blood oxygen levels. Environmental Sensors can measure environmental phenomena relevant to health and safety such as temperature, noise, wind speed, level of atmospheric contaminants, etc. Some environmental sensors may be stationed apart from the responder and still deliver readings to the responder's or another appropriate Controller Module. Imaging Sensors can include bodycams, but may also be independently sited and support geo-referenced imagery sources using GPS and Inertial Measurement Unit (IMU) data.

Regarding User Input/Output, User input/output devices (I/O) will provide various approaches by which busy responders will be able to receive information output from the Controller Module and input information in turn. Each module will support one or more of graphical, text, voice, and haptic (touch) input and/or output devices.

Regarding Graphic I/O, graphical output is a quick and easy way to pass necessary information to the user, especially GIS-enabled or other visual information. Graphic input can be accomplished in many ways, with a mouse, by touch or with gestures that may be specific to the responder, his task, equipment, environment and conditions.

Regarding Text I/O, text includes keyboards and text-only outputs such as scrolling text displays, digital signage or text-to-speech translation.

Regarding Voice I/O, this includes devices for voice communications with other people and for interacting with Controller Module applications using voice. These will continue to coalesce into one voice medium.

Regarding Haptic I/O, this includes outputs such as buzzers and shakers, as well as touch inputs that provide touch feedback.

The Power Module (PM) can provide power to the other Responder SmartHub modules as managed by the Controller Module. It will provide the status of its reserves, power usage of the other modules and time to recharge to the responder. The PM will be able to be recharged or replaced independently of the other modules.

Wired and wireless Power Provisions and/or monitoring are supported. Most power will be provided directly to other modules by various wired connections, including USB, mini-USB and others. Wireless Power Monitoring can be supported based on sensor and hybrid modules having their own power supplies, but the Controller Module and PM can still be responsible for monitoring their rate of power usage and time to recharge respectively. Recharging of the PM can be provided either via 12 volts direct current (VDC), USB (5 VDC) or 110 volts alternating current (VAC). Recharging off-body (i.e., when removed from the responder) should be in a drop-in or inductive charger to reduce the need to plug/unplug wires.

Figure 4:
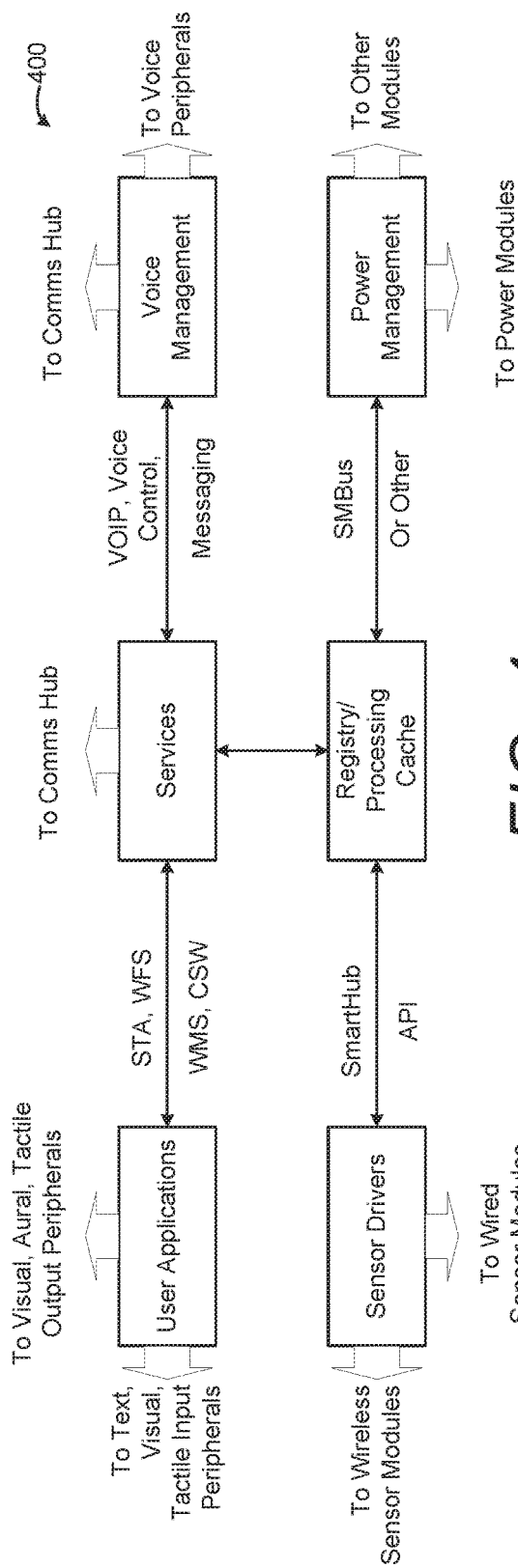
FIG. 4 illustrates a first responder controller subsystem according to an example embodiment.

FIG. 4 illustrates a first responder controller subsystem 400 according to an example embodiment. Responder SmartHub Controller Subsystems are illustrated. API relates to application program interface. CSW relates to catalog services for the web. SMBus relates to system management bus. SOS relates to sensor observation service. STA relates to sensor things API. VOIP relates to voice over internet protocol. WFS relates to web feature service. WMS relates to web map service. WPS relates to web processing service.

Figure 5:
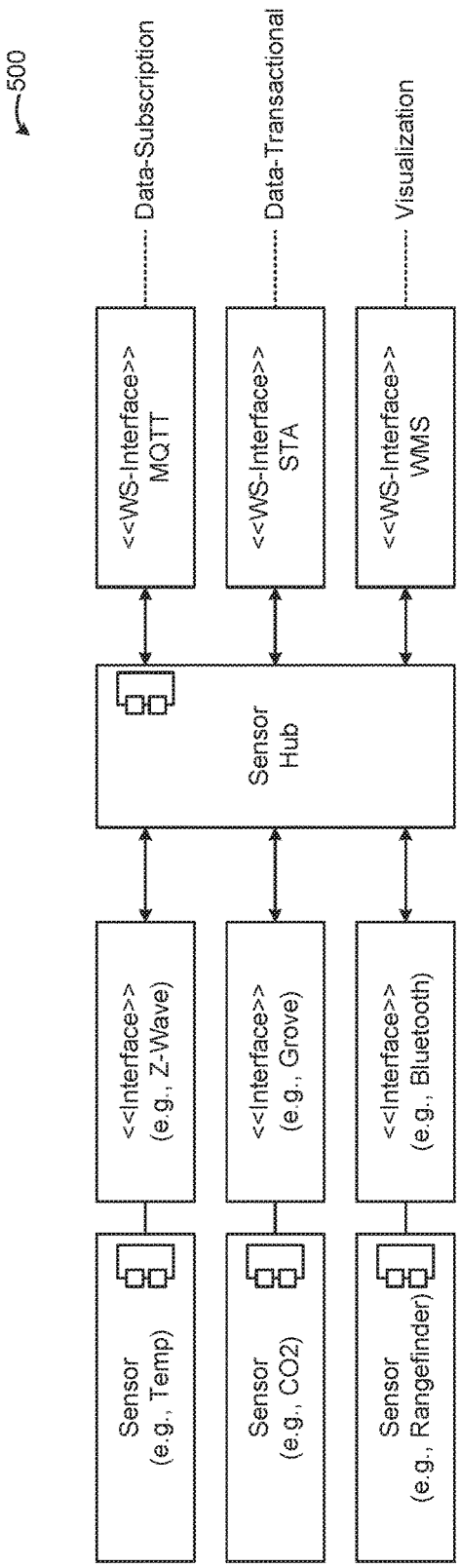
FIG. 5 illustrates a sensor hub according to an example embodiment.

FIG. 5 illustrates a sensor hub 500 according to an example embodiment, including an example SensorHub Module and services. In an example embodiment, the controller can provide sensor management and effectively operate as a sensor hub. The controller houses the sensor hub application/service that interfaces with other sensors and provides a discoverable, consistent, open standards-compliant web interface.

Discoverable means that the sensor hub is available for other systems to access. Sensor hubs exist as both field hubs (software located on a Responder SmartHub Controller) and regional/cloud hubs (software located centrally for an entire agency). Sensor hubs can be synchronized for information redundancy, bandwidth mitigation and persistence of information. A sensor hub provides a flexible way to deliver information captured from the responder to be delivered to the individual responder and to all authorized users and systems, independent of their specific implementation architecture. This means any responder can obtain information from other responders or other deployed sensors, thus increasing situational awareness. A sensor hub deployed on the responder in specialty equipment, or in other equipment such as a mobile phone or tablet, connects to the central infrastructure and provides a consistent interface to deliver information to all responders. Responders will, upon donning their Responder SmartHub equipment, enable the sensor hub, and it will register with the incident management infrastructure. From then on, the responder is a sensor platform running a sensor hub service capable of delivering information to a range of authorized users.

The sensor hub can be provided in the form of an application or service running on a Responder SmartHub controller. Alternately, it could be an application or service running on a sensor platform and serving other sensors, or a separate module managing a large number of sensors. Sensor hubs can be arranged in a hierarchical form, with local sensor hubs carried by the responder and regional sensor hubs located at the IC, agency or even public safety cloud level, and managing the data from multiple local sensor hubs.

A sensor hub can interface to sensors via a number of proprietary interfaces and delivers data via a number of OGC/IoT compliant services. The current mapping of sensor hub conceptual interfaces to open standards is shown in FIG. 5. Sensor hubs have been tested and demonstrated in experimentation using several standards. The web service interfaces supported include: STAPI 1.0 (mandatory); MQTT 1.0 (mandatory); and WMS (optional).

Figure 6:
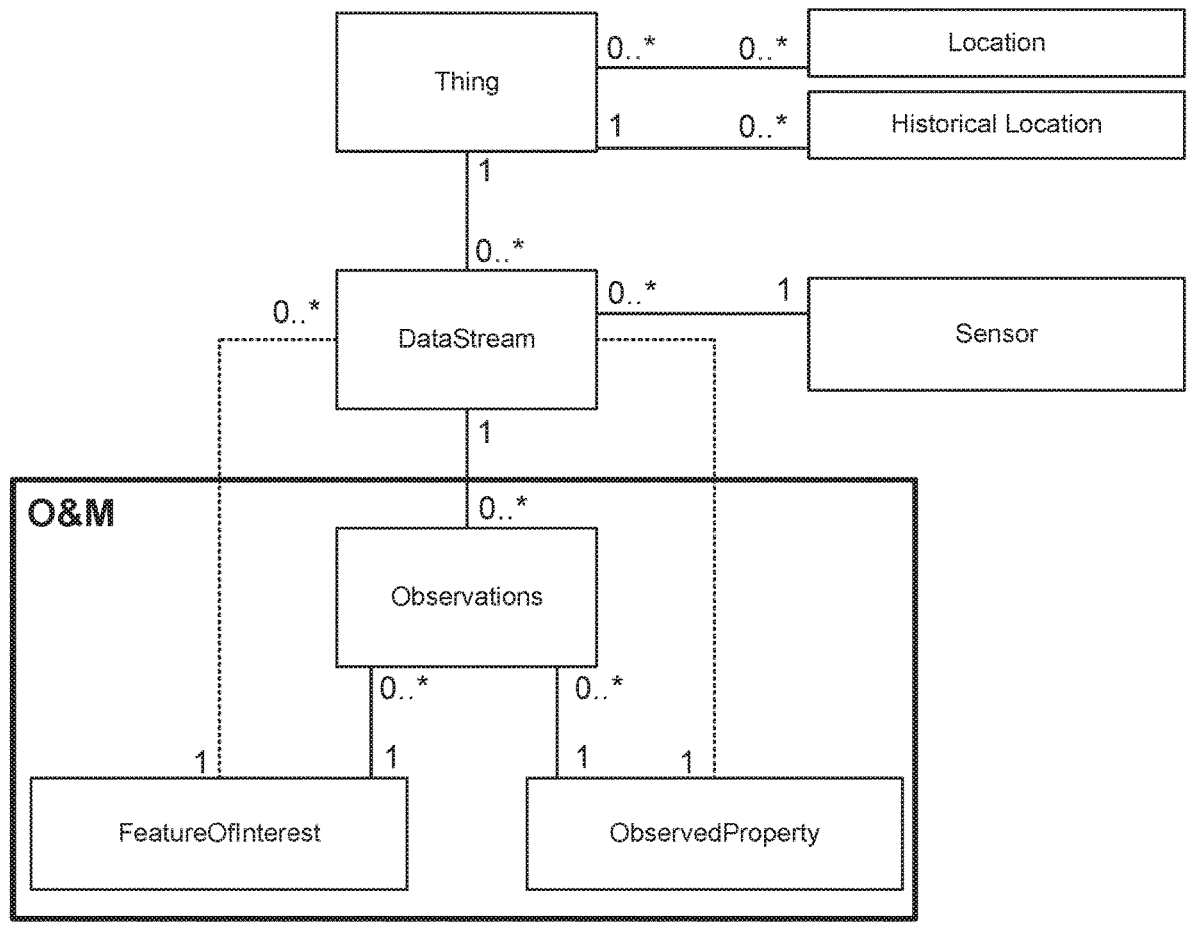
FIG. 6 illustrates a sensor hub interface information model according to an example embodiment.

FIG. 6 illustrates a sensor hub interface information model 600 according to an example embodiment. The SensorThingsAPI (STAPI) offers the opportunity for clients of the sensor hub to query the object of interest, the observations and the observed properties, as well as the type of sensor. This offers a very general access model. In addition to transactional standards, sensor hub supports subscription-based interfaces, which provide immediate updates based on either changes in value or values exceeding a threshold. Within the sensor hub, the standard used message-based communication is MQTT, which has a close relationship with STAPI.

In example embodiments, two modes of operation are possible, and a sensor hub instance would be able to handle both: 1) A sensor hub includes specific interfaces to existing sensor protocols (Z-Wave, Grove etc.). It is therefore an 'adapter' that standardizes the sensors and typically offers a read-only web service interface. 2) Sensor systems are themselves modified to be able to interact with the sensor hub via the STAPI interface. They, as a STAPI client, can write data into the sensor hub, which provides capability such as information caching, etc. STAPI offers the opportunity for clients of the sensor hub to query the object of interest, the observations and the observed properties, as well as the type of sensor. This offers a very general access model as shown in FIG. 6, STAPI Information Model.

Example embodiments of the Responder SmartHub support interactions with a sensor hub catalog, e.g., via a publishing wizard. Support for features such as registration, update, de-registration, and the like, enable the controller/SmartHub to establish connections with, and otherwise load/interact with various modules/sensors, including those that are newly developed subsequently. Accordingly, the example systems are flexible and modular, and can adapt to newer and evolving modules as they are developed and support is added to the sensor hub catalog to provide drivers and other support to the controller.

An example capability of the sensor hub is sensor discoverability, including on-body and off-body sensors. For this to work, a responder's sensor hub must be registered with a sensor hub catalog. A key element of an effective NGFR architecture is an awareness by all users of the deployed human resources so they can be effectively used and protected. Critical in this process is the registration of the systems deployed on a responder and information about their identity. For equipment deployed on a responder, each responder will have a unique identifier. This identifier will be entered and can be used to configure equipment deployed on a responder. A controller identifier format needs to be defined, but the primary goal is to identify the responder device on which the sensor hub is deployed.

Registration and discoverability is performed either in the sensor hub or split between the sensor hub and the hub catalog. The sensor hub/hub catalog combination ensures that the sensors for all responders on-scene that are capable of registration will be registered and discoverable. The example CSW Catalog Record described above can specify the minimum output standards that sensors should be ready for the catalog, and this becomes the minimum set of attributes that a sensor catalog should contain. The overall registration process is shown in the sequence diagram below, FIG. 6. When a sensor hub boots and comes online, it sends a request to the publishing service (potentially a regional Sensor Hub, a WFS or a CSW), which then harvests the sensor hub capabilities and populates the catalog as necessary. The publishing service returns the identification (ID) of the entry (as a Universally Unique Identifier (UUID)) so that the sensor hub can update or remove the entry as its status changes.

This workflow depends on the sensor hub knowing to what catalog or publishing service it needs to connect. An alternative is an external trigger, which performs the 'add' request, which might be relevant in some circumstances.

A sensor update process can be initiated by the sensor hub requesting an update using the ID returned during the registration process. So it can be similar to registration add, but command to update instead of add.

A sensor de-registration process similarly can occur when the sensor hub shuts down. They will initiate a de-registration process using the ID returned during registration. The result is the hub catalogue will only show currently registered (and, by implication, operational) sensors.

While de-registration could remove the sensor hub from the catalog (in an example method), it could potentially just mark it as "off-line" or "deleted" in the catalog, along with all details of the sensor, when it was on-line, etc. This is a decision related to the permanence of the sensor and the need to keep records of sensor availability/use. Implementation of the catalog should poll any registered services at a configurable rate, and change the status of the service from online—offline or vice versa if required.

Support for client applications and the initial applications can be provided by the sensor hub module. It includes the specifications for the interactions between users and applications, as well as applications and services. These descriptions address questions of browser versus native applications, use of local APIs versus Web services and access to remote services. In example embodiments, applications can be provided by commercial vendors to provide functionality.

Applications can provide various functionality such as: Situational awareness; Sensor hub; Collaboration; Messaging (Short Message Service or SMS); E-mail; Mapping; CAD interface; Hazardous Material (HAZMAT) information; Medical treatment information; and Sensor management.

Regarding Sensor Drivers, the Controller Module can host the various drivers used to interface with the multiple sensors, Input/Output (I/O) devices and other modules used by first responders. Because there is no standardized sensor driver that will work with all sensors, each sensor manufacturer will have to provide a compatible driver for its associated sensor that runs on the controller's operating system. These drivers may be installed on the controller along with the corresponding applications or bundled separately by the agency and delivered as a single driver package.

Sensor manufacturers may build libraries in commonly used programming languages such as Java, Python and C, compatible for Android, Apple iPhone Operating System (iOS), and other operating systems, so they can easily be integrated into the NGFR Architecture.

Regarding Sensor Hub System Administration, the Controller Module administration functions allow authorized personnel, based upon permissions, profiles and roles to view the status of an operational sensor hub, make changes to its internal configuration, and set up and deploy a sensor hub. These administration functions are an integral part of the sensor hub. They enable the initial deployment and to allow reconfiguration as needs and priorities change. The responder should be able to access the administration functions using any network capable device, such as a laptop, tablet or phone by using any available web browser.

Regarding Sensor Hub Module Status, the Controller Module can present the user or administrator (based upon roles and permissions) with a high-level status of all pertinent information. The status can include, but is not limited to: Software version; Uptime/downtime statistics; Media Access Control (MAC) Address; IP Address; Host; Service Universal Resource Locator (URL); Storage space remaining; Status of all connected devices; and Power details including: The state of the device (i.e., plugged in, running on battery, etc.); Power status of all connected devices, Percent of battery remaining; and Estimated operational time remaining.

Regarding User Management, privileged users can create and manage users and their associated permissions. Sensor hubs may operate in disconnected operations, so local user management is important. Permissions may be used to limit access to a hub, to specific services or data within a service.

Figure 7:
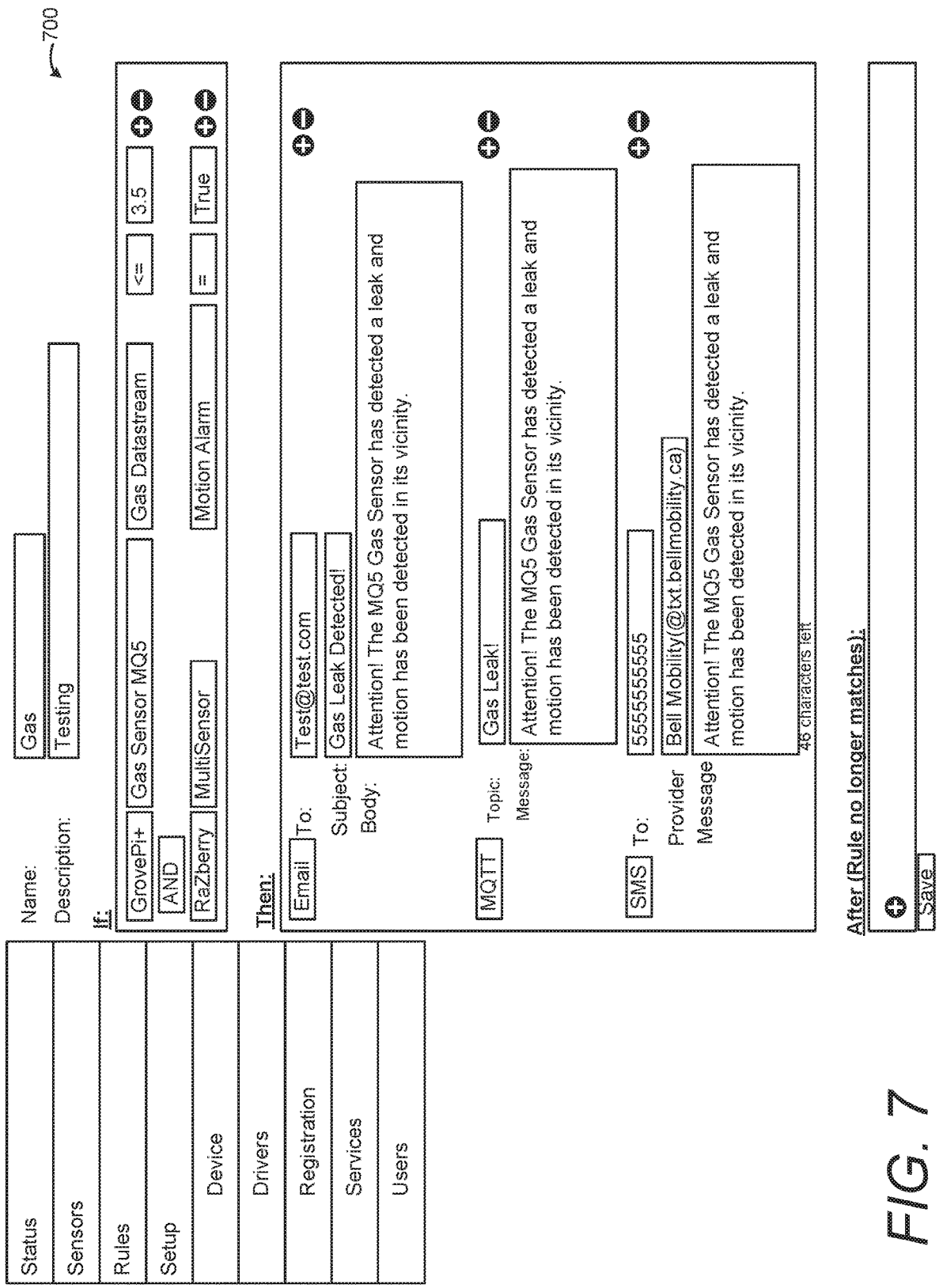
FIG. 7 illustrates a sensor hub rules management interface according to an example embodiment.
Figure 8:
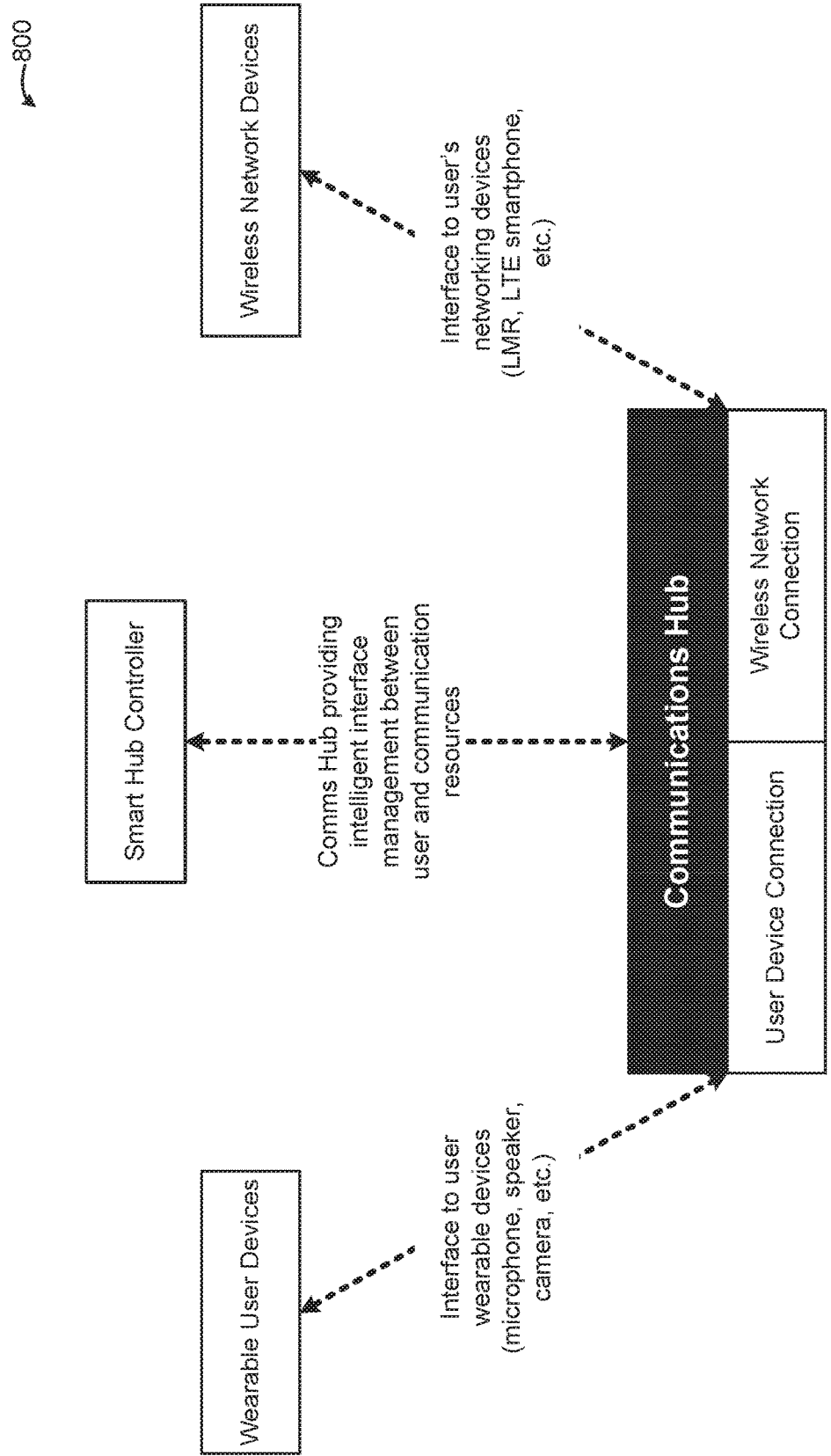
FIG. 8 illustrates communications hub components according to an example embodiment.

FIG. 7 illustrates a sensor hub rules management interface 700 according to an example embodiment. Regarding Rules Management, the Controller Module can allow a user or administrator (based upon roles and permissions) to create complex Boolean logic rules that, when matched, can trigger the hub to perform an action. Actions can include tasking devices or sending alerts by a variety of channels including email, text messages and MQTT topics. For example, as depicted in FIG. 7, a sensor may detect certain levels of gasses, and automatically issue notifications to the configured channels alerting authorities of the issue. Email and text support allow for existing devices without specialized applications to receive the alerts, while MQTT delivers alerts to applications incorporating MQTT clients, e.g., as shown in FIG. 8. MQTT topics assist by more easily identifying the content of sensor messages in an organized fashion; for example, certain data transmissions can be labeled as heart rate or humidity readings and assigned to Responder A and Responder B. It makes it easier to work with, prioritize and therefore manage.

Regarding Driver Management, the Sensor Hub can allow a user or administrator (based upon roles and permissions) to upload and configure drivers that connect sensors and devices to the hub. Some sensors and devices may have the capability to register directly with the services running on the Sensor Hub; however, some devices may just be connected directly to the hub, and therefore the hub will be responsible for making their data available in the services. This process may require manual configuration, such as by providing a list of available drivers and options to configure a driver, as well as a list of ports of the device and drop-down menus to choose a configured device (as indicated by the driver) that is associated with a given port.

Regarding Connection Management, Users or administrators (based upon roles and permissions) can configure any external connections from the hub to other systems and hubs. Specifically, the hub should allow the user to configure to the catalog(s) with which it will be registered, allowing it to be discovered externally. The hub will also allow the user to configure to other hubs where it will push its data and prioritize the data transfer, such as by specifying a cloud-based URL and login information. This is particularly useful to push data from a field hub to a cloud hub.

Regarding Data Management, the Controller Module can allow a user or administrator (based upon roles and permissions) to view the current status of the device storage by indicating how much space is used and how much is still available. The user or administrator should be provided options for cleaning cached data older than a specified date and time, or to allow data to only be maintained for a specified period of time. The user or administrator should also be able to clear specific sensor data or types of data. The sensor hub should allow a user or administrator to prioritize the transfer of data. The user or administrator should be able to indicate the importance of specific types of data. For example, the user or administrator may want audio to take precedence over video; however, gas readings may take precedence over audio. The user or administrator should also be able to specify permitted reductions to data if they are necessary. For example, a user or administrator may want to reduce video from 30 frames per second (FPS) to 10 FPS if bandwidth is an issue, or to push sensor readings less frequently than they are captured.

Regarding Device Configuration, the Controller Module can allow a user or administrators (based upon roles and permissions) to modify any device configuration settings. These settings may include: Hostname configuration; Email configuration; MQTT configuration; Short Message Service (SMS) configuration; Fully Qualified Domain Name (FQDN); Date and time configuration (based upon agency time standard); and Default geospatial location of the device (if no GNSS is present). The administration functions are part of the core module. They require that network capable devices are able to reach the administration web application via a web browser. The sensor hub will retain any configuration changes and write them to persistent storage.

In addition to using a controller module, a Communications Hub Module can be used. The Communications Hub module (Comms Hub) can be provided as a component of Responder SmartHub, and works with the Controller Module to provide the functionality of interconnecting multiple wearable user devices (microphone, speaker, cameras, etc.) with communication devices (e.g., LMR radio, FirstNet and commercial cellular smartphones, Wireless Fidelity (Wi-Fi) and other networking devices).

The Comms Hub enables the responders to manage voice and data services with a minimum of user distraction and inputs. Among the services the Comms Hub will help the user to interconnect will be: Voice service: push-to-talk (PTT), "simplex" voice calls and full-duplex voice calls; and Data service: body-worn camera, GNSS, body-worn sensors and smart glasses.

FIG. 8 illustrates communications hub components according to an example embodiment, and provides a more detailed view of the functional components of the Comms Hub. The Comms Hub communicates with the Controller Module within the Responder SmartHub system to define which services will be subject to monitoring and configuration changes by the Controller Module. Some of the high level controller functions of the Comms Hub include: Communication link status monitor; User data cache; Interface status; Resource priority; and Service override.

A Communication link status monitor enables the Comms Hub to monitor the status of each of the connected network devices and the associated service level capability to determine the best connection link for user voice and data services.

A User data cache provides the ability to cache user data in response to an outage of communication network resources.

An Interface status enables the Comms Hub to monitor the status of each of the available connection interfaces (A, B and C) and provide status of available wired and wireless ports to connect to the Comms Hub.

Regarding Resource priority, if a conflict for interface resources arises, the Comms Hub assigns the interface resources to the service(s) having a higher priority level to ensure critical data delivery. Regarding Service override, the Responder Controller Module has the ability to override existing or pending user data traffic and instead enable designated interface(s) and communications resource(s) to carry designated priority-based voice and data traffic.

Voice Design is supported. The Comms Hub provides the interfaces to carry voice traffic to and from the users. In conjunction with the Responder SmartHub Controller Module and other elements, the Comms Hub uses a variety of communication network resources, as well as a plurality of body-worn devices, to carry out voice communications. The following features as illustrated in FIG. 8 provide the needed interfaces and control functions to support voice traffic within the Responder SmartHub architecture: Interface A, Interface B, and Interface C.

Regarding Interface A, Comms Hub will provide the following methods to connect/pair with the user body-worn devices: Bluetooth—including versions 4.2 and above; Wi-Fi—802.11a/b/g/n/ac; USB—all approved versions; Audio jack (3.5 mm Tip-Ring-Sleeve (TRS) jack/3.5 mm Tip-Ring-Ring-Sleeve (TRRS) jack); and Optional: Wired connection using standard interface protocol (e.g., Ethernet).

Regarding Interface B, Comms Hub control functions for data and/or voice traffic; Mission-critical voice (PTT) via public safety LMR and FirstNet networks; Non mission-critical voice (PTT) via commercial cellular networks; and Commercial cellular-grade voice. Embodiments of Interface B also can support Mission-critical data and video via the FirstNet network; Non mission-critical data and video using commercial cellular networks; Datacasting network to distribute IP and broadcast-based data files.

Regarding Interface C, Comms Hub interface to network devices (non-inclusive); Bluetooth; Wi-Fi—802.11a/b/g/n/ac; USB—all approved versions; and Optional: Wired connection using standard interface protocol (e.g., Ethernet).

Examples of supported device types include User: push-to-talk microphone, speaker, ear bud with microphone, body-worn sensors, body-worn camera, smart glasses with display capabilities. Network device: LMR radio (e.g., conventional, trunked, Project 25 (P25) LMR), FirstNet wireless device, commercial cellular device, satellite radio, mobile ad-hoc (meshed) digital radio, and/or datacasting receiver and dongle.

Regarding Data Design, the Comms Hub provides the interfaces to carry data traffic to and from the users. In conjunction with the Responder SmartHub Controller Module and other elements, the Comms Hub uses a variety of communication network resources, as well as a plurality of body-worn devices, to carry out data communications in support of situational awareness and decision-making.

Regarding Physical Design, multiple Responder SmartHub modules can be supported on a responder, such as by wearing two modules distributed such that one is carried on each hip, or other various combinations of sensors/modules/controllers. A prototype Responder SmartHub includes combined controller/sensor hub/sensors. An integrated Sensor Hub/GPS receiver/body camera can include an attached battery. A smartphone could also act as a sensor hub platform, with the appropriate applications/services running and using either onboard sensors or connected to external sensors via onboard communications (e.g., Wi-Fi, BTLE or LTE).

The Comms Hub physical attributes encompass the following (non-inclusive) features: Ruggedization: meet National Fire Protection Association (NFPA) 1802 guideline and NFPA 1800 guideline. Comms Hub unit: Standalone unit, or maybe integrated as a part of an electronic device such as a smartphone. Visual Display: Display indicator to provide status information of the Comms Hub operation. Emergency Button: Provide a "panic" button to send an urgent message (voice and/or text message) to incident command of impending danger or hazard condition.

There are numerous different types of sensors developed to support responders. They use a variety of protocols and wired/wireless connections to deliver sensor data to devices such as the Controller Module. Sensors should be developed with different applications in mind, for example, some may be on-body and therefore associated with a specific first responder (example: body camera or heart rate monitor), a similar sensor may be deployed off-body at the incident site (example: drone camera), and a similar sensor may be accessed from agency networks (example: camera mounted to a building on a street corner).

The location sensor is responsible for providing spatial location and orientation for the controller and any connected sensors. The location sensor will allow for tracking of personnel and location-equipped sensors, and will therefore provide real time situational awareness to those who need it. It will allow users to not only see their locations, but the locations of their peers, deployed sensors, and location-equipped units (e.g., vehicles, aircraft, boats, etc.). It is possible to use the location of the various sensors to create geo-referenced alerts. For example, if a specific location-equipped sensor detects a gas leak, all the personnel in its vicinity can be instantly notified. The location sensor should run autonomously and seamlessly switch between location sources (if available) to provide the most precise location possible. The only interaction with a user should be to manually enter a location or to disable tracking, if the need arises.

Regarding Tracking Control, the location sensor should allow the user or administrator (based upon roles and permissions) to easily enable and disable tracking, and view or delete tracking data.

Regarding Manual Location Entry, the location sensor can allow the user or administrator (based upon roles and permissions) to manually enter a relative location for those instances where automated locations cannot be provided. This location should not be used for precise positioning. The manual location configuration screen for sensor hub can provide text entry boxes to receive GPS coordinates, e.g., longitude and latitude specified in decimal degrees.

Regarding IP Geolocation, the location sensor can automatically provide an IP geolocation to the sensor hub when network connectivity is available. This location should not be used for precise positioning.

Regarding GNSS, the location sensor can automatically provide a GNSS location when a signal is available. This location should include latitude, longitude, precision, timestamp and altitude.

Regarding Cellular Telephone Location, location data obtained from cellular telephones can, if so equipped, include assisted location data in addition to GNSS location data.

Regarding Other Location Services, the system can be able to accept location data from other location services (e.g., in-building, Wi-Fi based, Bluetooth beacon based, other beacon type based, etc.) and pass it on to the situational awareness applications. The situational awareness applications may need to de-conflict location information for a device coming from two sources if the information does not match within configurable parameters.

Regarding Orientation, sensors can provide observations that are directional in nature. These include, for example, video and imaging cameras, wind direction, laser rangefinders, and acoustic detectors, just to name a few. It is important to provide an orientation suite of sensors (e.g., accelerometers, inertial momentum units and geomagnetic sensors) that provide accurate orientation for the sensors.

Regarding Location Message Transmission Frequency, in order to reduce bandwidth requirements while still providing the necessary location data, the following strategies can be used by various embodiments: Speed sensitive—transmit location messages at a frequency based upon the sensor's speed—a controller on a stationary officer directing traffic or a firefighter controlling a pumper would transmit less frequently than an officer in foot pursuit or a firefighter advancing on a fire. Status sensitive—transmit location messages at a frequency based upon a responder's status. A controller on a responder "out for a meal" would transmit less frequently than one on a responder assigned to a call for service.

Regarding Sensor Drivers, the location sensor does not require any specific sensor interface. The sensor hub driver function allows support to any sensor device interfaces that make use of the existing connection ports (USB, Bluetooth, etc.). For example, a USB GNSS that supports National Marine Electronics Association (NMEA) 0183 or a Garmin Virb that connects over Wi-Fi and provides a proprietary location interface could be used. The driver needs to know the sensor is a location provider. It is also possible for the location sensor to push its location data directly into the sensor hub by using the SensorThings service. This process would not require a sensor hub driver. The location sensor should retain the latest location so it can be retrieved at any moment without having to wait for a new location observation to occur. The sensor hub driver facility allows for any device to act as a location provider. For example, a user's GNSS sports watch or a GNSS-enabled body camera could provide the location for the sensor hub.

Imaging sensors can include still imagery and video (or motion imagery). Imagery and video are a collection of thousands of simultaneous measurements with each pixel value having been influenced by something in the view at some distance from the sensor. Imagers are therefore often referred to as remote sensors. Imagers can record scenes within the spectral range visible to humans, and can also capture scenes in other wavelengths within the electromagnetic spectrum. This can include, for example, thermal imaging, microwave detection or multi-spectral imagery including measurements in hundreds of spectral bands. It is therefore important that the imaging module not only capture the imagery itself, but also other measurements, such as the location, orientation and focal angle of the camera, as well as camera settings affecting the sensitivity of the sensor within the electromagnetic spectrum.

Imaging modules allow the responders to gain a visual awareness of the size, scope and intensity of the incident on hand, particularly for those who are not at the scene. It also allows the responder to convey to citizens the scope of the incident so that they can respond accordingly. Furthermore, imagery and video in non-visible wavelengths can provide the responder with situational awareness not available with their own eyes. An example would be thermal imaging available from cameras sensitive to infrared (IR) wavelengths. These can provide the responder with knowledge about the temperature of a fire, can determine locations of leaks of gas or liquid, and can allow one to see heat sources, including humans while in total darkness. Additionally, the video and accompanying data (location, orientation, camera settings) can be transmitted in real time via LTE or Wi-Fi, for instance, to other hubs on the agency's wide area network (WAN), or the internet, for immediate display by command and control during the incident.

Imaging modules can be mounted permanently onto buildings or other structures, attached to mobile vehicles (e.g., dash cams or hood cams), worn by responders (i.e., bodycams), hand carried, airborne (e.g., drones and balloons), or distributed at the scene (e.g., drop cams or sticky cams). While video and imagery could be recorded for later review, the imaging module is most effective if the video or images, as well as the location, orientation and settings, can be made available to local responders and remote observers in real-time. While a responder could serve as a carrier for the imaging module (e.g., to remote viewers), the local responder could also view the video or imagery output to gain increased situational awareness. If a pan-tilt-zoom (PTZ) capability exists (on a vehicle mount, for instance), remote command and control could remotely task the camera to look at different areas of the scene.

The imaging modules can be capable of capturing video or images, location, orientation, field of view, and camera settings. The imaging module should provide accurate time tagging of all of this data using a single, synchronized and accurate clock. The imaging module should be capable of real-time broadcasting of this data to a local field hub or to remote hubs through the internet or broadcast channels (e.g., datacasting). The imaging module should be capable of supporting PTZ control by the responder where appropriate (e.g., on a vehicle mount).

A hybrid model (BM) refers to a Responder SmartHub Controller Module that fulfills three key roles: sensors collecting information, the sensor hub managing information from all sensors and a user interface to deliver that sensor information to the responder. Each of these roles is satisfied by the deployment of a software component. The technology used in tablets and smartphones is receiving a very high level of investment and so it is highly capable of providing the software platform for deployment of the software, sensor and input/output, components for a hybrid module.

A responder's interface needs the ability to present information clearly in one of a number of consistent styles to deal with specific needs and needs to be easily configured. Both summary and detailed information is needed. The following are representations used in previous Responder SmartHub demonstrations: Environment sensor information—fuel gauge/highlight representations; On-body cameras—video windows, specific snapshots; and Responder and other asset locations—map or schematic (in building) display or counts of people nearby.

A responder's equipment will be configured to match their profile, and information can be delivered to each individual responder based on their identity and assigned role. The Responder SmartHub system should provide an operational view (invoked on a mobile device or tablet by clicking on an icon), which displays the key information for that responder. Information layers should also be provided so that the responder can view information needed for their role (e.g., blueprints, standpipe connections, electrical wiring layout, etc.). These views can be constructed as layers or templates and updated as necessary for a given situation. One solution would be to define such views as open standards compliant Open Geospatial Consortium Web Service Context documents.

A smartphone can play four different roles in the context of Responder SmartHub. First, a smartphone can serve as a gateway device forwarding sensor observations from sensors to a sensor hub service. Second, a smartphone may play a sensor role because there are many built-in sensors on a smartphone. Third, a smartphone may be a client device of the sensor hubs that allows users to visualize sensor observations or receive notifications, and fourth, a smartphone may host the sensor hub application and act as a platform for the sensor hub.

A smartphone can serve as a Sensor System. A smartphone has many built-in sensors that can be useful for responders. Accessing the sensor data depends on the smartphone operating system. Android operating systems provide Application Program Interfaces (APIs) for applications to access sensor data, e.g., accelerometer, orientations, air pressure, gyroscope, etc. In addition to these in-situ sensors, a smartphone's camera can be a very useful sensor when used to broadcast real-time video to a sensor hub service. Below are details of how a smartphone can register itself as a camera sensor in a sensor hub service.

In order to be accessible in a sensor hub service, the smartphone needs to register itself to a SensorThings API (STAPI). It can be provisioned in advance or the smartphone can register itself by sending POST requests to a STAPI. A Unified Modeling Language (UML) can be used to summarize the data model of a smartphone as a video camera sensor. In an example Android implementation, interactions can be conducted between a smartphone as a video sensor and an OGC STAPI. For example, the interactions can be based on an example JavaScript Object Notation (JSON) request of a smartphone registering itself to an OGC STAPI, to add the video camera video stream.

Regarding Smartphone as a Client Device for Sensor Hub Services, a smartphone can also be a client device for users to consume sensor observations from sensor hub services. The interactions and request/response between a smartphone client and an OGC SensorThings API are similar to any desktop-based client. In an example embodiment, a SensorUp smartphone client for OGC SensorThings API can display options to allow a user to Choose among various OGC SensorThings API Services for Retrieving Sensor Observations, Choose a Datastream, and display the Latest Observation and a Time Series Chart. Additionally, a smartphone can also act as a sensor hub to receive sensor observations from sensor devices. Similar features can be used in other mobile devices, such as tablets.

A smartwatch is a wearable, consumer device. Capabilities depend on the specific hardware device; however, they may include: Input: Movement, GNSS, heart-rate, I/O (button, dial, touchscreen, force-touch); Output: Display, haptic; and Network: Bluetooth, Wi-Fi. The smartwatch can provide various interactions and display information similar to that in a mobile device or other desktop-based client.

Regarding other Application Functionality, Power management, device security and provisioning are important considerations when deciding to use a hybrid module. While very computationally powerful, today's mobile devices are not designed for power requirements that responders need. Responders' work shifts are often eight hours or more; however, very few currently available commercial smartphone can run a GNSS-intensive application for eight hours straight without overheating or running out of power. Developers looking to use a hybrid module approach need to be cognizant of this limitation and provide the appropriate optimization or backup mechanisms to better support a responder's mission. Providing a way to allow the user or agency to configure the hybrid device to poll certain information on a periodic-basis is very desirable. A responder on foot may not require their GNSS to constantly provide updates, as they typically have not moved very far since the last update (if at all). Allowing the user to configure their device to only get GNSS position once every minute or two could greatly extend battery life, while still providing adequate responder positioning. Other sensors, such as heartbeat sensors, may provide their own power. However, if such a type of sensor (continuously updating) requires power from the hybrid module, power consumption needs to be considered and managed.

Mobile devices are not as secure as today's commercially available laptops or computer systems, because they are physically more accessible and signal encryption takes computer processing time and battery power. While a majority of the currently available mobile devices support some type of device encryption, not all encryption is equal, nor is it enabled initially. It becomes beholden on the user to enable encryption to better secure the data on the device. Security needs to be enabled both on the device and signal levels. All communications should be encrypted to as high a level as possible. Additionally, a hybrid device should require strong passwords or secure access mechanisms. Device encryption does no good if a bad actor can access the device through a simple pattern swipe.

Given the chaotic nature of larger scale events, a straightforward provisioning process should be considered for hybrid devices. A new responder showing up to a large scale incident needs to be able to quickly and securely identify themselves, be granted the right level of access to the appropriate systems, and set up their device in the context of the incident (i.e., configure the correct networks, get information from the correct systems, connect to known field sensors, etc.). Proper authentication and authorization vetting of responders on-scene is an important part of incident safety and security.

Interfacing between a Controller Module and a Comms Hub Module can involve Interactions, Protocols, Messages, Payloads, Power, and/or other interface descriptions. The Controller Module (hosting the sensor hub service) to Comms Hub communications will need to support a variety of different interfaces. Depending on how the sensors associated with the controller are connected, the Comms Hub may only have to support STAPI and MQTT (and optionally WMS) communications to and from the controller. Alternatively, the Comms Hub also may have to support the sensor driver interfaces to the Controller Module. Sensor driver interface support is largely dependent on the module to which the sensors are connected. If the Controller Module supports Bluetooth independent of the Comms Hub, for example, then Bluetooth sensors can connect directly to their Sensor Drivers. This is the same for USB, if the Controller Module supports USB independent of the Comms Hub. Otherwise, the sensors will need to connect their respective sensor drivers through the Comms Hub, which will require the Comms Hub to support the sensor driver interfaces to the controller.

The same will hold true for the Controller Module to I/O interfaces. If the I/O module is connected directly to the Controller Module, the Comms Hub will not have to support the Controller Module—I/O interfaces. If, however, the I/O module connects to the Controller Module through the Comms Hub, then the Comms Hub will need to support the appropriate interfaces to the I/O and Controller Module.

Regarding Interfacing between the Controller Module and Sensor Interface, the Controller Module and sensors primarily communicate via a sensor driver interface. While the sensor to sensor driver interface is specific to the type of sensor, the Controller Module and sensor driver interface is more generalized. This section describes the Controller Module—sensor driver interface in more detail.

Each sensor driver can support the following capabilities: Auto Discovery—when possible, the driver should automatically detect devices. Observing—the driver should make sensor data available to other services on the Controller Module. Save State—the driver should maintain the device configuration through power cycles. Upgradeable—the driver should support software updates via an admin interface.

The following capabilities are optional and used as applicable: Configuration—when applicable, the driver should support a configuration page to allow a user or administrator (based upon roles and permissions) to adjust device parameters and add/remove devices. Tasking—when applicable, the driver should support tasking capabilities for the device. Display—when applicable, the driver should provide display pages to allow a user to view the observations.

Regarding data interfaces, various Interfaces can be used for a generalized sensor driver interface. A Driver Interface—The driver interface is the main interface for a sensor driver. It should minimally provide: Title, e.g., a Human readable title for the driver; Description, e.g., Human readable description for the driver; Version, e.g., The current version of the driver. For example, 1.0.0; and Configuration URL, e.g., The entry URL for the driver configuration page.

A driver may contain zero or more sensors because a driver may not have devices currently attached. The sensor interface should minimally provide: Title, e.g., Human readable title for the sensor; Description, e.g., Human readable description for the sensor; Status, e.g., Current status of the sensor. For example, ONLINE or OFFLINE; Metadata Encoding, e.g., The encoding of the sensor metadata. For example, portable document format (PDF) or SensorML; Metadata URL, e.g., The URL to retrieve the sensor metadata.

LocationSensor is an extension to Sensor and indicates a device can provide a location. This is important because this location can be used to make other devices "smarter." It should minimally provide: getLocation( ) e.g., A function that returns the latest location of the device.

TaskingSensor is an extension to the Sensor interface and indicates a device can be tasked. It should minimally provide: executeTask(ParameterData), e.g., A function that takes defined tasking parameter data and executes the specified task.

A TaskingSensor may contain zero or more tasking capabilities. The device may be in a state where it currently cannot be tasked and therefore may provide no capabilities. It should minimally provide: Title, e.g., Human readable title for the capability; Description, e.g., Human readable description for the capability; and Parameter Data, e.g., An object that provides the acceptable parameters, if they are required and their definition (i.e., unit of measure, data type, permitted values, etc.).

PollingSensor is an extension to Sensor and indicates a device needs to be polled for its data. It should minimally provide: PollingInterval, e.g., How often the device should be polled for values; getValues( ), e.g., A function that returns the current SensorResults for a device. The SensorResult contains the datastream and its value.

Regarding Datastream Interface, a Sensor may contain zero or more datastreams. The device may be in a state where it currently cannot provide data and therefore provides no datastreams. It should minimally provide: Title, e.g., Human readable title for the datastream; Description, e.g., Human readable description for the datastream; Observed Property, e.g., The property the current device observes. For example, speed, heart rate, etc. These values need to come from a defined source. Constraints, e.g., Constraints on the data of the observed property. For example, heart rate will be >=0 beats per minute (bpm) and <=220 bpm; and Display URL, e.g., The entry URL for the observation display page.

Regarding Interfacing between Controller Module and Input/Output (I/O) Interface, the Controller Module to the I/O Interface provides several key capabilities. A user or administrator (based upon roles and permissions) needs to be able to view sensor information, register the Controller Module, and perform various system administration duties for the Controller Module and various attached sensor drivers. A Controller Module should support I/O access via any network connected I/O device, such as a laptop, smartphone, tablet, etc. Responders need key situational awareness information, but already have a high cognitive load and so cannot deal with irrelevant information. User interfaces therefore need to be clear and recognizable. It must be possible, though, to provide customized information to responders reacting to specific situations; in other words, the information presentation must be agile and focused on the needs of the responder.

A user or administrator with elevated privileges (based upon roles and permissions) needs to be able to view the status of a Controller Module and change its configuration.

The following general capabilities are required as part of the administrative functions of a sensor hub: Controller Status; User Management; Rules Management; Driver Management; Connection Management; Data Management; and Device Configuration.

Regarding Controller Module Status, the Controller Module should provide the I/O module with a high level status of the controller. The status information should include, but is not limited to: Software Version; Up Time; MAC Address; IP Address; Host; Service URLs; Power Details (State of the device (i.e., plugged in, running on battery, etc.); Percent of battery remaining; and Estimated operational time remaining); and Storage Space Remaining.

Regarding User Management, the Controller Module should allow I/O devices to access, view and manipulate the users and their permissions associated with the controller. A privileged user or administrator (based upon roles and permissions) should be allowed to create or manage users and their associated permissions. Controller Modules need to operate in disconnected operations, so local user management is important. Permissions should be used to limit access to a Controller Module, to specific services or data within a service as agency policy dictates.

Regarding rules Management, the controller should allow a user or administrator (based upon roles and permissions) to create complex Boolean logic rules, that when matched can trigger the controller to perform an action. Actions can include tasking devices or sending alerts by a variety of channels including email, text messages and MQTT topics. Email and text support allow for existing devices without specialized applications to receive the alerts, while MQTT delivers alerts to applications incorporating MQTT clients.

Regarding Driver Management, the Controller Module should allow a user or administrator (based upon roles and permissions) to upload and configure drivers that connect the sensor or devices to the Controller Module. Some sensors and devices may have the capability to register directly with the services running on the Controller Module; however, some devices may just be connected directly to the Controller Module, and therefore it will be responsible for making their data available in the services. This process may require manual configuration.

Regarding Connection Management, the Controller Module should allow a user or administrator (based upon roles and permissions) to configure any external connections from the Controller Module to other systems or controllers. Specifically, the Controller Module should allow the user or administrator (based upon roles and permissions) to configure what catalog(s) it will register itself to, allowing it to be discovered externally. The Controller Module will also allow the user or administrator (based upon roles and permissions) to configure to which other Controller Modules it will push its data and how to prioritize the data transfer. It is particularly useful to push data from a Controller sensor hub to a cloud sensor hub.

Regarding Data Management, the Controller Module should allow a user or administrator (based upon roles and permissions) to view the current status of the device storage by indicating how much space is used and how much is still available. The user or administrator (based upon roles and permissions) should be provided with options for cleaning cached data older than a specified date and time, or to allow data to only be maintained for a specified period of time. The user or administrator (based upon roles and permissions) should also be able to clear specific sensor or types of data.

The Controller Module can also allow a user or administrator (based upon roles and permissions) to prioritize the transfer of data. The user or administrator (based upon roles and permissions) should be able to indicate the importance of specific types of data. For example, the user or administrator (based upon roles and permissions) may want audio to take precedence over video; however, gas readings may take precedence over audio. The user or administrator (based upon roles and permissions) should also be able to specify permitted reductions to data if they are necessary. For example, a user or administrator (based upon roles and permissions) may want to reduce video from 30 FPS to 10 FPS if bandwidth is an issue, or to push sensor readings less frequently than they are captured.

Regarding device Configuration, the Controller Module should allow a user to modify any device configuration settings. These settings may include: Hostname configuration; Email configuration; MQTT configuration; SMS configuration; Date and time configuration; and Default geospatial location of the device (if no GNSS is present).

Controller Modules enable viewing of information, and provide a variety of information from their associated sensors, e.g., location, single readings or continuous readings (data streams). While this information may be useful in and of itself, often a responder will want that information displayed in the larger context of their mission. This requires the ability to aggregate sensor information and display it on a map, in a table, etc. Consequently, the Controller Module needs to provide sensor information to the I/O device in a meaningful and easily recognizable format. If the I/O device cannot interpret the information, it may not be able to display that information in a meaningful way to the user. The sensor drivers and Controller Module producers should work towards common representations of various types of sensor information, so that information can be displayed in a meaningful fashion.

An aspect of the Controller Module ecosystem is the ability to discover sensor hub services with which the responder can communicate. By registering with a sensor hub catalog with a unique identifier, Controller Module sensor hub services can be distinguished from each other and allow discoverability of the available sensor hub services.

Discoverability is dependent on a Controller Module knowing how to communicate with a sensor hub catalog or its associated publishing service. Once a sensor hub service on a Controller Module has been configured to communicate to one of these services, the sensor hub service is able to add itself to the connected service, which then retrieves the sensor hub service capabilities, adds the capabilities to the catalog and returns a unique identifier for the sensor hub service to use in later updates. In an example embodiment, the sensor hub service can provide updates to the sensor hub catalog as its capabilities change, as well as unregister itself from the sensor hub catalog. Both processes can follow a similar general workflow as described above. The unregister process could remove the sensor hub entirely from the sensor hub catalogue or simply mark it as offline and unavailable.

Regarding Interfacing between Controller Module and Power Module, the controller Module is expected to have an application and driver to communicate with the power module. This application is expected to provide information to the first responder regarding the status of the power module, the status of any connected batteries and the status of any connected devices. Additional specifications regarding the Controller Module-Power Module interface are provided further below, e.g., regarding interface specifications.

Application patterns provide design templates for Controller Module applications through which a Responder SmartHub user interacts with actionable information. The basic applications expected to be included in the Controller Module are (not an exhaustive list): Messaging (SMS, e-mail); CAD interface to receive dispatch information, and send status updates or additional information to PSAP systems; Camera/voice recording and display/playback; Voice-to-text for messaging and application commands; Text-to-speech for incoming messages and alerts; Map display, including layer filtering/selection and position display; Communications system management configuration, status, display, operation; Off-body sensor system management, configuration, status, data display; Responder physiological sensor system management, configuration, status, data display; Alerting system management, configuration, display; Web browser for access to enterprise network and internet; Responder logon, identification, credentialing; and Agency database query and response.

Figure 9:
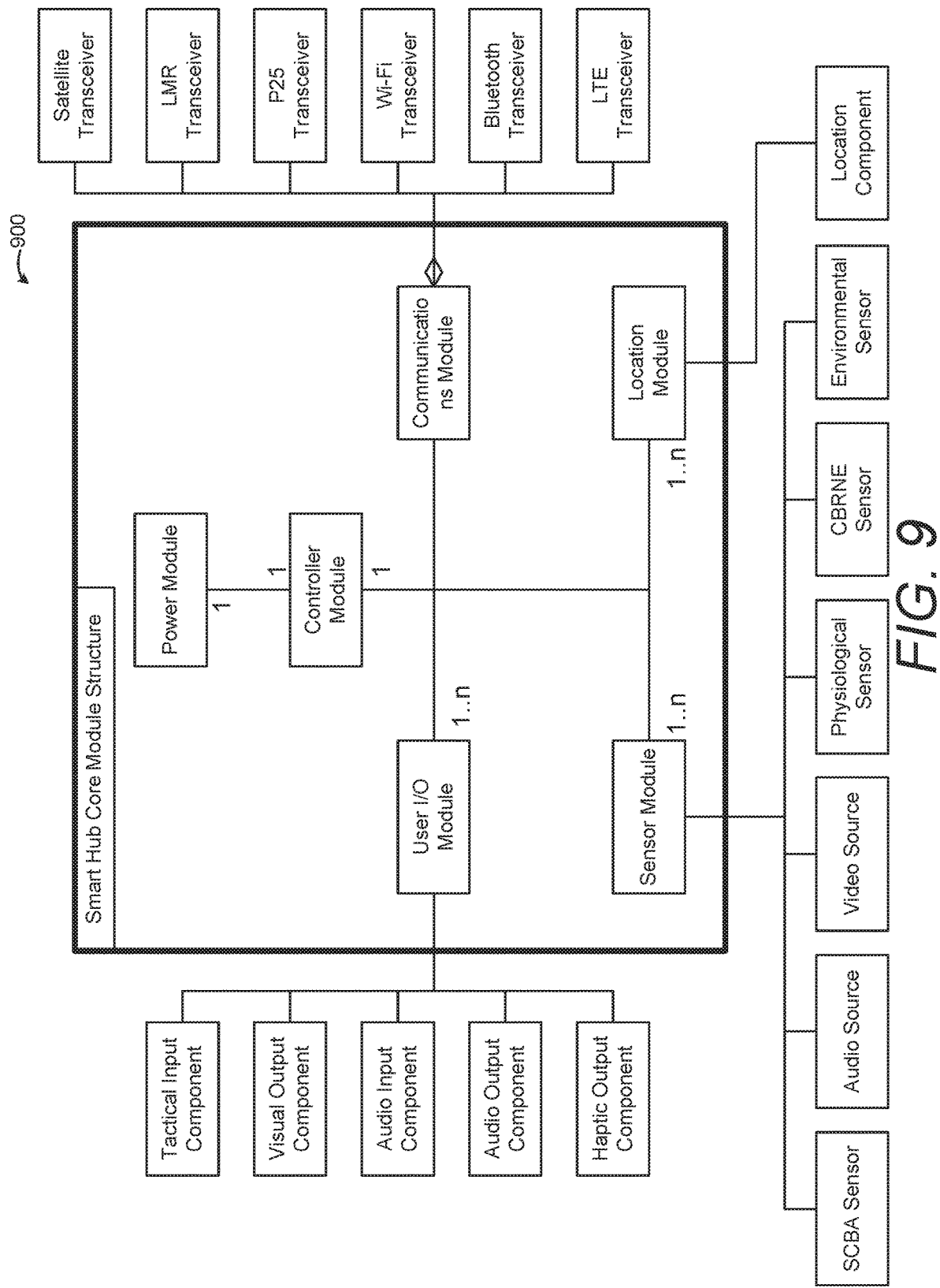
FIG. 9 illustrates a first responder system according to an example embodiment.

FIG. 9 illustrates a first responder SmartHub block definition diagram 900 including six basic architectural elements, including one or more of a controller module, a communications module, a sensor module, a user I/O module, a location module, and a power module.

The controller module is the central component of the Responder SmartHub, enabling intra-modular communication between the other Responder SmartHub modules. It also aggregates, routes, persists and processes incoming and outgoing data, and mediates the module's power requirements. The controller supports standard data services and applications for the wearer, in addition to managing the federation and synchronization of data with other personnel and external systems involved in an incident response. To facilitate these functions, the controller also supports personal profiles, which allows the wearer and/or wearer's agency to tailor their Responder SmartHub system for their mission and role.

Regarding the Communications Module, communications between the responder and other responders, incident command and the parent public safety agency's command center are essential for the responder to perform their required duties. The Communications Module (Comms Hub) will handle connectivity and voice communication as an information type and data at the Internet Protocol (IP) packet level for the responder using Land Mobile Radio (LMR) and other local or wide-area communications networks. The Comms Hub is also expected to perform "intelligent router" activities, using business rules to determine which communications device to use for both voice and data traffic, and routing between the controller and the various communications devices. The communications module can include a voice communications provision and/or a data communications provision. Voice Communications Provision—The Comms Hub will support the connection of available voice communications pathways such as LMR, cellular and Voice Over Internet Protocol (VOIP) to a single voice Input/Output (I/O) device, such as a headset with microphone (connected to the controller). Data Communications Provision—The Comms Hub will provide seamless IP-level connectivity and prioritized packet transmission and reception across wireless networks available to the responder.

Sensor modules provide translated sensor information to the controller. Ideally, the physical connection to a sensor will be handled by the Comms Hub. Inbound sensor information is passed to the sensor module for translation (if required), and then passed to the controller for further processing, aggregation and storage. The sensor module may be a separate device, or incorporated into the controller as an application or group of applications. Sensor modules can include physiology, environmental, and imaging sensors, and the like.

Physiology sensors will provide accurate readings of one or more responder health and fitness indicators such as temperature, pulse, respiration, hydration, blood sugar and blood oxygen levels.

Environmental sensors will measure environmental phenomena relevant to health and safety such as temperature, noise, wind speed, level of atmospheric contaminants (e.g., hazardous materials (HAZMAT)), etc. Some environmental sensors may be able to be stationed apart from the responder and continue to deliver readings to the responder's or another appropriate controller.

Imaging Sensors will consist of bodycams, but may also be independently sited and support geo-referenced imagery using Global Positioning System (GPS) and Inertial Measurement Unit (IMU) data.

The User I/O Module (I/O) will provide a number of means to support user interaction with Responder SmartHub. Each module will support one or more of graphical, text, voice and haptic (touch) input and/or output devices. Such modules can include graphic, text, voice, and haptic I/O modules.

The graphic I/O module will provide visual information to the responder. The information is categorized into alerts, general, system and update information.

Alerts are reserved for information that is time or location critical. Any information that is sent to the responder can interrupt or distract from their current tasking, so the responders should not be fed information that is unimportant (e.g., sensor readings that are within normal parameters). Instead, responders should only be alerted when parameters such as heart rate are outside normal acceptable parameters. Because alerts indicate abnormal parameters, and because alerts are time or location sensitive, they should be sent regardless of the responder's tasking. Alerts may be classified in a number of ways, including designating alerts as general information or system information. Information that is not time sensitive and will not impact responder primary functions will be categorized as "general information". Specific information about the Responder SmartHub system will be categorized as "system information," which may include items such as a low battery, a weak cell signal or a component that is not functioning correctly.

Updates can be assigned for any of the previous three categories. When an update to an alert comes through, the system can differentiate to the responder that it is an update by how the information is displayed (e.g., iconography, color or gradual fade in/out of the information).

Graphical output is a quick and easy way to pass necessary information to the user, especially Geospatial User Interface (GIS)-enabled or other visual information. Graphic input can be accomplished in many ways: with a mouse, by touch or with gestures that may be specific to the responder, his/her task, equipment, environment and conditions.

Text Input/Output Module includes keyboards and text-only outputs, such as scrolling text displays or digital signage.

The voice I/O module pertains to devices that allow responders to interact with controller applications using voice. The voice interface should be well defined and explained to the responder. When invoking the voice interface, the responder begins by saying a specific phrase. Once the voice interface has started, it allows the responder to interact with the system without physically interacting with a component of the Responder SmartHub system.

This includes devices for communicating via voice with other people and for interacting with controller applications using voice recognition, voice commands, voice-to-text, etc. These will continue to coalesce into one voice medium.

Haptic I/O: Haptic feedback is an important component to the User Interface (UI), especially in a chaotic environment. When touch interfaces are used for the interaction method, it is important to notify the responder when they have successfully or unsuccessfully interacted with the touch interface. Haptic feedback can also be used to notify the responder of incoming information such as alerts. When using haptic feedback for alerting, the vibration pattern must be different than the simple UI feedback vibration pattern. This will allow the responder to quickly distinguish from UI interactions and alerts.

Location Module (LM): The location module returns location to the controller from a location provider. More than one location module could be connected to the controller, each returning a different type of position/location. For example, a responder's controller could be connected to both an indoor location provider and a GPS provider. Responder location accuracy will depend on the various technologies used by Responder SmartHub to determine location.

Power Module (PM): The Power Module (PM) will provide power to the other Responder SmartHub modules as managed by the controller. It will provide the status of its reserves, power usage of the other modules, time to recharge to the responder, etc., in accordance with the Smart Battery Data Specification. The PM will be able to be recharged/replaced independently of the other modules. Wired Power Provision—Most power will be provisioned directly to other modules by various wired connections, including Universal Serial Bus (USB), mini-USB and others. Wireless Power Monitoring—Sensor and hybrid modules may have or need their own power supplies, but the controller and PM will continue to monitor their rate of power usage and time to recharge. Recharging of the PM should occur via either 12 volts direct current (VDC), USB (5 VDC) or 110 volts alternating current (VAC); recharging off-body should occur via a drop-in or inductive charger to reduce the need to plug/unplug wires.

Interface Specifications refer to the intra-module interfaces between the various Responder SmartHub modules and the controller. A pair of interfaces between each module and the controller provides bi-directional communication.

Location Module—Controller Module (LM-CM) Interfaces refer to the interfaces between the location module and the Controller Module. This information is provided because the various Open Geospatial Consortium (OGC) sensor standards do not provide a standard for communication between a location module and a Controller Module.

The two main interfaces between these modules are the ILocationModule interface and the IController_LocationUpdate interface. ILocationModule supports communication from the controller to the location module, while IController_LocationModule supports communication from the location module to the controller. Communication between these modules is also supported by secondary interfaces and enumerations, which represent discrete pieces of information.

The LM-CM interfaces are described as follows: ILocationModule is a Main interface from the controller to location module. Provides module status, identification (ID) and connection methods. IController_LocationUpdate is a Main interface from location module to controller. Provides position updates and error information. IPosition is an Abstract interface for position. Provides the date and time of a position reading. IGridPosition inherits from IPosition, and provides a position represented by a grid coordinate system, such as U.S. National Grid (USNG), Universal Transverse Mercator (UTM) or Military Grid Reference System (MGRS). IWGS84Position inherits from IPosition, and provides a position using World Geodetic System 1984

(WGS84). GridType is an enumeration describing the available types of grid systems used by IGridPosition. PositionType is an enumeration describing the type of position supported by the location module. CoordinatePrecision is an enumeration describing the grid level (i.e., number of coordinate digits).

The above interfaces/enumerations can be associated with various method signatures. For ILocationModule: A method signature "Connect" connects to a location module, and provides a reference to an IController_LocationUpdate interface, so position updates can be returned (returns success or failure). "Disconnect" disconnects from a location module (returns success or failure). "Status" returns the status flag from a location module. "ID" returns a unique identifier from a location module. "GetPositionType" returns the position type supported by a location module.

For IController_LocationUpdate: "PositionUpdate" returns a new position from a location module to controller. "Error" returns an error in string format from a location module to controller. For IPosition: "Date" returns the date and time of a position reading. For IWGS84Position (inherits from IPosition): "Latitude" rturns the latitude (WGS84) of an object in decimal minutes. "Longitude" returns the longitude (WGS84) of an object in decimal minutes. "Altitude" returns the altitude (above mean sea level) of an object in meters. "Accuracy" returns the estimated accuracy of the x, y and z coordinates as a percentage. "Heading" returns the heading of an object in decimal degree format. "Speed" returns the calculated speed of an object in meters per second (m/s). For IGridPosition (inherits from IPosition): "GridZone" returns the grid zone identifier. "100KID" returns the 100,000-meter square identifier. "Coordinates" returns an integer representing easting and northing values. "CoordinatePrecision" returns an enumeration representing the number of digits used in the Coordinates value. "GridType" returns an enumeration representing the type of grid system used.

Communications Module—Controller Module (CM-CT) Interfaces refers to the interfaces between the Communications Module and the Controller Module. This information is provided because the various OGC standards do not provide a standard for communication between a Communications Hub and a controller.

The two main interfaces between these modules are the ICommsModule interface and the Responder SmartHub_CommsUpdate interface. ICommsModule supports communication from the Controller Module to the communications module, while IResponder SmartHub_CommsUpdate supports communication from the communications module to the Controller Module. Communication between these modules is also supported by secondary interfaces and enumerations, which represent discrete pieces of information.

The CM-CT interfaces are described as follows: ICommsModule is a main interface from the controller to communications module. Provides module status, list of available networks, data transmission information, network naming standards and network interface acquisition information. IController_CommsUpdate is a main interface from communications module to controller. Provides inbound information updates, network status and sending status. INetwork represents a particular communications module network, including unique identifier, meta-information, status and signal strength (as applicable). IData Represents an atomic piece of information sent or received by the communications module. NetworkVisibility is an enumeration describing the security aspect of a network. NetworkStatus is an enumeration describing the status of a network. NetworkType is an enumeration describing the type of a network. NetworkAreaType is an enumeration describing the area profile of a network. NetworkStrengthSimple is an enumeration describing the qualitative signal strength of a network.

The above interfaces/enumerations can be associated with various method signatures. For ICommsModule: A method signature "Connect" connects to a communications module, and provides a reference to an IController_CommsUpdate interface, so position updates can be returned (returns success or failure). "Disconnect" disconnects from a communications module (returns success or failure). "AvailableNetworks" returns an array of networks configured in the communications module. "SendData" requests the communications module send the information contained in the IData parameter out of a network in an unsecured manner. "SendSecureData" requests the communications module send the information contained in the IData parameter out of a network in a secured manner. "GetSendFailure" returns a string containing information about a failed send request using the send request ID. "GetNetwork" returns a reference to the requested network interface. "SetNetworkFriendlyName" sets a friendly name (human readable) for a network.

For IController_CommsUpdate: "ReceivedSensorData" returns an IDiscreteSensorData containing information received from a sensor. "ReceivedExternalData" returns an IData containing information received by communications module. "NetworkStatus" returns the status of a network. "SendSucceeded" returns the ID of a successful send request. "SendFailed" returns the ID of a failed send request.

For IData: "ID" returns a unique identifier for this information. "Priority" returns the priority (0-100) of this information. "DestinationURLs" returns an array of strings representing the destinations of this information. "Data" returns an array of bytes representing the information to be sent.

For INetwork: "ID" returns a unique identifier for this network. "Type" returns an integer flag identifying the type of the network. "AreaType" returns an integer identifying the area of the network. "Visibility" returns an integer identifying the visibility of the network. "Status" returns an integer flag identifying the status of the network. "SignalStrengthValue" returns the current signal strength of the network in decimal format. "SignalStrengthSimple" returns the current signal strength of the network as an enumeration value. "GetFriendlyName" returns the friendly name of the network.

Power Module—Controller (PM-CT) Interfaces refers to the interfaces between the PM and the controller. This information is provided as an expansion of the Smart Battery Data Specification to provide the necessary functionality between the PM and the controller.

The two main interfaces between these modules are the IPowerModule interface and the IController_PowerUpdate interface. IPowerModule supports communication from the controller to the Power Module, while IController_PowerUpdate supports communication from the Power Module to the controller. Communication between these modules is also supported by secondary interfaces and enumerations, which represent discrete pieces of information.

The PM-CT interfaces/enumerations are described as follows: IPowerModule is a main interface from the controller to PM. Provides module status, battery status and battery meta-data. IController_PowerUpdate is a main interface from PM to controller. Provides a warning alarm to the controller. EBatteryStatus is an Enumeration describing the battery status.

The above interfaces/enumerations can be associated with various method signatures. For IPowerModule: A method signature "Connect" connects to a Power Module. Provides a reference to an IController_PowerUpdate interface, so warnings can be returned (returns success or failure). "Disconnect" disconnects from a Power Module (returns success or failure). For IController_PowerUpdate: "EBatteryStatusAlarmWarning" returns a battery alarm/warning to the controller.

Sensor/Communications Module—Controller (SM-CT) Module Interfaces refers to the interfaces between the sensor module/communications module and the controller module. The two main interfaces between these modules are the ISensorModule interface and the IController_SensorUpdate interface. ISensorModule supports communication from the controller to the sensor module, while IController_SensorUpdate supports communication from the sensor module to the controller. Communication between these modules is also supported by secondary interfaces and enumerations, which represent discrete pieces of information.

The SM-CM interfaces/enumerations are described as follows: ISensorModule is a Main interface from the controller to sensor module. IController_SensorUpdate is a Main interface from sensor module to controller. ISensor represents a particular sensor module sensor. IStreamSensor represents a sensor capable of streaming data. IDiscreteSensorData represents an atomic piece of information sent from a sensor. PrimarySensorType is an enumeration describing the primary sensor types. PhysiologicalSensorType is an enumeration describing the set of available physiological sensors. ChemicalSensorType is an enumeration describing the set of available chemical sensors. BiologicalSensorType is an enumeration describing the set of available biologic sensors. DataUpdateType is an enumeration describing the how the sensor sends data. StreamConnectionType is an enumeration describing the type of connection needed to connect to a streaming sensor.

The above interfaces/enumerations can be associated with various method signatures. For ISensorModule: A method signature "Connect" connects to a sensor module. Provides a reference to an IController_SensorUpdate interface, so sensor information can be returned (returns success or failure). "Disconnect" disconnects from a sensor module (returns success or failure). "ID" returns the unique identifier for the sensor module. "AvailableSensors" returns an array of the available sensors for this sensor module. "IDiscreteSensorData ReadOnce" returns a single sensor reading from the requested sensor. "GetSensorError" returns the error information for the requested sensor. "SetSensorFriendlyName" sets a friendly name (human readable) for a sensor. "StartReading" requests a sensor to start taking readings. "StopReading" requests a sensor to stop taking readings.

For IController_SensorUpdate: "SensorData" informs the controller new sensor data has been read. "NewSensor" informs the controller a new sensor is available to read data. "SensorError" informs the controller a sensor has an error condition. "RemovedSensor" informs the controller a sensor has been removed and is no longer available.

For ISensor, "ID" returns the unique identifier for the sensor. "UpdateType" returns an enumeration representing how the sensor returns data (i.e., discretely or streaming). "PrimaryType" returns the primary type of the sensor. "SecondaryType" returns a more specific type of sensor as an integer. "Status" returns the current status of the sensor as an integer flag. "FriendlyName" returns the friendly name (human readable) name of the sensor. "Location" returns the current position of the sensor.

For IStreamSensor (inherits from ISensor): "Address" returns the address used to connect to a streaming sensor. "Port" returns the port number used to connect to a streaming sensor. "ConnectionType" returns the type of connection required by a streaming sensor.

For IPowerModule: "SensorID" returns the unique identifier of sensor that sent this data. "Data" returns the sensor data in the format of an array of bytes. "DateRead" returns when the sensor reading occurred. "Location" returns the position of the sensor at the time of the reading.

I/O Module—Controller (I/O-CT) Module Interfaces refers to the interfaces between the I/O module and the controller. The two main interfaces between these modules are the IIOodule interface and the IController_IOUpdate interface. IIOModule supports communication from the controller to the I/O module, while IController_IOUpdate supports communication from the I/O module to the controller. Communication between these modules is also supported by secondary interfaces and enumerations, which represent discrete pieces of information.

The I/O-CT interfaces/enumerations include IIOModule and IController_IOUpdate. IIOModule is a main interface from the Responder SmartHub to I/O Module. IController_IOUpdate is a main interface from I/O Module to Responder SmartHub.

Figure 10:
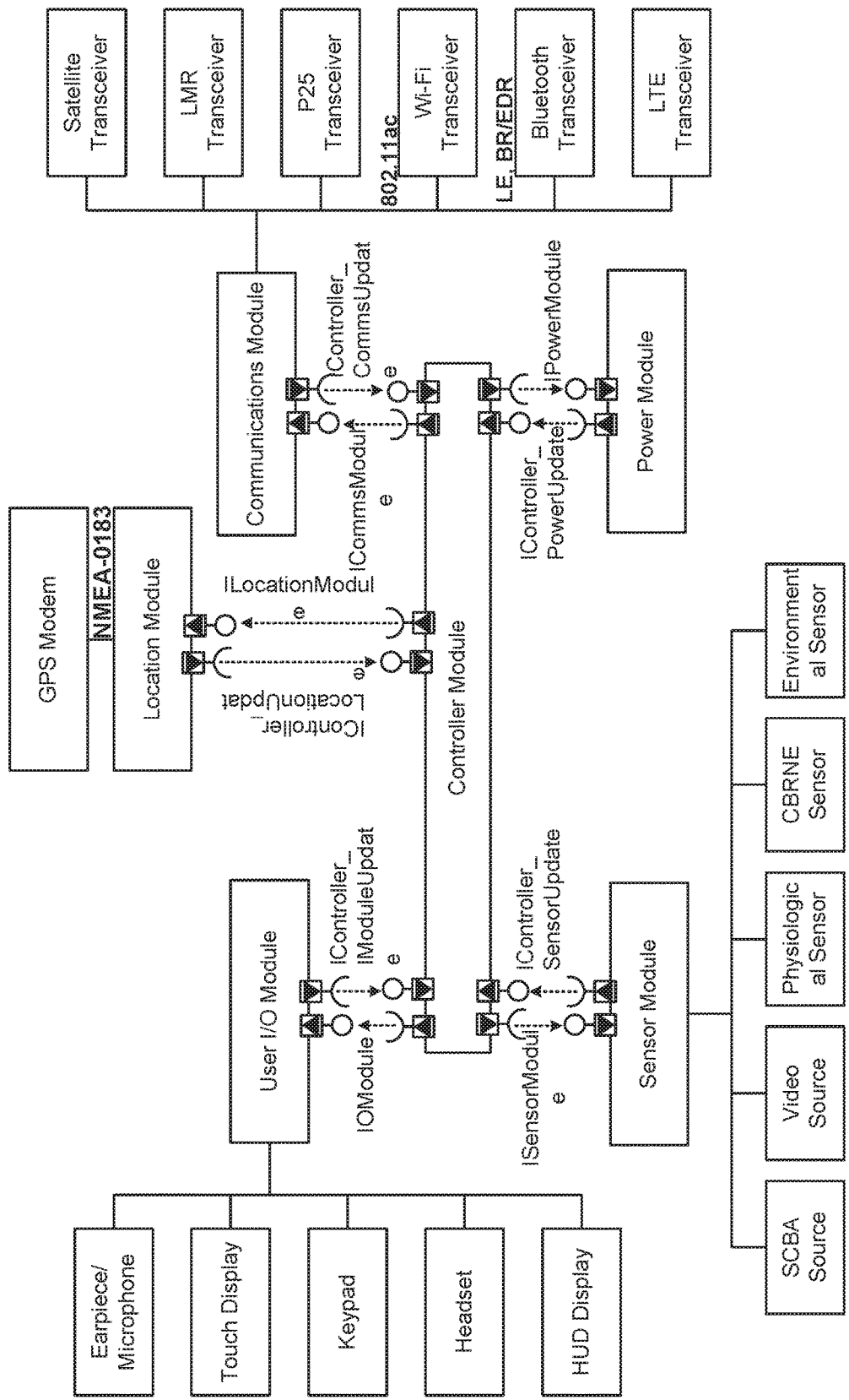
FIG. 10 illustrates a first responder system according to an example embodiment.

FIG. 10 illustrates a first responder system 1000 according to an example embodiment. Communications Module Interfaces shows the I/O connections as the interface with the Comms Hub.

Agency/Inter-agency Interface Specification provides the details of the Responder SmartHub's external facing interfaces, including its data architecture. The Responder SmartHub utilizes several data standards to communicate with external entities. These standards include: Organization for the Advancement of Structured Information Standards (OASIS) family of Emergency Data Exchange Language (EDXL) standards and National Information Exchange Model (NIEM) Emergency Management Domain (EMD) Information Exchange Packages (IEPs). Sections A and B below describe data languages developed to facilitate communications between an agency's back office systems (Computer Assisted Dispatch (CAD), Situational Awareness (SA), geographic information system (GIS), etc.) and between agencies.

Communications from the on-body suite refers to a different approach that will bring it more in line with Internet of Things (IoT) and Smart Cities sensor standards. There are a variety of reasons for this change. One of the major thrusts of the NGFR program is to provide sensor capabilities for responders to improve an agency's situational awareness capabilities. The other concern is that there may be constrained communications capabilities and therefore a very concise messaging scheme can minimize bandwidth requirements for sensor messaging. To this end, Message Queuing Telemetry Transport (MQTT) and Java Script Object Notation (JSON) data encoding can be used to minimize traffic generated by the SmartHub to the agency. Further, this approach should facilitate the ability to utilize commercial IoT services as these are some of the underpinnings of many of the commercial offerings.

Emergency Data Exchange Language (EDXL) Distribution Element (DE): The OASIS EDXL Distribution Element (DE) standard is designed to be a meta-data wrapper around other Extensible Markup Language (XML)-based data standards. The meta-data information in the DE describes various aspects of the enclosed information without having to understand that information explicitly. The DE can describe who the information is from, who the information is for, where the information is from, the urgency of the information, the classification of the information, among other fields. This capability provides the ideal platform for distributing information in a chaotic environment such as an emergency incident where the sender may not always know exactly where their information needs to be sent, and an information consumer may not always know exactly who is sending the information. The DE meta-data provides an excellent mechanism for describing important information in a general manner so the right recipients can receive that information even if the senders do not have direct knowledge of them.

Responder SmartHub Messaging: The Responder SmartHub must be capable of sending and receiving DE messages which contain either a known EDXL standard, such as the Common Alerting Protocol (CAP), or an EMCL IEP. This combination of EDXL and NIEM supports a wide variety of information that emergency management personnel need to share and exchange. The EMLC provides the mechanism for define new data sets (Event Details) for sharing that don't already existing in the EDXL family of standards or in the current EMLC IEP documentation. The set of standards that the Responder SmartHub should be capable of sending and receiving is defined as follows: EDXL Distribution Element (DE), EDXL Common Alerting Protocol (CAP), EDXL Resource Messaging (RM), EDXL Situation Report (SitRep), EDXL Tracking of Emergency Patients (TEP), and NIEM Emergency Management Loose Coupler.

The Responder SmartHub architecture has been envisioned to provide the capability of providing body-worn sensor data to be reported back to the agency to improve the command's situational awareness. It is also envisioned that situational awareness information will be sent to the SmartHub to improve the responder's situational awareness.

While a FirstNet solution utilizing smartphones can be used to implement this solution, it has become apparent that some agencies may need to take lower cost approaches to implementing these enhanced capabilities. With this in mind, the utilization of MQTT topics and JSON formatted data will provide a more bandwidth and computationally efficient solution for moving data. The SensorThings Application Program Interface (STAPI) is a defined set of messages that utilizes Hypertext Transfer Protocol (HTTP) to provide control and different capabilities over and above the MQTT framework. These are both standard components of IoT frameworks.

This approach opens up a wider range of computing platforms and potentially different service providers to support the data traffic to the agency. The equipment can be developed to support first responder needs to provide a flexible framework in which operational needs can be accommodated.

Transportation Layer Protocol: Given the environments the Responder SmartHub is required to operate in, the Responder SmartHub should be capable of supporting the TCP/IP and UDP protocols. While TCP/IP provides guarantees on message receipt, its overhead might be too heavy for some constrained networks. In these instances, UDP may be a better choice for sending frequently repeated information, such as system location or user heartbeat. Missing a packet or two will not adversely affect the overall system as another message for location or heartbeat will be sent shortly.

Security: When possible, the Responder SmartHub should use Transport Layer Security (TLS) version 1.2 or higher, when sending and receiving information, to ensure secure communications.

Application Layer Protocol: The world of the Internet of Things (IoT) is still evolving and as such there are still a variety of application level transportation protocols. The two most prevalent protocols for TCP/IP are Hypertext Transfer Protocol/Hypertext Transfer Protocol Secure (HTTP/HTTPS) and Message Queuing Telemetry Transport (MQTT), with MQTT gaining traction against HTTP over the last few years. HTTP, however, has a very large footprint, as most legacy systems are capable of supporting HTTP. Consequently, the Responder SmartHub will need to support both protocols for the foreseeable future.

MQTT: An example application layer protocol for the Responder SmartHub is MQTT v3.1.1 from OASIS. The preferred payload will be JSON formatted data message utilizing an MQTT topic structure. A default port of 1883 will be utilized for unsecured transmissions and a default port 8883 will be utilized for secure transmissions.

HTTP: An example secondary application layer protocol for the Responder SmartHub is HTTP/2. The preferred payload will be JSON formatted data message. The default port of 443 will be utilized for secure transmissions. The default port of 80 will be utilized for unsecured communications.

Regarding Operations and Maintenance, various examples can rely on components to provide operations and maintenance services. Infrastructure Components: Modules designed for the Responder SmartHub will need to operate and communicate within the constraints of each agency's communications infrastructure. Communications to an Incident Command Post (ICP) or back to another center (Public Safety Answering Point (PSAP), Emergency Operations Center (EOC), etc.) will require the infrastructure to support those communications. Cellular data connectivity, LTE, satellite communications, fiber, Land Mobile Radio (LMR) data or the like will need to be present for the Responder SmartHub to communicate effectively during an incident. Some Responder SmartHub capabilities will depend on the existing infrastructure. For example, streaming video may not be transmitted reliably over cellular data/LTE during a major event because of cell network congestion. Something like a fiber backhaul would be better suited for streaming video from the field. Connectivity to agency LMR systems is expected to be accomplished via an LMR radio interfaced to the controller via the Comms Hub portion of the Responder SmartHub.

Lifecycle Considerations: There are two areas of concern regarding the lifecycle of any Responder SmartHub modules: system lifespan and lifecycle support.

Module Service Life: Modules integrating to the Responder SmartHub should be designed and constructed with an estimated service life of three—five years. The requirements for some of the modules, especially the sensors, include requirements that apply to service-life, i.e., number of times it can be laundered.

Integrated Logistics Support (ILS): Lifecycle support for Responder SmartHub modules should have 10 elements of Integrated Logistics Support (ILS): Reliability engineering, maintainability engineering and maintenance (preventive, predictive and corrective) planning; Supply (spare part) support; Support and test equipment/equipment support; Manpower and personnel; Training and training support; Technical data/publications; Computer resources support;

Facilities; Packaging, handling, storage and transportation (PHS&T); and Design interface.

Networks and security architecture: The architecture can consist of Clients (the Devices) and the Server (the Management System). The structure of the Client/Server solution can account for both Controlled Device (CD) and Bring Your Own Devices (BYOD) models, while enabling the system administrator role(s) to watch, control and administer all deployed mobile devices across multiple mobile service providers, as well as facilitate secure communications through trusted paths/channels.

System Security Policies: The architecture can provide mechanisms for setting appropriate system security policies and enforcement of these policies. These mechanisms can include methods of security policies and enforcement for the cases of Device-System (end-to-end) and stand-alone Device (local).

Scalability: The architecture can be scalable, either vertically, horizontally or both.

Identification and Authentication: These functions can govern the identification of user(s) and the authentication of the user's credentials prior to granting access. These functions can also govern the device/system actions as the result of unsuccessful identification-authentication attempt(s).

Access: The access functions can, in conjunction with the identification and authentication functions, govern accesses to a device and to the system resources. In supporting the physical security functions, the access functions can also provide methods of screen lock and timeouts.

System Management: The system management functions can manage the roles and access privileges of individual users, the device functions and operations. These functions can be implemented with multiple server entities, and can consist of, at a minimum, three function sets: Mobile Application Management (MAM); Mobile Device Management (MDM); and Mobile Content Management (MCM). See below, section Data and Communication Security.

Cryptographic Support: The cryptographic support function can include a cryptographic module for the wide range of cryptographic functions required for Information Security (INFOSEC) and Communications Security (COMSEC) purposes. The cryptographic functions employed in the devices and system can comply with the Federal Information Processing Standard (FIPS) Publication 140-2, (FIPS PUB 140-2), which is a U.S. government computer security standard used to approve cryptographic modules.

User Data Protection: The user data protection functions, in conjunction with the functions of identification and authentication and access, can be designed to control access to device/system services by hosted applications, including protection of the associated databases. Additionally, these functions can be designed to protect user and other sensitive data using cryptographic methods so that even if a device is physically lost, the data remains protected.

Trusted Path/Channel: The trusted path/channels functions can support the use of 802.11-2012, 802.1X, Extensible Authentication Protocol (EAP)-TLS, TLS and Internet Protocol Security (IPsec) to secure communications channels between itself and other trusted network devices.

Authorized users are those users possessing valid authorization factors for the devices. Authorized users are expected to adhere to the user guidance to minimize the risk of compromised data. Authorization can be determined by possessing and providing the device with the correct authorization factor(s) to enable access to the devices.

System Administration: The user identity management functions can provide a system administrator role. Authorization for the administrator can be determined by possessing and providing the device with the correct authorization factor(s) to enable access to the devices and the Management system. The user identity management administrator role can provide the user with appropriate guidance to maintain a secure device. The user identity management can provide system administrators with the tools and technologies to change a user's role, track user activities, create reports on those activities and enforce policies, as appropriate, on an ongoing basis.

Device Administration: The base requirements of the CD model may require the devices to maintain an administrative role (the notion is that there exists a subset of the users of the device that have greater trust than the general user population and who have specific responsibilities). Typically, administrators possess privilege to invoke functionality on the device (CD model) that is not available to general users. The devices in the BYOD model generally do not have an administrative role.

User Enrollment/Device Assignment: User enrollment is generally performed in conjunction with Device Enrollment. Controlled Device Model: the system can provide a secure web portal for users with controlled devices to enroll. Bring Your Own Device Model: the system can provide a secure web portal for users with their own devices (BYOD model) to enroll; the system's BYOD enrollment process can adopt a mobile security approach built around protecting user privacy with provisions to prevent business data from mixing with personal data; the system can also establish policies to prevent the collection of information on BYOD private apps, while maintaining control of system official apps; and these policies can also dictate the ability to selectively wipe system official data without erasing personal information.

Passphrase Policy: Wherever the system and its devices require passphrases, users can be required to set a password or passphrase when the device is first configured to protect the key that will encrypt the data on the device, and to protect against unauthorized access to device functions. It is critical that users select an appropriate passphrase and that their passphrase is never made available to anyone. The use of a platform-provided passphrase mechanism for the device is acceptable. The acceptable complexity of a password can be set by the administrator (and the system policies). The system can check the passphrase selected by the users during enrollment and verify against the system policies. The composition rules for the passphrase should consist of the following: Minimum letters required in password (a-z, A-Z); Minimum lowercase letters required in password (a-z); Minimum non-letter characters required in password (0-9 and special characters +=%_@#$/^&*( )'-":!;?,'.~\|< >{ } [ ]); Minimum numerical digits required in password (0-9); Minimum symbols required in password (+=%_@#$/^&*( )'-":!;?,'.~\|< >); and Minimum uppercase letters required in password (A-Z). The system administrator should set an expiration date for the users' passphrases. Within an appropriate timeframe from the expiration dates, the system (administrator) can require the users to change their passphrases. The system can check that the users choose a unique password each time and do not use previous passwords, including derivatives. The system can implement a policy that the request and use for the users' passphrases can be solely for authentication (i.e., login) purposes.

Passphrase Protection: The users' passphrases can be prevented from being stored in plain-text (clear-text) forms on the devices or in the system servers. The users' passphrases can be cryptographically protected, and hashed and salted as required (highly recommended).

User Notifications: The system administrator can notify the users during enrollment and change cycles/periods that the users should understand the requirements stated within the system's Information Security Policy and/or Mobile Device Policy, as appropriate. The system administrator can notify the users that when setting a password, the users should be careful not to: Use known information about themselves (e.g., address, birthday, pets' names, their names or any information recoverable from the public domain); Include the username or company/enterprise name within their passwords; Set a password that is similar to previous passwords (adding a '1' or "!" to the end of the password is not sufficient); Use simple dictionary words (e.g., Welcome1!); Disclose their passphrases; Write their passphrases down and place them in an area where other people can access (this includes on their computers or in online resources); Re-use the same passphrase for other accounts (e.g., email, Twitter or Facebook); and Provide the password to others, including family members, so that they can use the device.

Device Authentication: Once the device has been configured and cryptographic functions (such as login, encryption) enabled, the users can be required to authenticate to the device every time it starts and every time it becomes locked. A passphrase must be correctly entered to unlock the device. A secondary authentication method/factor may be implemented as an additional step prior to granting access. The device and the system can lock out a user if he/she fails to successfully authenticate after a number of tries. The device and the system can have methods for re-identifying and re-authenticating a user if he/she fails to successfully authenticate after a number of tries. The number of re-tries before lock-outs is set by the policies for the devices and systems. Even when the device is unlocked, the password must be re-entered to change the password. Passwords can be obscured when entered so they cannot be read from the device display and the frequency of entering passwords can be limited. When a configured number of failures occurs, if the system policy dictates, the device can be wiped to protect its contents.

User Identification: From a user perspective and INFOSEC perspective, except for making phone calls to an emergency number, a passphrase must be correctly entered to unlock the device. The user identification-authentication management is also the protective gate function for the data security functions. As an example, correct identification-authentication is the condition for decrypting the contents on the device. Other authentication methods may be considered as permitted by the system policies.

False Identity/Credential Mapping: The device and the system may communicate with dependent products or a separate authoritative source in order to provide identity and credential data to them. Such communications channels/interfaces used to transfer this data can be properly secured via COMSEC methods.

Invalid Users: The system can provide the ability to authenticate valid users and to ensure that invalid users cannot be authenticated to protect resources in the operational system environment from being subject to unauthenticated access.

Device Registration: The system can support registrations of devices for both Controlled Device and BYOD models with two methods as follows: Self-Enrollment: This method lets the users enroll (register) their devices and can simplify MDM device enrollment for users to enroll their mobile devices, and can also provide a self-service portal that allows users to manage common tasks, such as adding or retiring devices, without IT assistance. Bulk Enrollment: This method enables organizations/teams to purchase devices in bulk and automatically enroll these devices in MDM during activation. The system may also provide a third method of Device Staging, in which the system allows the administrator to enroll (register) devices on users' behalf.

Relation to User Identity: The device and the system can enforce a unique relationship between a user identity and the identity of a device. It is also possible that multiple users can share and access the same device.

Device Identity Management: The system can include a method for managing device identity in both Controlled Device and BYOD models with the following capabilities: Create a well-defined process for enrolling (registering) the devices; Define the policies for the type of data that the device will be transmitting and receiving; Establish a naming system for enrolled devices; Determine an identity lifecycle for the devices, making sure it can be modified to meet the projected lifetime of these devices; and Determine procedures for access control to the devices and systems based on the company's policies and relationship with the user identity management.

Managing Unique Identifiers: The system can manage and protect the unique identifiers (UID) and enforce the operations related to these unique identifiers to the confines of their respective purposes. Selection of UIDs to protect is implementation specific and can be reviewed for compliance with the system policies. The major unique identifiers include: IMEI: The International Mobile Station Equipment Identity is a world-wide unique ID for (cellular) mobile devices. This is the real serial number of the device, and usually fixed into the device. IMSI: The International Mobile Subscriber Identity identifies the subscriber identity module or subscriber identification module (SIM) card in Global System for Mobile Communications (GSM), Universal Mobile Telecommunications System (UMTS) and LTE mobile networks, and thus is stored on the same. This is a globally unique identifier—used, for example, by network providers to decide whether a device is allowed on a particular network and which conditions apply (tariff, roaming, etc.). MAC: The media access control address (MAC address) of a device is a unique identifier assigned to network interfaces for communications at the data link layer of a network segment. This MAC address thus identifies the corresponding network interface and is globally unique. Wireless-Fidelity (Wi-Fi) and Bluetooth have each their own MAC address. The MAC address is stored on-chip, and is needed to uniquely identify the device in a network. Additional unique IDs for the version of the device, recommended for management, include: Model number: This is the hardware model (this is also carrier-specific). Platform (Android) version: This is the Operating System (OS) (Android) version. Build number: This is the specific binary image version for the device. Android Security Patch Level.

Managing Unique Identifiers (continued): For Android-powered devices, the following unique IDs exist: Device ID (also Device Serial): Android devices have a serial number. This number should uniquely identify a device. Device Build Fingerprint: This ID identifies the Read Only Memory (ROM) in its specific version. Android-ID (aka SSAID for Settings.Secure # ANDROID ID) is automatically generated when a device is booted up for the first time, and identifies the device (or with multiple users, the currently active user on the device). This ID exists on each and every device running Android. It is stored in a database in the local file system, and can only be accessed with root powers. Starting with Android 8 (Oreo), this ID stops to be global: each app will get its own SSAID, which should limit tracking across apps. GSF Android-ID: This is generated by the Google Services Framework (GSF) when it is first initialized, and thus only exists on devices equipped with Google Apps. Google Advertising ID (GAID): This is a unique, user-resettable ID for advertising, provided by Google Play services. Other Unique IDs may be considered as implementation options.

Managing Multiple Users of a Device: The system can provide a web portal for enrolling multiple users to a single device. The system design can take additional security measures as follows: All user-specific apps, email, settings and Data-at-Rest are removed; and Shared settings and apps are retained for the next user. The device and system designs can also establish the multi-user workflow as follows: Device can always remain under management, even between users, so it can be locked, wiped, located and connected at all times if necessary. User secure sign-in can be tied to the user's group/organization/team (instead of personal) authentication credentials. Certificates can be used to establish identity for email, Wi-Fi and Virtual Private Network (VPN). Enforcing auto-lock to ensure other users cannot access the device when idle. All user-specific business data should be removed upon sign-out. The device and system designs may also include the following personalization functionalities: Personalization of email, apps, connectivity and policy settings for each user. Shared settings, e.g., Wi-Fi and shared apps, are retained across users. User-specific settings, e.g., email and non-shared apps, are only upon sign-in.

Encryption for Confidentiality: The device and the Management servers can employ cryptographic means of encryption to render information inaccessible to anyone (or, in the case of other software on the machine, anything) that does not have the proper authentication credential. Encryption can be employed for data at rest (DAR) and data in transit (DIT) to provide INFOSEC and COMSEC. Integrity algorithms can use Cryptographic Hash Algorithm (SHA)-256.

Encryption of Sensitive Data: The foremost security objective of data encryption and INFOSEC is to force an adversary to perform an exhaustive cryptographic brute-force attack against a prohibitively large key space. This objective can be achieved only if the authorized user of the file encryption product follows good security practices and does not store an authorization factor in the clear. Supporting these security practices are the cryptography-based implementations of additional security measures for the devices. Data on the device can be protected through the implementation of AES-256-based Full Disk Encryption (FDE), which is sometimes called On-Device Encryption (ODE), and which can utilize FIPS-140-2-certified cryptographic algorithms to encrypt the device storage. The use of platform-provided FDE (or ODE) is also accepted. The encrypted data can only be decrypted for the user following the successful user identification-authentication of the rightful user. When the user is finished working with sensitive data from an encrypted file, the device encryption function must re-encrypt this data. From a user standpoint, the encryption functions must be simple enough to operate to prevent the user from simply not encrypting their files. The system (administration) must include instructions to promote secure operational usage. The system therefore can address both the cryptography and implementation requirements necessary to design a secure product, as well as the user and configuration guidance necessary to securely operate the file encryption software (for example, how to disable hibernation).

Authorization: This design guideline does not dictate how these authentication factors are created; a good operational practice is for an administrator to generate the password or passphrase to ensure sufficient entropy.

Additional Crypto-Related Functions: The encryption functionality previously described can be combined with a number of on-device policies in addition to password complexity, including: Local data wipe; Remote wipe; Automatic lock; and Privileged access, such as administrator role and privileges, to security configurations to prevent unauthorized access to the device and stored data.

Removal of Plaintext Data: To address the threat of unencrypted copies of data being left in non-volatile memory or temporary files where it may be accessed by an unauthorized user, the device can be designed to ensure that plaintext data it creates is securely erased when no longer needed. The device design can be responsible for utilizing the appropriate platform-provided method for secure erasure, but the device design is not responsible for verifying that the secure erasure occurred (this will be the responsibility of the platform).

Memory Management for Plaintext: When the device is running, the device design must initiate the request to clear the cryptographic keys and plaintext data, but the device platform will handle the actual instruction. This assurance is thus dependent on the device platform to perform the action of clearing the plaintext data and cryptographic keys. When the device application cleanly closes, the device design must initiate the request to clear the cryptographic keys and plaintext data, but the device platform will handle the actual instruction. This assurance is thus dependent on the device platform to perform the action of clearing the plaintext data and cryptographic keys.

Cryptographic Support: The device can include a cryptographic module with FIPS-140-2-compliant algorithms for a wide range of cryptographic functions, including: asymmetric key generation and establishment, symmetric key generation, encryption/decryption, cryptographic hashing, and keyed-hash message authentication. These functions can be supported with suitable random bit generation, key derivation, salt generation, initialization vector generation, secure key storage, and key and protected data destruction. These primitive cryptographic functions can be used to implement security protocols such as TLS, IPsec and HTTPS, and also to encrypt the media (including the generation and protection of data and key encryption keys) used by the device.

Credentials for Integrity (Certificates): The device, to validate the integrity of security information obtained from other devices and system servers, can be designed with the capability of interpreting the encrypted data it receives using cryptographic credentials (certificates). The device can also provide a mechanism to assert the integrity of data that it sends to devices and system servers so that this data can be trusted. The intent of this objective is to ensure that the device only acts upon data that can be proven to be unaltered. This objective also ensures that data that leaves the device can have its integrity verified. The device can also serve as an 802.1X supplicant, can use X509v3 and validate certificates for EAP-TLS, TLS and IPsec exchanges.

Credentials and Communication Security: The device design can employ cryptographic credentials for: Performing authentication without revealing identifying data; Preventing linkability of transactions; Preventing misuse of delegated credentials; Restricting re-delegation of a credential; Revocation of a credential (revocation checking functions must always be enabled); and Creating safeguards for protecting different types of data, making sure to create privacy safeguards for personally-identifiable information (PII).

Credentials and Communication Confidentiality: The device design, to protect the confidentiality and integrity of transferred identity or credential information to and from other devices and servers, can use sufficiently strong and sufficiently trusted encryption algorithms to protect data in transit. This is also to prevent attackers from learning data that can assist them in compromising other parts of the system operations. The device design is expected to implement a cryptographic protocol to protect this data in transit. Once a secure channel is established, it will subsequently be used to transmit and receive data throughout the system.

Credential Protection: The device design can protect the credentials as stored by the device so that they cannot be accessed in a raw plaintext form, and then subsequently replayed and used to impersonate a user. The implementation of DAR protection, as described previously, can be used for this purpose.

Mobile Device Management: The MDM functions can be designed to perform the server-side functions of User Identity Management and Device Identity Management, including user authentication enforcement. The MDM functions can be designed to provide a comprehensive and intuitive set of self-service tools that allow users to complete basic tasks like enrolling, reporting lost devices and wiping data from lost devices. For multiple users sharing a single device, the MDM functions can be designed to provide the capability of Selective Wipe. The MDM functions should be designed to maintain a group/team/organization app store to give the users a single repository to locate, install and upgrade system-related apps. The MDM function may be designed to provide the following capabilities: Email security; Automatic configuration; and Isolation/retirement of system-related apps.

Secure Device Attestation: The device design can include attestation methods for the following functionalities: Secure communications at the Network layer; Proper operations at the OS layer; Proper operations at the Application layer; and Correct structure of Applications on the device. The device design can report the attestation results to the server for verification. The use of equivalent platform-provided attestation methods, for example Verified Boot, is acceptable.

Logical Protection of the Device: The device can implement protection features and ensure the reliability/integrity of its security features. The use of platform-provided logical-protection methods is acceptable. Examples of logic protection methods include the following: Protecting particularly-sensitive data, such as cryptographic keys; Providing a timing mechanism to ensure that reliable time information is available (e.g., for log accountability); Enforcing read, write and execute memory page protections, using address space layout randomization, and utilizing stack-based buffer overflow protections to minimize the potential to exploit application flaws; Protecting the OS from modification by applications; Providing isolation of the address spaces of applications from one another to protect those applications; Performing self-tests and software/firmware integrity checking; and Verifying digital signatures of applications prior to their installation.

Additional INFOSEC Capabilities (OPTIONAL): Removable Storage Encryption—The device design may implement method(s) to encrypt all files placed onto, or already reside on, removable storage attached to the device. Sensitive Data Protection—The device design may implement the ability to securely store incoming data that is considered sensitive into separate secure container(s) such that it cannot be decrypted without the user logging in.

Mobile Application Management: The MAM functions can be designed for scalable and reliable delivery of system-related apps. The system-related apps to be made available to the users (via the app store) can be approved and selected by the system administrators. The MAM functions can be designed with the capability of delivering to the users any type of app—simple text or rich media, such as video. The MAM functions can be designed with the capability of on-demand capacity to accommodate both forecasted growth and unexpected peaks in demand. The MAM functions can be designed with the capability of end-to-end security to protect the application download process as follows: All connections, including the virtual serial port (VSP) to the App Delivery Network, can be protected using digital certificates, HTTPS and TLS. All apps are cached—files are not permanently stored in the network. Secured facilities can protect all customer data and user IP addresses, while stringent rules and security measures prevent unauthorized access to the data. Authentication: The MAM functions can confirm identity through domain username and password or certificates so only approved users can access system-related apps. Authorization: The MAM functions can allow or block app usage or storage based on device posture. Selective wipe: The MAM functions can remotely wipe app data without touching personal data. Encryption: The MAM functions can ensure that all app data stored on the device are encrypted. Data Loss Prevention (DLP) controls: This capability sets DLP policies, e.g., copy/paste, print and open-in permissions. Reporting: This capability provides app usage statistics.

Software Versioning: The device MAM-related design can be designed with the ability to verify the versions of any software on the device.

Application Control: As part of the device configuration and the system policies, the system administrator may choose to restrict, or apply levels of restriction, to applications on the device.

Managing Applications: The device MAM-related design for the BYOD model should be designed to manage the installation and removal (un-installing) of apps once the BYOD device is enrolled to be managed.

Access Rights and Policy (for CD/BYOD): The device design should implement access controls that reduce mobile user permissions and assist in reducing unauthorized access. The system should establish policies defining user's access to applications and device functions for both CD and BYOD models. At a minimum in the CD model, the user should be able to do the following with the device: Send/receive phone calls (applicable devices only); Send/receive text messages (applicable devices only); Browse the internet; View system information via the Setting menu; Access default applications; and Change certain settings as defined in the system policies.

Mobile Content Management: The MCM functions enable the system administrators to provide access to system-related documents residing in SharePoint, file shares and other content management systems so the users can access them securely from any authenticated device. The MCM functions can be designed to allow users to connect securely and easily to a variety of content repositories. The MCM functions can be designed to allow the users to download content and view, annotate and edit remote files and folders from their authenticated devices, as well as save back changes. The MCM functions can be designed to allow the system administrators to centrally provision access to content repositories, and pre-populate user names, directory paths and allowed devices/repositories. The MCM functions can be designed to provide a secure connection to various disparate content servers.

Secure Browsing of Content Repositories: The MCM functions can be designed to provide a secure browsing solution, and deliver browser-specific tunneling to access system-related web resources without the need for a device-wide VPN.

Secure Communications: The device and the system can support COMSEC per standards such as IPsec (there are numerous Internet Engineering Task Force (IETF) Requests for Comment (RFCs) for IPsec, including RFC 6071). Bluetooth: Secure low-power wireless connectivity technology, e.g., according to core specifications for Bluetooth. Near-Field Communications (NFC): Secure contactless communication between devices. The device can employ VPN using IPsec, Bluetooth or NFC for communications.

Trust Path/Channels: The device can support digital certificates/credentials and the use of 802.11-2012, 802.1X, EAP-TLS, TLS and IPsec to secure communications channels between itself and other trusted network devices.

Example embodiments include various sensors, to enable the NGFR to provide, e.g., physiological and other types of monitoring of responders during incident response. The SmartHub and/or sensors can be configured to perform measurements continuously, at configurable frequencies, and/or to within configurable accuracies. In an example embodiment, the SmartHub can include physiological sensors to measure responder body temperature, heart rate/pulse (e.g., in beats per minute), hydration levels (e.g., as electrolyte content), blood pressure (e.g., in mmHg), respiration rate (e.g., in breaths per minute), oxygen saturation level (e.g., in percent of blood oxygen saturation (SpO2)), blood sugar level (e.g., in concentration of glucose in blood (mg/gL)).

Sensors can be configured to encode data sent to recipients using NIEM, and can be configured to not be able to be powered off by the responder to avoid monitoring. Sensors can be designed to be decontaminated using a hospital grade disinfectant, and ruggedized to withstand public safety operations. For example, the sensors can be configured to operate in a range of temperatures (including extreme temperatures), to withstand multiple shocks of a configurable amount of psi per shock, to be submerged in at least a configurable depth of water for at least a configurable amount of time, to withstand a water spray of a configurable psi, to operate in a configurable percent humidity for at least a configurable amount of time, to operate in the presence of air pollutants while allowing no more than a configurable percent reduction in function after a configurable period of time, to operate after being laundered a configurable number of times (e.g., approximately 500 times, capable of being integrated into garments or textiles), to resist corrosion (e.g., allowing less than a configurable percent loss in weight after a configurable time of operation), and the like.

Sensors of example embodiments also can be configured to aurally, visually, and/or haptically alert the responder and/or an incident commander when a responder physiology level, or other measured level, is not between agency-configurable parameters, falls below an agency-configurable limit, and/or rises above an agency-configurable limit.

Sensors of example embodiments also can be configured to securely send measurements to recipients within a configurable time since taking the measurements, and/or when the measurements differ by a configurable amount from the immediately preceding measurement. Example sensors can securely cache data intended for recipients when connection to a communication network cannot be made, and can cache data by appending new measurements to previously-cached measurements. Example sensors can securely send any cached data to recipients within a configurable number of seconds (e.g., 30) after connection to a communication network is restored, and can be prevented from alerting an out-of-tolerance condition when no such condition exists (e.g., to minimize false alarm rates).

The example embodiments can use sensors sized and arranged such that wearing the Responder SmartHub Physiology Sensors has no detrimental effect on the wearer's ability to successfully perform mission-related tasks, e.g., complying with a configurable weight limit for the sensors and associated sensor equipment such as the hub and/or controllers. A visual display can be provided that indicates out-of-tolerance parameters and actual readings. Example embodiments can include a form of input/acknowledgement, for the responder to acknowledge the activated auditory and haptic alarms, thereby shutting off the auditory and haptic alarms, but not impacting the visual display.

In an example embodiment, once an alarm has activated and been acknowledged, that alarm will not be reactivated until the physiological measurement is once again out of the normal range after having returned to the normal range. Audio alarms indicating that a physiological measure is out of tolerance can be configured to be clearly different from any other alarm to which the responder would need to respond. In embodiments where the audio alarms and signals are to be heard and understood through equipment or garments (e.g., helmets and ear covering), audio signals can be loud enough to compensate for the attenuation characteristics of the garments without exceeding 115 dB(A). In an example embodiment, if two or more physiological measures are out of tolerance simultaneously, the alarm associated with the highest priority condition can be presented first.

In an example embodiment, if the responder must wear earphones covering both ears during normal equipment operation, the audio warning signal can be directed to the user's headset, as well as to the work area. Where responders may be required to read the physiological monitoring alarm visual display while wearing eye or face protective gear, displays can be designed for foveal vision under relatively high levels of illumination using symbols that subtend not less than 5.8 mrad (20 arc minutes) of visual angle. In embodiments, a visual display can be readable at all illumination levels from low light levels (e.g., <150 lux) to high light levels (e.g., >10000 lux). Audio warning signals can be configured to include two sequential elements: an alerting signal and an identifying or action signal. When reaction time is important and a two-element signal is necessary, an example alerting signal of 0.5 second duration can be provided. Important information can be transmitted in the first 2.0 seconds of the identifying or action signal.

In example embodiments, the sensors can be configured such that a full load carried by a first responder, including clothing, equipment, tools and the ensemble, cannot exceed 30 percent of the responder's body weight. The shape of sensors, controls and displays, and items attached to the ensemble can be free of sharp edges or projections that may be harmful to the user or snag on structures or undergrowth. The example sensors can be integrated into responder PPE whenever feasible. For example, an ensemble with all attachments can support the first responder's mobility in that its size, weight, weight distribution, placement and attachment to the body is suitable for the environment and workflow, and can be worn going through all expected range of limb and whole body motion. Sensors can be removable to facilitate maintenance of the sensors, and the sensors can interface with other NGFR subsystems or devices.

Example embodiments can address chemical sensing performance capabilities. For example, chemical sensors can measure a given chemical in parts per million (PPM). Chemical levels can be measured continuously, and/or with at least a configurable accuracy. Example sensors can be configured to aurally, visually, and/or haptically alert the responder and/or an incident commander when chemical levels exceed a configurable percent Permissible Exposure Limits (PEL).

Example embodiments can include specifically configured biological sensors to detect various biological agents, including the detection of tularemia, anthrax, smallpox, botulinum toxin, bubonic plague, and/or viral hemorrhagic fever. Examples also can measure agents in Immediately Dangerous to Life or Health (IDLH) values. Example biological sensors can be configured to aurally, visually, and/or haptically alert the responder and/or an incident commander when agent levels exceed a configurable percent IDLH value.

Example embodiments can involve specifically configured radiation sensors, e.g., to detect ionizing radiation. For example, sensors can be configured to detect alpha particles (e.g., in isotope-specific counts per second (cps)), beta particles (e.g., in isotope-specific cps), gamma particles radiation (e.g., in isotope-specific cps millirems), neutron particles (e.g., in isotope-specific cps), and the like. Sensors can identify the specific isotope, and visually, aurally, and/or haptically notify the responder and/or incident commander of the specific isotope.

Example embodiments can be configured with explosive sensors, configured to identify explosive compounds, explosive families, and/or explosive precursors.

Example embodiments can be configured with red force sensors, configured to detect and track Red Force elements on scene. Sensors can detect person(s) in the responder's vicinity, differentiate other responders from non-responders, indicate the direction of non-responders located within a configurable distance, indicate the distance to non-responders located within a configurable distance, detect weapons in the responder's vicinity, indicate the direction of weapons located within a configurable distance of the responder, and/or indicate the distance to weapons located within a configurable distance of the responder.

Example embodiments can be configured with moving object, gunshot, and/or other sensors, configured to detect and identify fast-moving objects approaching the responder, detect moving objects, detect moving objects within a configurable distance of the responder, detect objects moving faster than a configurable speed, indicate when a moving object is detected, visually, aurally, and/or haptically alert the responder and/or incident commander when a moving object is detected, identify the origin of shots fired on the incident scene, detect gunshots, detect gunshots within a configurable distance of the responder, calculate the direction of the gunshot origin, calculate the distance to the gunshot origin, and/or inform incident command when a gunshot is detected.

Example embodiments can be integrated into Personal Protective Equipment (PPE), such as Next Generation First Responder (NGFR) garments. Various example sensor systems as described herein can be incorporated into NGFR garments, and be configured to provide blood-borne pathogen resistance to meet ASTM 1671 standards, protect against weather extremes, withstand weather temperatures up to a configurable temperature, withstand weather temperatures down to a configurable temperature, enhance comfort during response activities, provide moisture-wicking capability, be able to wick away from a surface a configurable volume of water per square inch, maintain an interior temperature of no less than a configurable temperature, maintain an interior temperature of no more than a configurable temperature, not hinder responder dexterity or range of movement, provide a configurable number of degrees of range of motion for extremities (arms, legs, fingers), be able to be laundered by response agency (e.g., laundered by an agency at least 500 times and retain textile functions), withstand sanitizing temperatures (a configurable temperature for a configurable duration) during laundering and retain textile functions, be able to be decontaminated by response agencies, and/or provide greater levels of protection in discipline-specific (e.g., fire responder, medical technician, police) areas of the body.

In yet further example embodiments, various example sensor systems as described herein can be incorporated into NGFR garments, and be configured to provide garment/component systems (garments, sensors, other components) that can resist contamination and/or be easily decontaminated, resist the absorption of contaminants, use materials for which decontamination is possible after absorption of contaminants, resist absorption of blood-borne pathogens, resist absorption of carcinogens, resist absorption of products of combustion, release all absorbed contaminants during standard decontamination procedure, indicate that decontamination was successful (that absorbed contaminants have been released), indicate the level of absorbed contaminants, indicate the level of blood-borne pathogen absorbed, indicate if the level of blood-borne pathogen absorbed is below a configurable permissible limit, indicate if the level of blood-borne pathogen absorbed is above a configurable permissible limit, visually indicate the level of carcinogens absorbed, indicate if the level of carcinogens absorbed is below a configurable permissible limit, indicate if the level of carcinogens absorbed is above a configurable permissible limit, visually indicate the level of products of combustion absorbed, indicate if the level of products of combustion absorbed is below a configurable permissible limit, indicate if the level of products of combustion absorbed is above a configurable permissible limit, indicate the type of absorbed contaminants, indicate the type of blood-borne pathogens absorbed, indicate the type of carcinogens absorbed, and/or indicate the type of products of combustion absorbed.

In additional example embodiments, various example sensor systems as described herein can be incorporated into NGFR garments, and be configured to provide PPE garment/component systems (garments, sensors, other components) having interfaces, which can provide standardized interfaces between garment layers and between garment and PPE, use a universal interface between layers and pieces, provide interface units to join or cover gaps between upper torso gear and hand gear (gloves), withstand immersion in a configurable depth of water for a configurable time, prevent infiltration by airborne particulate matter (dust, smoke, ash), provide interface units to join or cover gaps between upper torso gear and head/face gear (e.g., helmets, facemasks), and/or provide interface units to join or cover gaps between lower leg gear (pants) and foot gear (shoes or boots). Example interfaces are configurable to provide the various capabilities as described herein regarding sensors, such as water immersion, shock, and the like.

In further example embodiments, various example sensor systems as described herein can be incorporated into NGFR systems, and be configured to provide respiratory protection in oxygen-available environments that can provide protection from airborne contaminants in an oxygen-available environment, provide protection from airborne contaminants where self-contained breathing apparatus (SCBA) is not required, prevent inhalation of a configurable percent of airborne particles smaller than a configurable size (e.g., in microns), allow operation for at least 12 hours, provide very low breathing resistance, provide a configurable (e.g., 400 liters/minute) peak inhalation rate with positive pressure, include a residual life indicator, indicate residual life remaining as a percentage of total life, maximize peripheral field of view, provide a configurable number of degrees of unobstructed view, and/or not obscure vision due to fogging.

In yet additional example embodiments, various example sensor systems as described herein can be incorporated into NGFR systems, and be configured to provide respiratory protection in oxygen-deficient environments that can provide advances in respiratory protection in an oxygen-deficient environment, protection from airborne contaminants when SCBA is required, universal connection to mask, helmet and/or other gear, provide ergonomic connection that can be connected, removed and reconnected easily during operation, be able to be connected or disconnected in less than a configurable time, prevent infiltration by airborne particulate matter (dust, smoke, ash), be able to be decontaminated by hospital-grade disinfectant, allow operation for at least 4 hours under stress, provide indications of remaining air based on responder's current rate of respiration, display information on a respiratory protection face piece, and various other features regarding respiratory protection as described above. Furthermore, example embodiments can be integrated into NGFR SCBA that can measure remaining O2 as percent, measure remaining O2 periodically at configurable intervals (e.g., every 3 minutes), measure remaining O2 with a configurable accuracy (e.g., within 2 percent), calculate time till O2 is depleted (e.g., in minutes), calculate time till O2 is depleted using the most recent (e.g., 3) measurements, visually, aurally, and/or haptically alert the responder and/or the incident commander when remaining O2 level falls below 20 percent and/or when time till O2 depletion is less than a configurable time (e.g., 5 minutes). Example embodiments of NGFR SCBA can indicate when the external environment meets user-configurable measurements for removal, measure external oxygen levels periodically (e.g., every 5 seconds), indicate it is safe to remove SCBA gear if external oxygen levels are above a configurable percent, provide very low breathing resistance, and/or provide a configurable (e.g., 400 liters/minute) peak inhalation rate with positive pressure.

In further example embodiments, various example sensor systems as described herein can be incorporated into NGFR systems, and be configured to provide a communications infrastructure that is interoperable with current communications systems and devices, capable of integration with existing communications devices, receiving of communications originating from an agency's current communication system, sending of communications that are received by an agency's current communications system, implementation of integrated voice, text and video communications, provide and transmit/receive voice, text, and/or video communications, allow for hands-free operation, provide an indication to the responder that new communications have been received, haptically, aurally, and/or visually notify a responder that new communications have been received, be able to transmit pre-defined emergency messages indicating a life-threatening situation, be able to transmit communications data over Band Class 14 radio networks, be capable of using real-time speech recognition to convert audio to text, achieve speech recognition at no less than a configurable percent accuracy, be capable of using real-time speech transcription to convert text to automated speech, achieve speech transcription at no less than a configurable percent accuracy, provide the capability to translate speech between languages, be capable of translating real-time foreign language speech into English, be capable of translating real-time English speech into a foreign language, achieve speech translation at no less than a configurable percent accuracy, be capable of over-the-air programming, ensure that voice communications are intelligible by the receiver no less than a configurable percent of the time, provide ambient noise canceling capabilities that reduce ambient noise in the received communication by a configurable percent, employ noise canceling capabilities that ensure the spoken communication is received without distortion, be capable of recording incoming video communications, store at least a configurable duration of recorded video, encrypt stored video recordings, be capable of recording incoming audio, store at least a configurable duration of recorded audio, encrypt stored audio recordings, be capable of streaming real-time video to other NGFR systems, be capable of streaming real-time audio to other NGFR systems, be able to consume data from any system that conforms with NGFR connectivity rules, protocols and data standards, be capable of receiving communications originating from a dissimilar NGFR Communication System, and/or be capable of sending communications that are received by a dissimilar NGFR Communication System.

In yet additional example embodiments, various example sensor systems as described herein can be incorporated into NGFR systems incorporating Personal Area Networks (PANs), and be configured to provide network connectivity for one or more phases of incident response, provide Personal Area Networks (PAN) to enable wireless connectivity of Responder SmartHub components, be able to support up to a configurable number of devices assigned to a single responder, extend no more than a configurable distance from the responder, be provisioned to only provide access by devices assigned to a single responder, allow only devices assigned to a single responder to wirelessly communicate with only devices assigned to a single responder, prevent the Responder SmartHub PAN or modules that connect to the PAN from exceeding the capacity of the network, provide a mechanism to allow communication between NGFR Networks, provide continuous connectivity in environments where existing communications networks are known to be degraded, provide continuous connectivity to responders operating inside a building, provide continuous connectivity to responders operating inside a tunnel, provide continuous connectivity to responders operating in a densely constructed urban environment and/or provide continuous connectivity to responders operating in an environment with sparse infrastructure.

In yet additional example embodiments, various example sensor systems as described herein can be incorporated into NGFR systems incorporating Incident Area Networks (IANs), and be configured for bridging or connecting multiple IANs, which can be quickly deployed for operation and can be portable. For example, NGFR systems including IANs can be configured to take no more than a configurable duration from arrival on the incident scene to be operational. Example systems can be configured to have the ability to connect with other NGFR Networks to enable linked NGFR Networks for extended network connectivity.

Example embodiments are configurable to provide network and security services. For example, embodiments can be configured to authenticate users, prioritize data and messaging based upon agency configuration settings/business rules, allow authorized users to alter the prioritization of data and messages, transmit emergency communications on Responder SmartHub Networks with high priority, control access to data by a permission system based upon user privileges/role-based access controls, grant access using role-based access controls, integrate with existing LMR systems that may be using multiple bands, employ signal boosting for poor LMR network coverage, be P25 compliant, use non-trunked radio communication systems, associate with an authenticated user for Responder SmartHub Systems connected to a Responder SmartHub Network, identify user, role and permissions/certifications, comply with NGFR-directed data exchange models, ensure data received from other systems has a method of ensuring data integrity, add or remove sensor or system/kit components without failure or disrupting operations, ensure failed kit modules will not disrupt operations, enable Responder SmartHub Authorized Users to perform maintenance on Responder SmartHub Networks without degradation of service, not degrade network function when performing self-tests and diagnostics, operate on battery power for up to a configurable duration, support dynamic networking, not have a single point of failure where economically feasible, be self-healing, and/or support ad-hoc networking.

Example embodiments are configurable to provide data access and data provisioning, e.g., for building plans and schematics, and data feeds/plugins generally. For example, embodiments can be configured to provide a graphic depiction of building data to responders and command, display building data that is compliant with NGFR connectivity rules, protocols and data standards, provide a depiction of building structures/infrastructures in a graphical user interface (GUI), include a depiction of building entry points, stairwells, elevator shafts, water systems, fire department connections (FDCs), standpipe fire hose connections (FHCs), fire pumps, fire alarm and communication systems, firefighter air replenishment systems (FARS), on premise fire hydrants, key boxes, and/or utility controls. Embodiments can be configured to provide a building layout including a depiction of a building floorplan in a GUI, and the building floorplan can include floor designations, room designations. The NGFR building layout can include a depiction of other building information in a GUI, building security stations, building security plans, the location of hazardous materials within the building, exterior items that may obstruct responder access, and/or a depiction of building numbers or designations when part of a larger campus, office park or building complex. Embodiments can display data using a 3-D graphic depiction, allow responder mark-up, receive data from incident command software programs, receive data from WebEOC, receive data from a configurable source, convert building data into a digital format on scene when only a paper copy is available, use an open data standard or non-proprietary interface for converted building data, provide responders and command access to incident-relevant data, obtain data identified by responders as necessary for incident response, pull data from static data feeds upon request or query, pull data from dynamic data feeds upon request or query, allow the user to customize pull frequency for selected data feeds, integrate data identified by responders as necessary for incident response, integrate data from static and dynamic data feeds upon request or query, integrate data provided in multiple file formats, provide incident data to authorized users, ensure packet transfer delay does not exceed a configurable metric, ensure packet loss ratio does not exceed a configurable metric, and/or ensure packet error ratio does not exceed a configurable metric. Embodiments can be configured to provide a visual display of incident data where appropriate, allow users to customize the visual display of incident data and the layout of the visual display, allow users to choose the content of the data displayed, allow users to view incident data on any trusted networked computing device, allow queries of incident data as limited by agency policy and controls, allow users to query incident data, allow the system to query incident data, allow users to query across multiple data sources with one request, display data generated in response to queries, allow a prioritized retrieval of data, allow the user to assign priority to the data being retrieved by its type of data, and/or allow the user to assign priority to the data being retrieved by query.

Embodiments can be configured to interact with data access through multiple agencies. For example, embodiments can be configured to provide access to response and resource data from agencies committed to support operations through mutual aid, support mutual aid data that conforms with NGFR connectivity rules, protocols and data standards, support computer-aided dispatch (CAD) to CAD that conforms with NGFR connectivity rules, protocols and data standards, obtain data from response agencies supporting operations through mutual aid, identify data to be pulled from supporting response agencies, pull data from supporting response agencies upon request or query, provide command with resource data from supporting response agencies, provide command with data on the type of resources being provided by supporting response agencies, provide command with data on the quantity of resources being provided by supporting response agencies, calculate the timeline for arrival of resources being provided by supporting response agencies, allow command to prioritize resources requested through mutual aid, display data pulled from supporting response agencies, and/or integrate data from supporting response agencies with incident data.

Embodiments can be configured to integrate with data. For example, embodiments can be configured to integrate incident data with data from multiple sources to provide a comprehensive picture of hazards on the incident scene, integrate data from threat sensors, the sensor integration including data from chemical hazard sensors, biological organism sensors, ionizing radiation sensors, and/or explosive compound sensors, the sensor integration including Red Force location data, oxygen percentage data, data on fast moving objects, and/or data on the origin of shots fired. Example responder SmartHub embodiments can be configured to integrate threat sensor data with model outputs, as provided, into the Responder SmartHub display, including outputs from air hazard models, contaminant migration models, explosive power/air blast models, and/or population dispersion models. Example Responder SmartHub embodiments can be configured to integrate threat sensor data with other pertinent data, as provided, into the Responder SmartHub display, the other data including current weather data, weather projections, traffic data, and/or Google traffic data. Example Responder SmartHub embodiments can be configured to provide a GUI that displays integrated data from threat sensors, display sensor data using geographic information system (GIS)-enabled maps, ensure integrated sensor data can be consumed by incident command software programs by providing data in the standards identified by NGFR, ensure integrated sensor data can be consumed by WebEOC, and/or ensure integrated sensor data can be consumed by a configurable type of data consumer. Example Responder SmartHub embodiments can analyze integrated sensor data for a combined assessment of existing hazards and provide the results of that combined assessment to the first responder.

Embodiments can be configured to provide data display. For example, embodiments can be configured to interact with a head up display (HUD), and display system-provided data, incident-related data as fed from kit or core modules, the location of identified hazards that are within a configurable distance of the responder, the location of hazardous chemicals, explosive compounds, and/or Red Force elements, display data related to suspects or persons of interest, thermal image data, and/or the location of other responders on the incident scene. Example Responder SmartHub embodiments can be configured such that notation of responders is distinct from notation of Red Force elements, and can be configured to identify the type of all hazards that have been identified and entered into the system within a configurable distance of the responder. Example Responder SmartHub embodiments can be configured to allow the responder to mark the location of hazards on the visual display, and/or display data specific to the individual responder as filtered/managed by user/agency configurable parameters, display responder-specific physiological data, heart rate, body temperature, responder-specific equipment data, SCBA cylinder level data, visual alerts including when new hazards are identified, when responder-specific physiological data meets pre-established criteria, when responder heart rate exceeds a configurable rate (e.g., in beats per minute (BPM)), when responder body temperature exceeds a configurable temperature (e.g., degrees Fahrenheit), when responder-specific equipment data meets pre-established criteria, and/or when SCBA air pressure drops below an agency-configured level.

Embodiments can be configured to interact with incident data. For example, embodiments can be configured to allow responders to contribute to incident data by transmitting data back to the Incident Management System, allow authorized users to upload incident data, allow users to determine access privileges for information they have contributed, allow communications between suitably-equipped physical objects and Internet-enabled devices to facilitate response operations, be able to consume Internet-enabled data from any system that conforms with NGFR connectivity rules, protocols and data standards, allow to be connected to the Internet devices such as radios, phones, tablets, computers, response equipment, and/or response apparatuses. Example NGFR embodiments can be configured to provide a unique identifier for all objects on the incident network, ensure that communication between physical and Internet-enabled objects occurs without user intervention, provide the ability to automate processes using integrated data, enable networks and devices to function in an integrated fashion to facilitate response operations, enable interoperability between approved components, devices and software, be able to digest NIEM data elements, use non-proprietary software where feasible, and/or use open-source code where feasible.

Embodiments can be configured to interact with casualty data. For example, embodiments can be configured to track the status of incident casualties from detection through reunification, consume casualty-related data that conforms with NGFR connectivity rules, protocols and data standards, aggregate patient vital signs for the purposes of triage, measure patient vital signs such as body temperature, heart rate, and/or blood pressure, detect contaminants on patients, perform measurements periodically at a configurable interval, store patient vital signs, use a GUI to display patient vital signs, track the decontamination status of casualties, record a unique identifier for patient personal effects, monitor the medical status of casualties after triage, track the locations of casualties within the medical system, track victims when casualties are released from medical care, geolocate casualties on incident scene, geolocate casualties to within a configurable distance for x, y and z coordinates, display the location of casualties on GIS-enabled display, and/or include a confidence level for casualty geolocation.

Embodiments can be configured to interact with data layers. For example, embodiments can be configured to provide an integrated visual display of incident data, e.g., display incident data in layers, integrate incident data with a GIS-enabled map layer, integrate with model projection layers, traffic data layers, property ownership data layers, and/or satellite damage imagery layers. Example Responder SmartHub embodiments are configured to allow users to customize NGFR GUI data layers, integrate with Next Generation Incident Command systems, and/or allow users to markup GUI.

Embodiments can be configured to interact with video. For example, embodiments can be configured to provide responders and command with access to open- and closed-source video feeds, be able to display video feeds authorized by command, connect to video feeds including live video feeds, e.g., from traffic cameras, closed-circuit cameras, vehicle-mounted camera feeds, and/or body-mounted camera feeds, ensure data transfer latency does not exceed a configurable value, transmit live video feeds to command upon notification of responder health emergency, prioritize transmission of live video derived from CCTV and public safety camera systems after "officer down" notification, prioritize transmission of live video derived from CCTV and public safety camera systems after "officer in distress" notification, prioritize transmission of live video derived from CCTV and public safety camera systems after Personal Alert Safety System (PASS) alarm sounds, transmit live video feed to command within a configurable duration of alarm, display live video feeds on any trusted networked computing device, display video feeds at a configurable resolution, display a list of available live video feeds upon user request, and/or display user-specified live video feeds upon request.

Embodiments can be configured to interact with location services. For example, embodiments can be configured to identify the location of responders tied to latitude, longitude and altitude coordinates, geolocate responders to within a configurable distance for x, y and z coordinates, geolocate responders that are working inside of buildings at the incident scene, geolocate responders that are working underground at the incident scene, geolocate responders that are working in building levels that are below ground level at the incident scene, geolocate responders that are working in tunnels at the incident scene, geolocate responders that are up to a configurable depth below ground, geolocate responders that are working outdoors at the incident scene, geolocate responders over a configurable area (e.g., in square miles) at the incident scene, identify the location of responders at the incident scene periodically at a configurable interval (e.g., every 3 minutes), prevent deactivation by responder during an incident, incorporate a confidence level to indicate the accuracy of location, identify the source of geolocation data, use available non-public-safety sources (e.g., building Wi-Fi) to improve accuracy, encrypt responder geolocation data, store responder geolocation data, e.g., use system components worn on the responders body to store responder geolocation data on the device for a period of a configurable duration, cache responder geolocation location data when connection is interrupted, transmit responder geolocation location data to command, transmit responder geolocation data to command within a configurable time of when the systems receive the data, securely transmit responder geolocation data to a destination hub and/or desired devices, forward cached responder geolocation data immediately when connection is restored, following a data connection interruption, forward the most recent a configurable duration of data first when network connectivity is restored, transmit blue force location data to command using configurable security protocols, display responder geolocation data for selected responders on a GUI, integrate the responder geolocation data with proximity to threats and hazards, display the type of threat, the geolocation of the threat, and/or the proximity of the responder to the threat in feet, integrate responder geolocation data with plume data, integrate responder geolocation data with projected plume movement data, integrate responder geolocation data with data generated by NGFR threat sensors, integrate responder geolocation data with digital building information, integrate responder geolocation data with digital building layout, integrate responder geolocation data with digital terrain information, integrate responder geolocation data with responder-specific physiological data, include responder heart rate data, body temperature data, geolocation data with responder-specific equipment data such as SCBA cylinder level data, integrate responder geolocation data with responder safety alarms, provide notification when a PASS alarm is activated, provide notification upon "officer down" notification, and/or provide notification upon "officer in distress" notification.

Embodiments can be configured to interact with location data access. For example, embodiments can be configured to utilize responder geolocation data to provide data to applications on networked devices, allow devices to access responder location, allow applications to access responder location, allow individuals to turn some location-based data feeds on and off, prompt responders regarding the location of user-configurable GIS-enabled features, prompt responders regarding the location of the nearest fire hydrant and indicate the status of the hydrant (working, tagged-out, etc.), prompt responders regarding the location of the nearest hospital and provide the status of the hospital (accepting new ER patients, not accepting new ER patients, etc.), prompt responders regarding the location of the nearest fuel supply and indicate its status, prompt responders regarding the location of the nearest potable water supply, prompt responders regarding the location of the nearest medical cache and indicate its status and general contents, prompt responders regarding the location of the nearest equipment storage and indicate its status and general contents, and/or prompt responders regarding the proximity of additional user-configurable GIS-enabled features.

Embodiments can be configured to interact with social media. For example, embodiments can be configured to access social media data feeds to support situational awareness and response operations, consume social media data that conforms with NGFR connectivity rules, protocols and data standards, aggregate public Twitter data, Facebook data, and/or Instagram data, identify threats of configurable type(s) from social media data, integrate social media data with open intelligence sources, integrate social media data with traffic cameras, integrate aggregated social media data with open environmental sensors, integrate aggregated social media data with Google traffic data, integrate social media data with closed intelligence sources, allow the user to filter social media information, allow the user to filter social medial information by location, allow the user to filter social medial information by topic, and/or allow the user to filter social medial information by hashtag.

Embodiments can be configured to interact with alerts. For example, embodiments can be configured to provide alerts and notifications, provide command and/or the responder with alerts, provide alerts to command and/or the responder via audible cues, bells, horns, speakers, chimes, buzzers or sirens, provide alerts to the command and/or the responder at user-set variable volume, provide command and/or the responder with alerts via visual cues, provide alerts to the command and/or the responder via lights, textual data or images, provide visual alerts to the command and/or the responder at user-set variable brightness levels, provide alerts to the command and/or the responder via haptic cues, provide alerts to the command and/or the responder via vibration, provide alerts to command and/or the responder in a manner not discernible by adversaries, as configured by agency, generate recommended alerts to command and/or the responder when site-specific thresholds have been reached, and/or generate recommended alerts to command and/or the responder when pre-set thresholds have been reached.

Embodiments can be configured to interact with information and analysis. For example, embodiments can be configured to integrate incident-specific information with available model outputs into decision-making processes, collect incident-specific information for inclusion in predictive analysis, access pre-incident plans, predictive analysis models, predictive hurricane analysis models, predictive flood analysis models, and/or predictive earthquake analysis models, calculate a level of confidence for results of predictive analysis, display trend data statistically and across the incident timeline, and/or produce data outputs that are able to plugin to incident command software programs.

Embodiments can be configured to implement risk assessment. For example, embodiments can be configured to provide recommended decisions or courses of action for decision points, integrate actual and projected incident data, and/or include actual incident data, sensor data, technical calculations, social media data, responder reporting of scene conditions, projected incident data, model outputs, and/or pre-planning data. Embodiments also can be configured to guide command through identified decision points, protective action decisions, and/or shelter/evacuation decisions, provide recommended courses of action at decision points, provide confidence levels for decision recommendations, indicate where key inputs are missing to support decision-making, incorporate criteria levels established during pre-planning levels, incorporate user-defined criteria, and/or plug in to incident command software programs.

Embodiments can be configured to implement Human Systems Integration. For example, embodiments can be configured to be usable such that their operation is intuitive (meets user expectations), standardized, informative and compliant with human systems integration (HSI) design criteria. Such compliance can be based on, e.g., their displays and/or GUIs being understandable, consistent, and standardized, their controls and displays associated with incident data retrieval, review, integration, fusion, presentation and dissemination being compliant with HSI design criteria, their controls and displays (e.g., those associated with response agency data retrieval, review, integration, fusion, presentation and dissemination, with integration of response agency data with incident data, with video data and video feeds control, retrieval, review, integration, fusion, presentation and dissemination, with incident information handling, retrieval, review, integration, fusion, and/or presentation and dissemination) can be compliant with HSI design criteria. Example embodiments are configured to enable first responders to be provided with essential elements of information when they are needed, e.g., based on controls and displays associated with essential elements of information handling, retrieval, review, integration, fusion, presentation and dissemination being compliant with HSI design criteria. Individual first responders can be correctly identified through geolocation displays 99 percent of the time, based on example controls and displays associated with geolocation graphical user interfaces being usable in that their displays are understandable, consistent, standardized and compliant with HSI design criteria. The display of example incident data integrated with data from other sources is configured to be usable in that the data displays are understandable, consistent, standardized and compliant with HSI design criteria. Example user interfaces provided to first responders can be configured to facilitate the development and maintenance of situational awareness, and the formulation of appropriate and timely decisions in that they are compliant with HSI design criteria. For example, information presented to a first responder by embodiments implementing HUDs can be configured to be readable in all conditions of ambient light, weather and low visibility, which the HUD design is compliant with HSI design criteria. The design of example alerts and notifications is configured to be compliant with HSI design criteria. The display of example incident data integrated with output from models is configured to facilitate and support development and maintenance of situational awareness and decision making and is configured to be compliant with HSI design criteria. The example decision support systems are configured to facilitate and support development and maintenance of situational awareness and decision making and are configured to be compliant with HSI design criteria.

Figure 11:
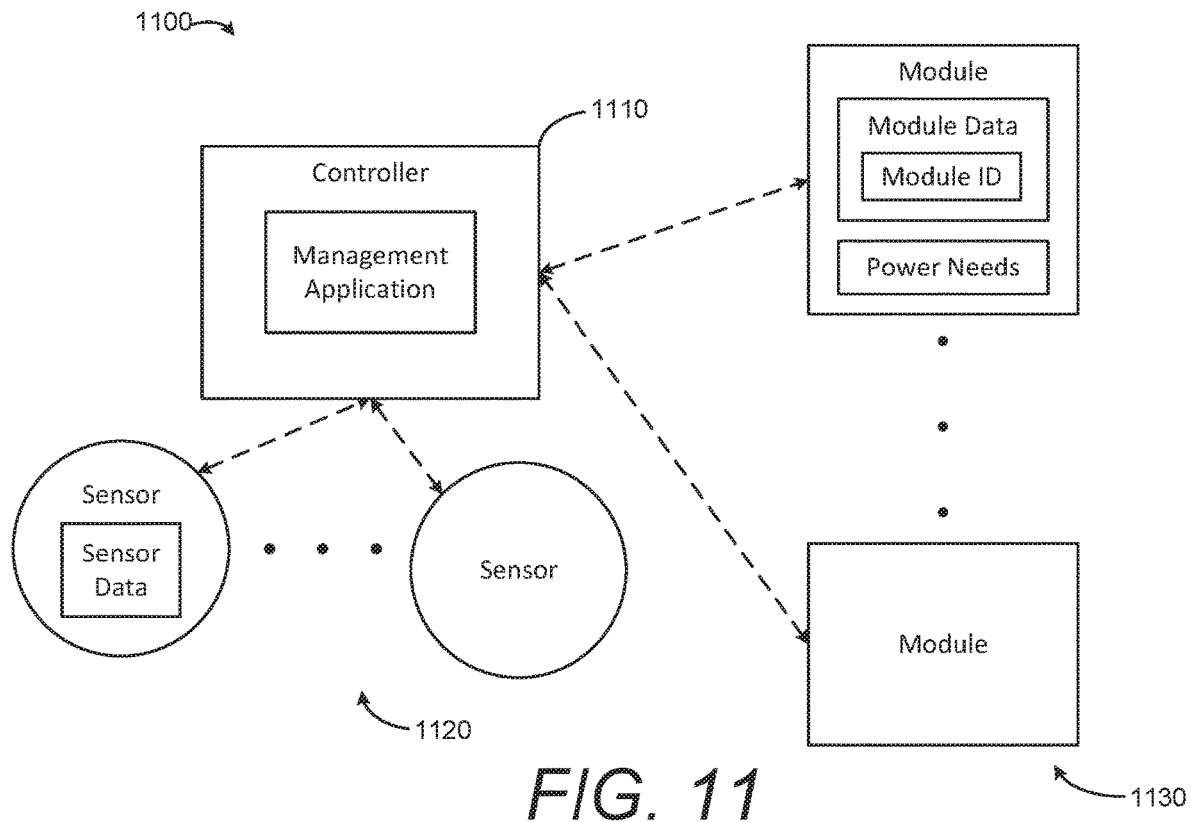
FIG. 11 illustrates a first responder system according to an example embodiment.

FIG. 11 illustrates an example system 1100 including a controller 1110, a plurality of sensors 1120, and a plurality of modules 1130. The controller 1110 includes a management application. The sensors 1120 can include sensor data. The modules 1130 can include module data and power needs. The module data can include a module ID. The sensors and modules interface with the controller to obtain and interact with sensor data. The management application can register and manage the modules, e.g., based on a module ID assigned to the module which enables the management application to identify the module (e.g., by referencing a catalog using the module ID) and identify how to communicate and otherwise interact with the module. For example, the controller can identify that the module includes power needs that can be satisfied by the controller, without a need for a separate power module.

Figure 12:
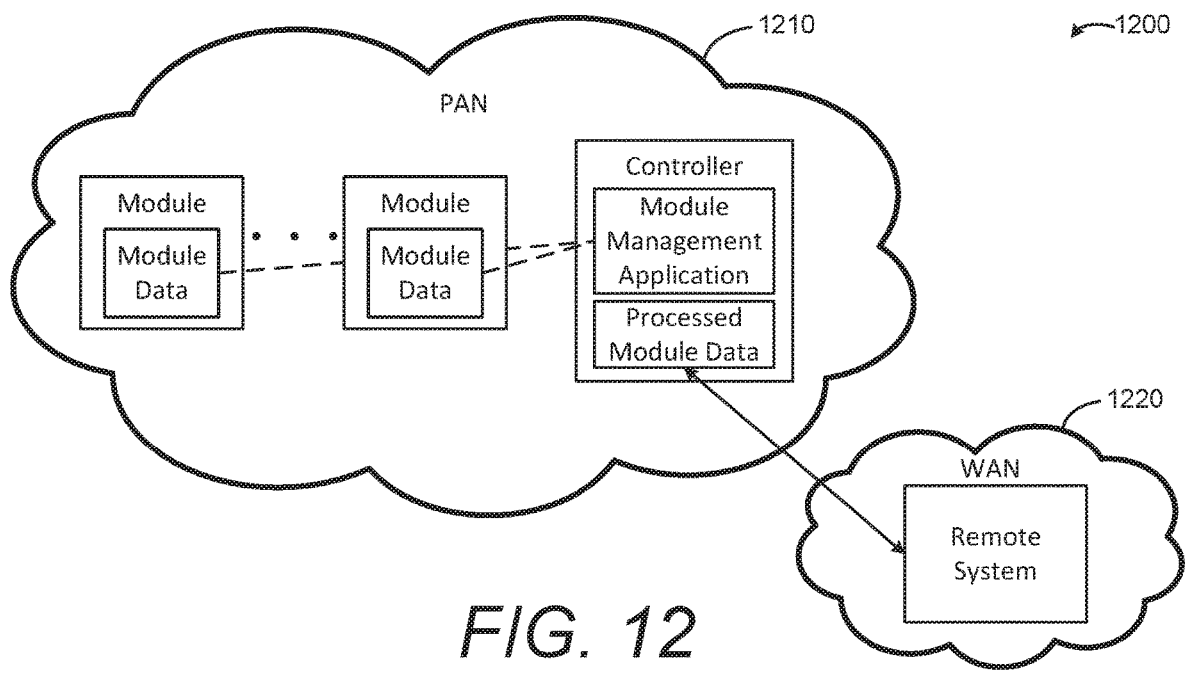
FIG. 12 illustrates a first responder system according to an example embodiment.

FIG. 12 illustrates an example system 1200 including communication between a PAN 1210 and a WAN 1220. The PAN 1210 is formed by communication capabilities between various modules and the controller. For example, the module management application operated by the controller can establish communications with the modules to exchange module data. The controller can then analyze the module data and provide processed module data. The processed module data can be passed to a remote system in the WAN 1220 via WAN communications capabilities supported by the controller and the remote system.

Figure 13:
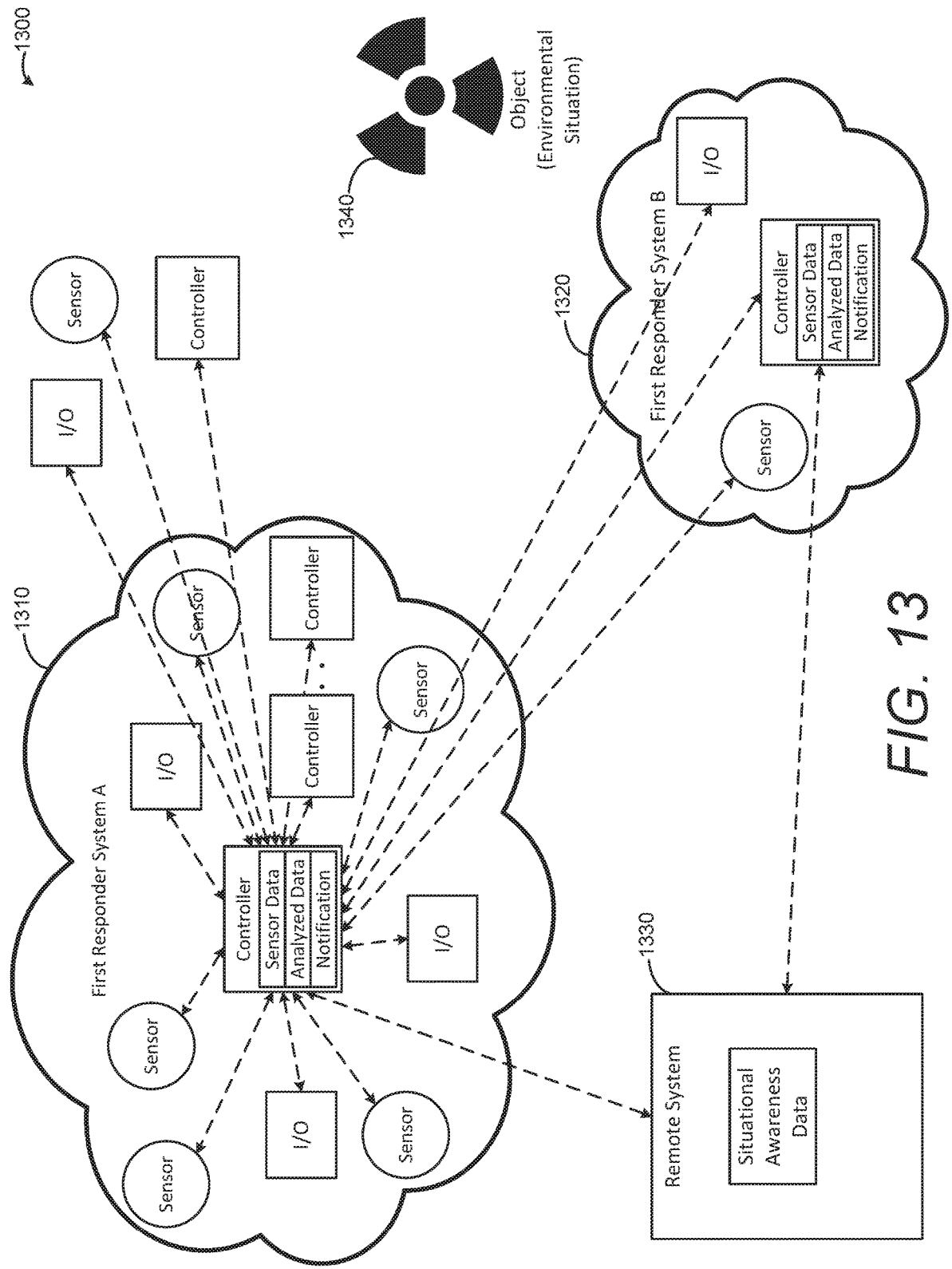
FIG. 13 illustrates a first responder system according to an example embodiment.

FIG. 13 illustrates an example system 1300 including a plurality of systems (first responder system A 1310, first responder system B 1320, remote system 1330) and an object, e.g., an environmental situation 1340. The controller of a given system can establish communications with its associated sensors, I/Os, controllers etc. (e.g., forming part of its PAN), but also with other systems, controllers, sensors, etc. (e.g., those that do not form part of that controller's PAN). Accordingly, it's possible for first responder system A 1310 to indirectly detect the object 1340, e.g., via reading the information from those sensors/controllers/systems that are within sensing proximity to the object 1340. For example, the first responder system B can sense the object 1340, communicate information back to the remote system 1330, which can then relay the information of sensed object 1340 to the first responder system A 1310.

Figure 14:
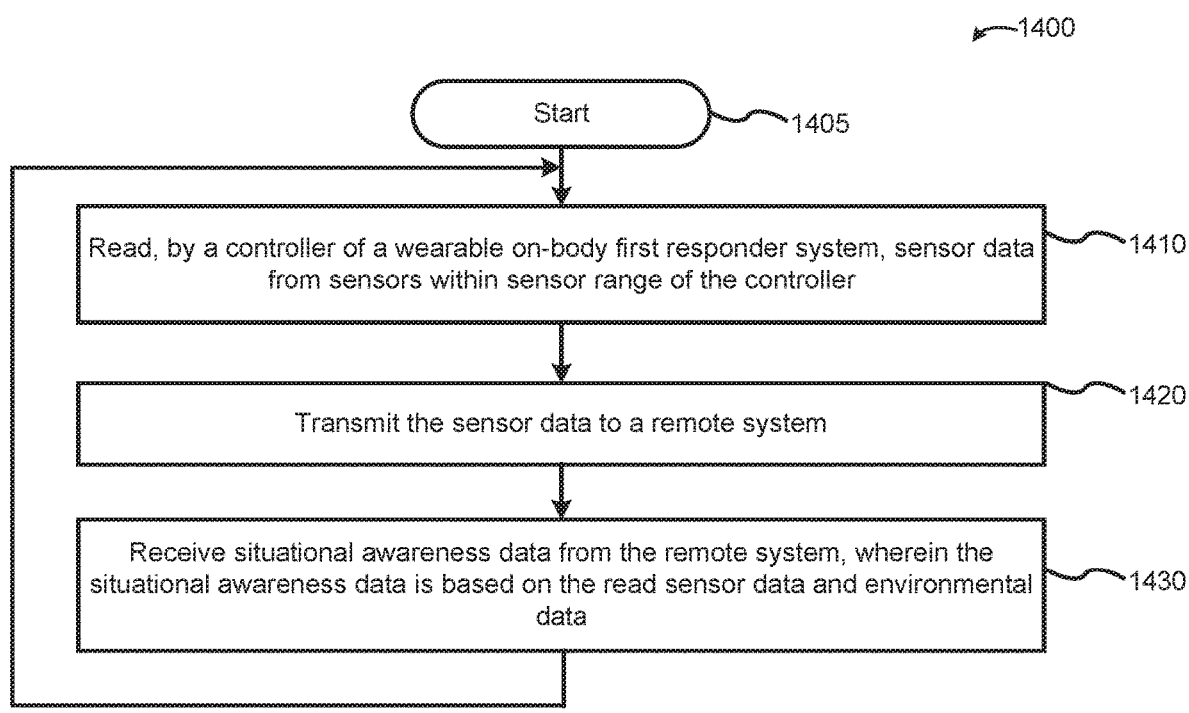
FIG. 14 illustrates method of receiving situational awareness data by a first responder system according to an example embodiment.

FIG. 14 illustrates an example method 1400 of receiving situational awareness data by a first responder system according to an example embodiment. Flow begins at block 1405. In block 1410, a controller of a wearable on-body first responder system reads sensor data from sensors within sensor range of the controller. For example, the controller can read notifications/information/data from sensors, modules, and other components forming a personal area network (PAN) with the controller, as well as from other components not directly joined to the controller's PAN. In block 1420, the sensor data is transmitted to a remote system. For example, the controller responds to a request from another controller, e.g., a controller of another first responder, via a wide area network (WAN) communications connection. In another example, the controller transmits analyzed/processed sensor information to a central command system, which can incorporate such received information into the formation of situational awareness data. In block 1430, situational awareness data is received from the remote system, wherein the situational awareness data is based on the read sensor data and environmental data. For example, the remote system cross-references environmental information corresponding to the sensor data (e.g., weather environmental information corresponding to a GPS location information sensor data) via the Internet, and combines a sensor data reading of temperature (indicating a fire) and humidity (indicating extremely dry conditions) with weather environmental information indicating rising atmospheric pressure and unlikelihood of rain, thereby generating situational awareness data that notifies the first responder to be on guard for fire conditions.

In an alternate example embodiment, the method does not need to involve a remote system, and can involve reading, by a controller of a wearable on-body first responder system, sensor data from sensors within sensor range of the controller; transmitting the sensor data to a remote system; and receiving situational awareness data from the remote system, wherein the situational awareness data is based on the read sensor data and environmental data accessed by the remote system. In yet another alternate example embodiment, the method can involve reading, by a controller associated with a first user, sensor data from sensors within sensor range of the first controller; receiving, from a remote system at least one of i) out of range sensor data, ii) remote situational awareness data generated from out of range sensor data, or iii) a remote notification generated from out of range sensor data; and generating, by the first controller, a local notification indicative of an environmental situation based on information received from the remote system, independent of whether the environmental situation is sensed locally by the controller.

While a number of example embodiments of the present invention have been described, it should be appreciated that the present invention provides many applicable inventive concepts that can be embodied in a wide variety of ways. The example embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure and the knowledge of one of ordinary skill in the art.

Terms and phrases used in this document, unless otherwise expressly stated, should be construed as open ended as opposed to closed—e.g., the term "including" should be read as meaning "including, without limitation" or the like; the term "example" is used to provide example instances of the item in discussion, not an exhaustive or limiting list thereof; the terms "a" or should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Furthermore, the presence of broadening words and phrases such as "one or more," "at least," "but not limited to," or other similar phrases, should not be read to mean that the narrower case is intended or required in instances where such broadening phrases may be absent. Any headers used are for convenience and should not be taken as limiting or restricting. Additionally, where this document refers to technologies that would be apparent or known to one of ordinary skill in the art, such technologies encompass those apparent or known to the skilled artisan now or at any time in the future.

What is claimed is:

1. A wearable on-body first responder system comprising:
at least one sensor configured to identify sensor information;
a controller configured to interface with the at least one sensor, the controller being configured to collect and distribute the sensor information and to store a unique identifier;
the controller being configured to register the unique identifier in a catalog of configuration information of one or more other systems relating to different types of equipment and having respective unique identifiers;
the controller being configured to perform sensor discovery, of one or more other sensors, of the one or more other systems that are registered with the catalog;
the controller being configured to access respective sensor information of the one or more other sensors;
the controller being configured to enable one or more other controllers, of the one or more other systems, to perform sensor discovery of the at least one sensor and to access the sensor information of the at least one sensor; and
an input/output (I/O) device configured to interface with the controller and present the sensor information of the at least one sensor to a user of the wearable on-body first responder system.

2. The system of claim 1, wherein the controller is configured to analyze and aggregate the sensor information of the at least one sensor to provide generated situational awareness data.

3. The system of claim 2, wherein the generated situational awareness data is generated at least in part based on sensor information or environmental data that is not within detection range of the at least one sensor associated with the controller.

4. The system of claim 2, wherein the controller is configured to provide the generated situational awareness data based at least in part on:
received generated situational awareness data,
the sensor information of the at least one sensor,
notifications, or
environmental information, received from at least one of the one or more other systems that is remote from the controller.

5. The system of claim 4, wherein the I/O device is configured to provide visual, haptic, audible, vestibular, or kinesthetic feedback to the user in response to:
the sensor information of the at least one sensor or the one or more other sensors,
the generated situational awareness data, or
the received generated situational awareness data.

6. The system of claim 4, wherein the controller is configured to distribute its own sensor information or the generated situational awareness data to at least one remote system, of the one or more other systems.

7. The system of claim 6, wherein the controller is configured to serve as a remote system command center to receive, aggregate, and/or distribute, to or from the one or more other controllers:
the sensor information, of the at least one sensor and/or the one or more other sensors;
the received generated situational awareness data; or
the environmental information.

8. The system of claim 7, further comprising a communications module configured to communicate with external communications devices based according to at least one of the following standards: Organization for the Advancement of Structured Information Standards (OASIS), family of Emergency Data Exchange Language (EDXL) standards, and National Information Exchange Model (NIEM) Emergency Management Domain (EMD) Information Exchange Packages (IEPs).

9. The system of claim 1, wherein the controller is configured to establish a personal area network (PAN) to interface with the at least one sensor.

10. The system of claim 1, further comprising a system power module to provide power to the system including at least one of the controller and its associated sensors, devices, and modules.

11. The system of claim 10, wherein the system power module is configured to recharge a dedicated power source contained in the at least one sensor, the controller, or the I/O device of the wearable on-body first responder system, wherein the dedicated power source is configured to provide power to its corresponding equipment independent of the system power module.

12. The system of claim 10, wherein the system power module includes an inductive interface to provide power wirelessly.

13. The system of claim 1, wherein the controller is configured to analyze the sensor information, of the at least one sensor, based on identifying information indicating that a sensed source is at least one of: within a vicinity of the controller, within a specific distance to the controller, or located in a specific direction relative to the controller, to produce analyzed sensor information.

14. The system of claim 13, wherein a first controller of the wearable on-body first responder system is configured to distribute the analyzed sensor information to a second controller of a remote system directly, without transmitting to a central command remote system, to enable the second controller to identify a sensed source that is within direct sensing range of the first controller, but that is not within direct sensing range of the second controller.

15. The system of claim 1, wherein the controller is configured to allow the user of the wearable on-body first responder system to select the catalog, from among a plurality of catalogs, with which to register the controller.

16. The system of claim 1, wherein the controller is configured to select which of the one or more other controllers, of the one or more other systems, to allow to access the sensor information of the at least one sensor of the wearable on-body first responder system.

17. The system of claim 1, wherein the controller is configured to prioritize to which of the one or more other systems to transfer the sensor information of the at least one sensor of the wearable on-body first responder system.

18. The system of claim 17, wherein a cloud system is to be given a higher priority than a non-cloud system.

19. The system of claim 1, wherein the controller is configured to prioritize which type of sensor information, of a plurality of different types of sensor information, to transfer from the at least one sensor of the wearable on-body first responder system.

20. The system of claim 1, wherein the controller is configured to allow the user of the wearable on-body first responder system to specify permitted reductions to a transfer of the sensor information, of the at least one sensor or the one or more other sensors, if reductions are necessary.

21. A method for receiving situational awareness data, comprising:
reading, by a controller of a wearable on-body first responder system, sensor data from at least one sensor within sensor range of the controller;
registering the controller, using a unique identifier of the wearable on-body first responder system, with a catalog, of configuration information relating to different types of equipment, to enable the controller to perform sensor discoverability of one or more other sensors, of one or more other systems that are registered with the catalog each using a different unique identifier and to access sensor information, of the one or more other sensors, and to enable one or more other controllers, of the one or more other systems, to perform sensor discoverability of the at least one sensor of the wearable on-body first responder system that is registered with the catalos using the unique identifier of the wearable on-body first responder system and to access the sensor information, of the at least one sensor, wherein the one or more other systems include a remote system;
transmitting the sensor data to the remote system; and
receiving situational awareness data from the remote system, the situational awareness data being based on read sensor data and environmental data accessed by the remote system.

22. The method of claim 21, wherein the situational awareness data includes additional sensor data or environmental data that is out of range of the controller, and that has been obtained by the one or more other controllers and has been relayed to the controller.

23. The method of claim 22, wherein the additional sensor data or environmental data is relayed directly from the one or more other controllers to the controller.

24. The method of claim 21, further comprising reading, by the controller, remote sensor information directly from a remote sensor associated with a second controller, to extend an effective sensor range of the controller.

25. A method comprising: reading, by a first controller, of a first system associated with a first user, respective sensor information from at least one sensor within sensor range of the first controller;
registering, the first controller, using a unique identifier of the first system, with a catalog of configuration information relating to different types of equipment, to enable the first controller to perform sensor discoverability of one or more other sensors of one or more other systems that are registered with the catalog each using a different unique identifier and to access sensor information, of the one or more other sensors, and to enable one or more controllers of the one or more other systems to perform sensor discoverability of the at least one sensor of the first system that is registered with the catalog using the unique identifier of the first system and to access the respective sensor information of the at least one sensor, wherein the one or more other systems include a remote system;
receiving, from the remote system, at least one of i) out of range sensor data, ii) remote situational awareness data generated from out of range sensor data, or iii) a remote notification generated from out of range sensor data; and
generating, by the first controller, a local notification indicative of an environmental situation based on information received from the remote system, independent of whether the environmental situation is sensed locally by the first controller.

* * * * *